US010658701B2

(12) United States Patent
Inoue et al.

(10) Patent No.: US 10,658,701 B2
(45) Date of Patent: May 19, 2020

(54) STORAGE BATTERY, BATTERY CONTROL UNIT, AND ELECTRONIC DEVICE

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Masaki Yamakaji, Kyoto (JP); Jun Ishikawa, Kanagawa (JP); Kazuhei Narita, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 303 days.

(21) Appl. No.: 15/407,283

(22) Filed: Jan. 17, 2017

(65) Prior Publication Data

US 2017/0222265 A1     Aug. 3, 2017

(30) Foreign Application Priority Data

Jan. 29, 2016   (JP) .................................. 2016-016346

(51) Int. Cl.
*H01M 10/0568*     (2010.01)
*H01M 4/36*        (2006.01)
(Continued)

(52) U.S. Cl.
CPC ....... *H01M 10/0568* (2013.01); *H01M 4/364* (2013.01); *H01M 4/366* (2013.01);
(Continued)

(58) Field of Classification Search
CPC ......... H01M 10/0568; H01M 10/0525; H01M 10/054; H01M 4/364; H01M 4/38;
(Continued)

(56) References Cited

U.S. PATENT DOCUMENTS

| 2007/0099079 A1 | 5/2007 | Matsumoto et al. |
| 2013/0236781 A1 | 9/2013 | Oguni et al. |
| 2015/0140449 A1 | 5/2015 | Ishikawa et al. |

FOREIGN PATENT DOCUMENTS

| JP | 2003-331918 A | 11/2003 |
| JP | 2013-214501 A | 10/2013 |

OTHER PUBLICATIONS

Shimizu.M et al., "Effect of Cation Structure of Ionic Liquids on Anode Properties of Si Electrodes for LIB", J. Electrochem. SOC. (Journal of the Electrochemical Society), 2014, vol. 161, No. 12, pp. A1765-A1771.

(Continued)

*Primary Examiner* — Laura Weiner
(74) *Attorney, Agent, or Firm* — Nixon Peabody LLP; Jeffrey L. Costellia

(57) ABSTRACT

A storage battery includes positive and negative electrodes and an electrolytic solution. The negative electrode includes a first element and carbon. The first element is any of silicon, tin, gallium, aluminum, germanium, lead, antimony, bismuth, silver, zinc, cadmium, and indium. The negative electrode includes an active material and a first layer in contact with a surface of the active material. The first layer has a thickness of 10 nm to 1000 nm inclusive. The electrolytic solution contains first and second cations. The first cation is one or more of a lithium ion, a sodium ion, a calcium ion, and a magnesium ion. The second cation is an imidazolium cation or a tertiary sulfonium cation.

20 Claims, 54 Drawing Sheets

(51) Int. Cl.
*H01M 4/587* (2010.01)
*H01M 4/38* (2006.01)
*H01M 4/62* (2006.01)
*H01M 10/0525* (2010.01)
*H01M 10/054* (2010.01)
*H01M 4/02* (2006.01)
*H01M 10/42* (2006.01)

(52) U.S. Cl.
CPC .............. *H01M 4/38* (2013.01); *H01M 4/386* (2013.01); *H01M 4/587* (2013.01); *H01M 4/625* (2013.01); *H01M 10/054* (2013.01); *H01M 10/0525* (2013.01); *H01M 2004/021* (2013.01); *H01M 2004/027* (2013.01); *H01M 2010/4278* (2013.01); *H01M 2220/30* (2013.01); *H01M 2300/0025* (2013.01); *Y02E 60/122* (2013.01); *Y02T 10/7011* (2013.01)

(58) Field of Classification Search
CPC ...... H01M 4/386; H01M 4/625; H01M 4/366; H01M 4/587; H01M 2004/027; H01M 2004/021; H01M 2220/30; H01M 2300/0025; H01M 2010/4278; Y02E 60/122; Y02T 10/7011
See application file for complete search history.

(56) References Cited

OTHER PUBLICATIONS

Nishida.T, "18.3.1 Crystal Structure at Various Charge/Discharge States", Lithium-Ion Batteries Science and Technologies, 2009, pp. 333-335, Springer.

Yamagata.M et al., "Charge.discharge behavior of graphite negative electrodes inbis(fluorosulfonyl)imide-based ionic liquid and structural aspects oftheir electrode/electrolyte interfaces", Electrochimica Acta, 2013, vol. 110, pp. 181-190, Elesevier.

FIG. 21A
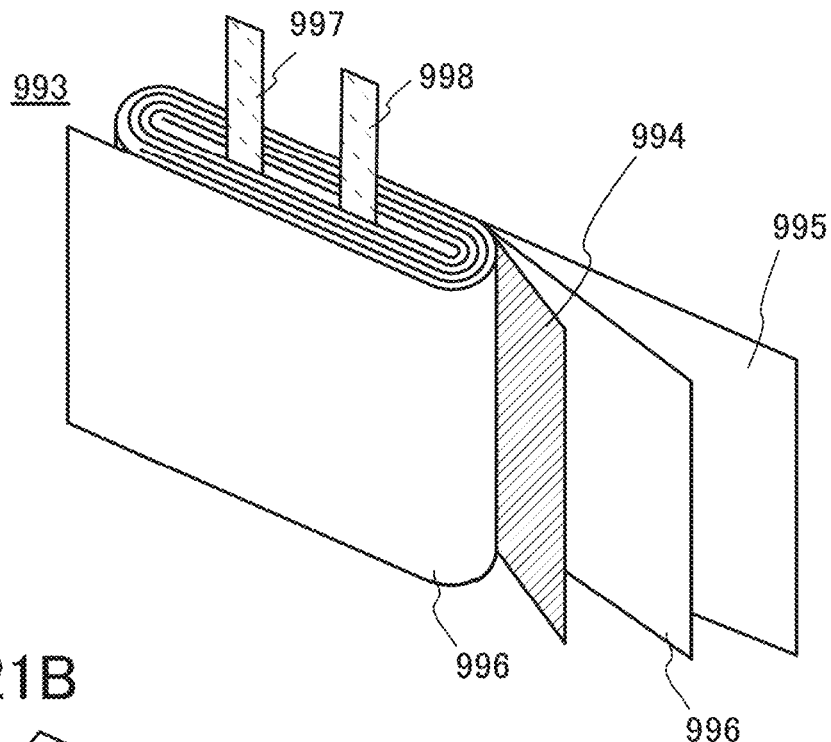
FIG. 21B
FIG. 21C
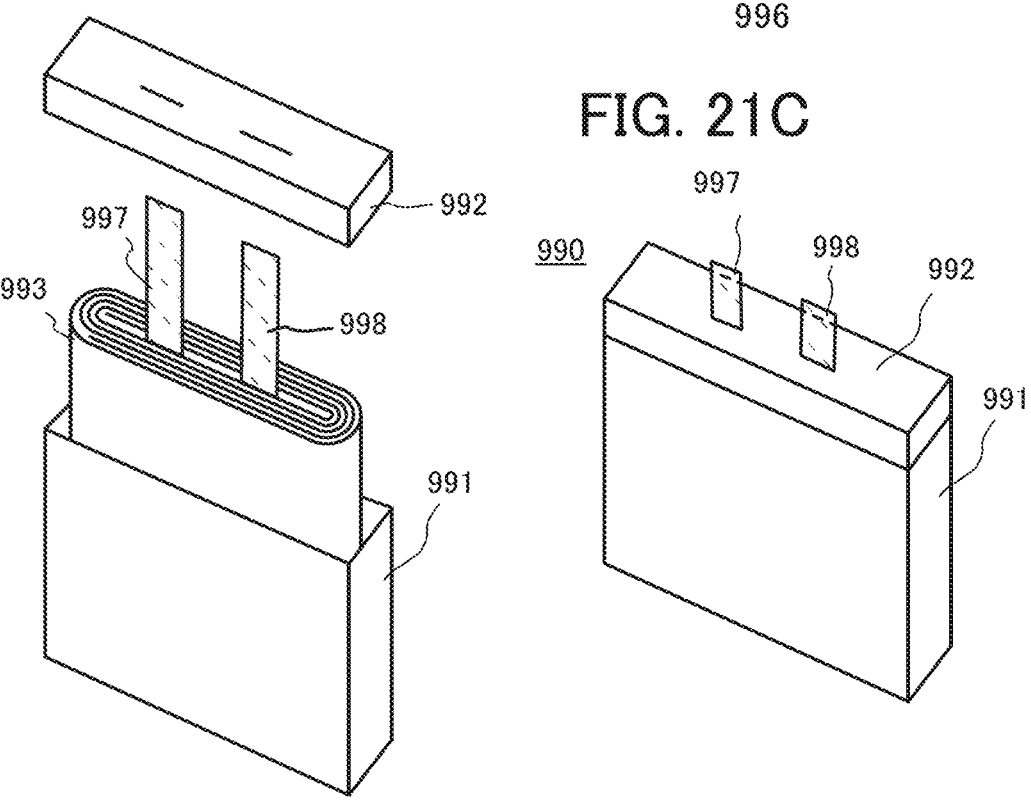

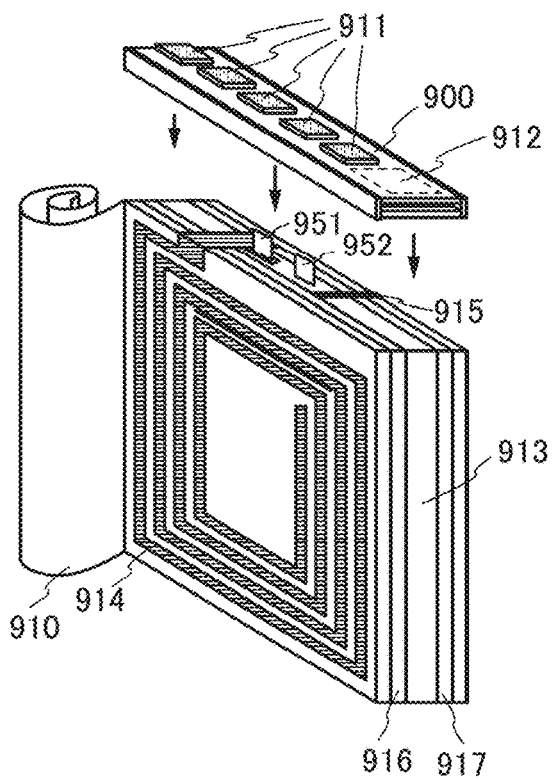
FIG. 23A1
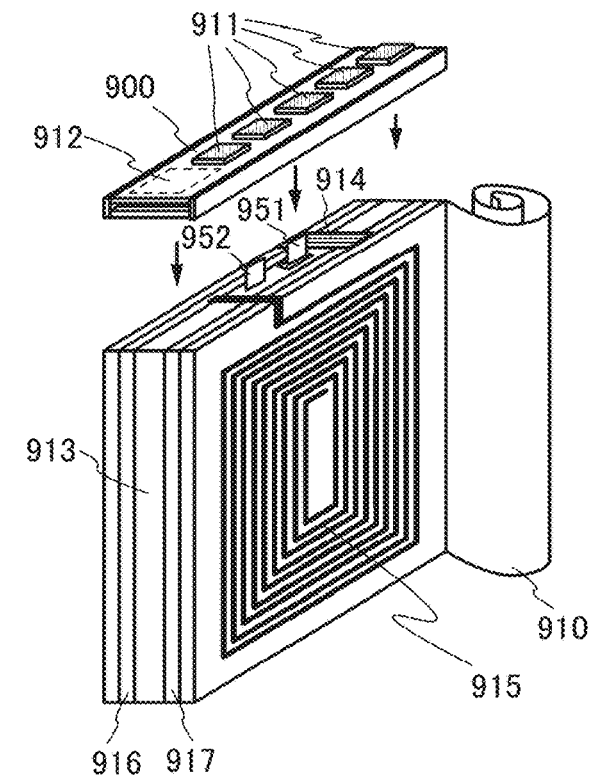
FIG. 23A2
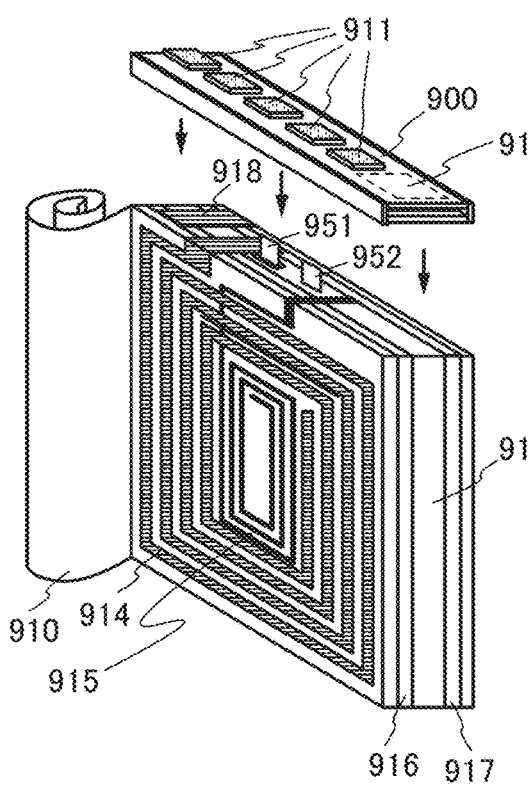
FIG. 23B1
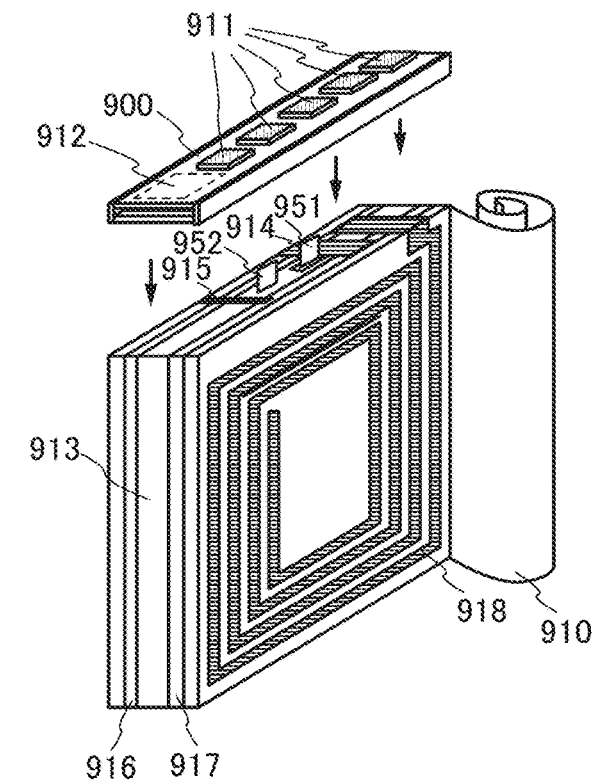
FIG. 23B2

STORAGE BATTERY, BATTERY CONTROL UNIT, AND ELECTRONIC DEVICE

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with a high output and a high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

In a storage battery that utilizes the reaction of carrier ions, such as a lithium-ion battery, the volume of an active material might be changed by charge and discharge process. For example, it is known that the interlayer distance of graphite increases from 0.336 nm to 0.370 nm as disclosed in Non-patent Document 1 (see Non-Patent Document 1, pp. 333-334).

As disclosed in Patent Document 1, for example, the shape or volume of an alloy-based material such as silicon might be changed by repeated charge and discharge cycles.

REFERENCE

[Patent Document 1] Japanese Published Patent Application No. 2013-214501
[Non-Patent Document 1] Masaki Yoshio et al., "Lithium-Ion Batteries Science and Technologies", Springer, chapter 16, pp. 333-334

SUMMARY OF THE INVENTION

An object of one embodiment of the present invention is to provide a novel electrode. Another object of one embodiment of the present invention is to provide a novel power storage device.

Another object of one embodiment of the present invention is to provide a power storage device in which a decrease in capacity caused by charge and discharge cycles is small. Another object of one embodiment of the present invention is to provide a long-life power storage device. Another object of one embodiment of the present invention is to provide a highly reliable power storage device.

Another object of one embodiment of the present invention is to provide an electrode with a high capacity. Another object of one embodiment of the present invention is to provide a power storage device with high energy density. Another object of one embodiment of the present invention is to provide a power storage device whose characteristics suffer little degradation when external force is repeatedly applied to the power storage device.

Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a storage battery including a positive electrode, a negative electrode, and an electrolytic solution. The negative electrode includes a first element and carbon. The first element is any of silicon, tin, gallium, aluminum, germanium, lead, antimony, bismuth, silver, zinc, cadmium, and indium. The negative electrode includes an active material and a first layer in contact with a surface of the active material. The first layer includes a portion with a thickness larger than or equal to 10 nm and smaller than or equal to 1000 nm. The electrolytic solution contains a first cation and a second cation. The first cation is one or more of a lithium ion, a sodium ion, a calcium ion, and a magnesium ion. The second cation is an imidazolium cation or a tertiary sulfonium cation.

Another embodiment of the present invention is a storage battery including a positive electrode, a negative electrode, and an electrolytic solution. The negative electrode includes a first element and carbon. The first element is any of silicon, tin, gallium, aluminum, germanium, lead, antimony, bismuth, silver, zinc, cadmium, and indium. The negative electrode includes a first region, a second region in contact with a surface of the first region, and a third region in contact with a surface of the second region. The second region and the third region each have a shape of a layer. The thickness of the second region is larger than or equal to 10 nm and smaller than or equal to 500 nm. The thickness of the third region is larger than or equal to 10 nm and smaller than or equal to 1000 nm. The atomic ratio of carbon to the first element in the first region is $x_1:y_1$. The atomic ratio of carbon to the first element in the second region is $x_2:y_2$. The atomic ratio of carbon to the first element in the third region is $x_3:y_3$. $x_1/y_1$ is smaller than or equal to 3. $x_2/y_2$ is larger than or equal to 0.1 and smaller than 10. $x_3/y_3$ is larger than or equal to 5. The electrolytic solution contains a first cation and a second cation. The first cation is one or more of a lithium ion, a sodium ion, a calcium ion, and a magnesium ion. The second cation is an imidazolium cation or a tertiary sulfonium cation.

In the above structure, an aromatic cation, an aliphatic onium cation, or the like can be used as the second cation. Examples of the aromatic cation include a pyridinium cation and an imidazolium cation. Examples of the aliphatic onium cation include a quaternary ammonium cation, a tertiary sulfonium cation, and a quaternary phosphonium cation. Furthermore, in the above structure, any of the cations represented by Chemical Formulas (1) to (17) described below is preferably used as the second cation.

In the above structure, as an anion, a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, a perfluoroalkylphosphate anion, or the like can be used.

Another embodiment of the present invention is an electronic device including the storage battery described in any of the above. The electronic device preferably includes a display device. It is preferred that the electronic device include an input-output terminal and the input-output terminal have a function of performing wireless communication.

Another embodiment of the present invention is a battery control unit including the storage battery described in any of the above.

One embodiment of the present invention can provide a novel electrode. Another embodiment of the present invention can provide a novel power storage device.

Another embodiment of the present invention can provide a power storage device in which a decrease in capacity with an increasing number of charge and discharge cycles is small. Another embodiment of the present invention can provide a long-life power storage device. Another embodiment of the present invention can provide a highly reliable power storage device.

Another embodiment of the present invention can provide an electrode with a high capacity. Another embodiment of the present invention can provide a power storage device with high energy density. Another embodiment of the present invention can provide a power storage device whose characteristics suffer little degradation when external force is repeatedly applied to the power storage device.

Note that the descriptions of these effects do not disturb the existence of other effects. One embodiment of the present invention does not necessarily have all the effects listed above. Other effects will be apparent from and can be derived from the descriptions of the specification, the drawings, the claims, and the like.

BRIEF DESCRIPTION OF THE DRAWINGS

In the accompanying drawings:

FIGS. 21A to 21C illustrate an example of a storage battery;

FIGS. 23A1, 23A2, 23B1, and 23B2 illustrate examples of power storage systems;

DETAILED DESCRIPTION OF THE INVENTION

Figure 1A:
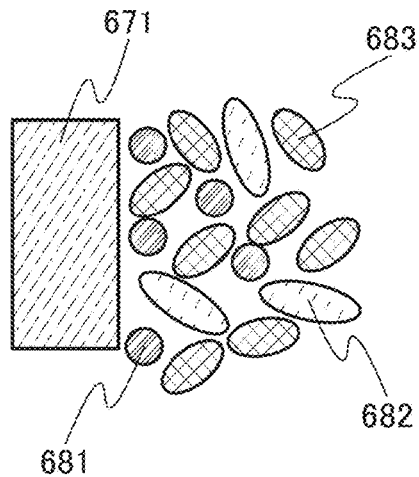
FIGS. 1A to 1E each illustrate constituents of an electrolytic solution.

Hereinafter, embodiments and examples of the present invention will be described in detail with reference to the accompanying drawings. However, the present invention is not limited to the descriptions of the embodiments and examples and it is easily understood by those skilled in the art that the mode and details can be changed variously. Accordingly, the present invention should not be interpreted as being limited to the descriptions of the embodiments below.

Note that in drawings used in this specification, the sizes, thicknesses, and the like of components such as films, layers, substrates, and regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

(Embodiment 1)

In this embodiment, a storage battery of one embodiments of the present invention will be described.

A storage battery of one embodiment of the present invention includes a positive electrode, a negative electrode, and an electrolytic solution.

The electrolytic solution in the storage battery of one embodiment of the present invention preferably contains an ionic liquid. Furthermore, the storage battery of one embodiment of the present invention preferably includes first cations in addition to ions contained in the ionic liquid. As the first cations, alkali metal ions, alkaline earth metal ions, or the like can be used, for example. Alkali metal ions and alkaline earth metal ions serve as carrier ions of the storage battery.

Examples of alkali metals include lithium, sodium, and potassium. Examples of alkaline earth metals include calcium, strontium, barium, beryllium, and magnesium.

In the case of using lithium ions as carrier ions, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be dissolved in an ionic liquid, or two or more of these lithium salts can be dissolved in an ionic liquid in an appropriate combination at an appropriate ratio.

Here, the concentration of carrier ions is preferably higher than 0.1 mol/L and lower than 3 mol/L, more preferably higher than or equal to 0.3 mol/L and lower than or equal to 2.5 mol/L.

The electrolytic solution may contain a solvent other than the ionic liquid, such as an aprotic organic solvent. As an aprotic organic solvent, for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

In charging and discharging the storage battery, a decomposition reaction of the electrolytic solution might occur. The electrolytic solution is decomposed in the vicinity of a surface of an electrode mainly by an electrical reaction.

In the storage battery using alkali metal ions, alkaline earth metal ions, or the like as carrier ions, for example, the reaction potential of a negative electrode is low and thus a decomposition reaction of the electrolytic solution easily occurs, in some cases. For example, the case where the electrolytic solution is decomposed in the vicinity of a surface of the negative electrode by a reduction reaction will be described. In the case where the decomposition of the electrolytic solution is an irreversible reaction, irreversible capacity might increase. Note that irreversible capacity is a difference between charge capacity and discharge capacity. An increase in irreversible capacity decreases the capacity of the storage battery.

To inhibit a decrease in the capacity of the storage battery, it is preferable to inhibit an irreversible reaction of the electrolytic solution in the vicinity of the electrode surface. For example, it is preferred that a reaction of main carrier ions, alkali metal ions or alkaline earth metal ions, of constituents of the electrolytic solution be promoted and reactions of other constituents such as cations and anions in the ionic liquid be inhibited.

FIG. 1A is a schematic view illustrating constituents of an electrolytic solution near a surface of a negative electrode active material 671 of a storage battery. The electrolytic solution contains first cations 681 and an ionic liquid. The ionic liquid contains cations 682 and anions 683. For example, lithium ions can be used as the first cations 681, and 1-ethyl-3-methylimidazolium (EMI) can be used as the cations 682.

Lithium has a significantly low redox potential, specifically, 3.045 V lower than a standard electrode potential. The reaction potential of a negative electrode active material is preferably as low as possible, in which case the voltage of a power storage device can be high. On the other hand, when the potential is low, power of reducing an electrolyte solution is high, so that an organic solvent or the like in an electrolyte solution might reductively decompose. The reaction potential of a negative electrode of a lithium-ion battery is preferably equal to or slightly higher than the redox potential of lithium, in which case the voltage of a power storage device can be high. Meanwhile, the reaction potential of cations in a solvent of an electrolytic solution, e.g., the ionic liquid is higher than the redox potential of lithium in many cases.

Figure 1B:
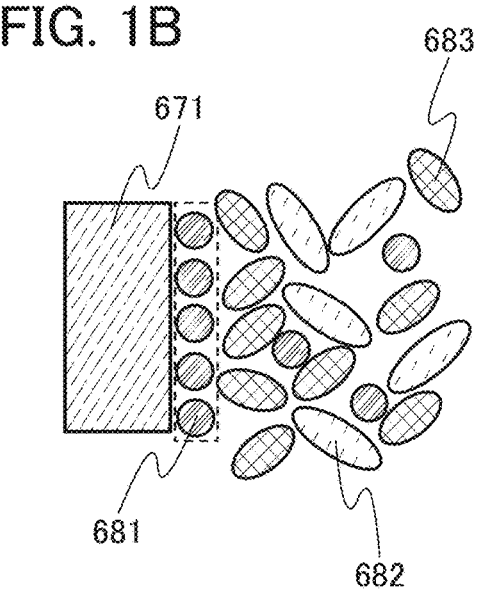
Figure 1C:
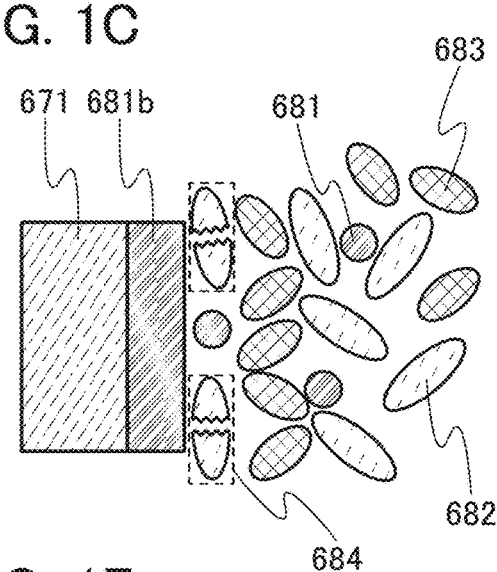

Charging the storage battery is accompanied by a decrease in the potential of the negative electrode active material 671. Charge accumulates in the negative electrode until the potential of the negative electrode active material 671 reaches a potential at which reactions of the first cations 681, the cations 682, and the anions 683 noticeably occur. The first cations 681 preferably form an electric double layer on a surface of the negative electrode active material 671 as illustrated in FIG. 1B with accumulation of the charge. The anions 683 are arranged on a surface of the electric double layer formed by the first cations 681. In FIG. 1B, the cations 682 are prevented from reaching the surface of the negative electrode active material 671.

In the case where the reaction potential of the cations 682 is higher than that of the first cations 681, a noticeable reaction of the cations 682 occurs when the potential of the negative electrode decreases to the reaction potential of the cations 682. In the case where the cations 682 are prevented from reaching a surface of the negative electrode as illustrated in FIG. 1B, however, a reaction of the cations 682 can be inhibited until the potential of the negative electrode reaches the reaction potential of the first cations 681.

Next, the case where the potential of the negative electrode decreases to a potential at which a noticeable reaction of the first cations 681 occurs will be described. The first cations 681 are consumed by the reduction reaction of the first cations 681. The reduction of the first cations 681 might be accompanied by formation of a compound of the first cations 681 and the negative electrode active material 671. Alternatively, the reduction might unionize the first cations 681 to form a deposition layer 681b on the surface of the negative electrode active material 671.

The electric double layer formed on the surface of the negative electrode active material 671 disappears with the consumption of the first cations 681, so that new cations reach the surface of the negative electrode active material 671. When the cations 682 reach the surface of the negative electrode active material 671, an irreversible reaction, e.g., reductive decomposition, of the cations 682 might occur to form a reaction product 684. The reaction product 684 might be deposited to form a coating film 685 on the surface of the negative electrode active material 671.

Figure 1D:
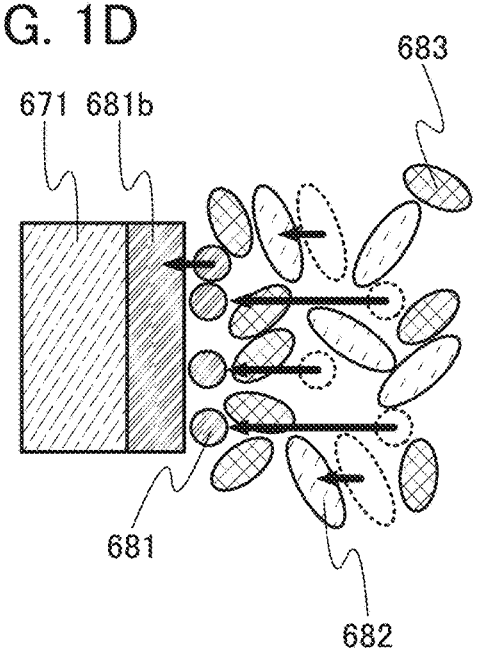
Figure 1E:
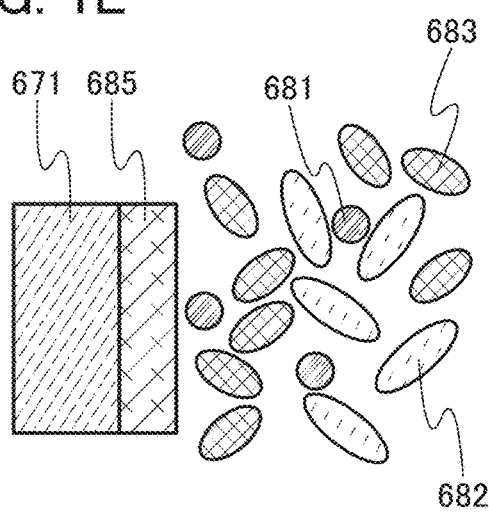

Thus, the first cations 681 preferably reach the surface of the negative electrode active material 671 faster than the cations 682. For example, in the case where the diffusion rate of the first cations 681 in the electrolytic solution is higher than that of the cations 682 as illustrated in FIG. 1D, a reaction of the cations 682 can be inhibited and a reaction of the first cations 681 serving as main carrier ions can be promoted.

Here, the case where an aprotic organic solvent is used as a solvent of the electrolytic solution will be described. The solvent coordinates to (or solvates) the first cations 681. When the first cations 681 serving as main carrier ions move to the vicinity of the surface of the negative electrode to form an electric double layer, the solvent, which is neutral and thus is solvated, might move to the vicinity of the surface of the negative electrode, resulting in inhibition of formation of the electric double layer by the first cations 681.

Meanwhile, in the case where an ionic liquid is used as the solvent of the electrolytic solution, the anions 683 appear to coordinate to the first cations 681. When the first cations 681 move to the vicinity of the surface of the negative electrode to form an electric double layer, the anions 683, which assume negative charge, receive an electric field in the direction in which the distance from the surface of the negative electrode increases. Thus, presumably, the coordination strength of the anions 683 decreases and the anions 683 become detached as the first cations 681 get closer to the surface of the negative electrode. This implies that the first cations 681 form an electric double layer easily compared with the case where an aprotic organic solvent is used as a solvent of an electrolytic solution.

[Diffusion Rate of Cations]

In the electrolytic solution of the storage battery of one embodiment of the present invention, the diffusion rate of the first cations 681 is preferably higher than that of the cations 682. The diffusion rate of cations depends on molecular weight, uneven charge distribution, a three-dimensional structure, and the like.

For example, a large molecular weight of the cations 682 decreases the diffusion rate of the cations 682 but increases the viscosity of the electrolytic solution. As the viscosity of the electrolytic solution increases, the diffusion rate of the first cations 681 serving as main carrier ions decreases. As the diffusion rate of the first cations 681 decreases, the output characteristics of the storage battery are degraded.

Examples of the cations 682 include aromatic cations and aliphatic onium cations. Examples of aromatic cations include pyridinium cations and imidazolium cations. Examples of aliphatic onium cations include quaternary ammonium cations, tertiary sulfonium cations, and quaternary phosphonium cations.

As an ionic liquid containing imidazolium cations, an ionic liquid represented by General Formula (G1) below can be used, for example. In General Formula (G1), $R^1$ represents an alkyl group having 1 to 4 carbon atoms, $R^2$ to $R^4$ individually represent a hydrogen atom or an alkyl group having 1 to 4 carbon atoms, and $R^5$ represents an alkyl group or a main chain composed of atoms of two or more of C, O, Si, N, S, and P. The main chain represented by $R^5$ may have a substituent. Examples of the substituent include an alkyl group and an alkoxy group.

[Chemical Formula 1]

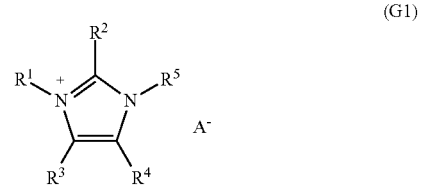

(G1)

As an ionic liquid containing tertiary sulfonium cations, an ionic liquid represented by General Formula (G2) below can be used, for example. In General Formula (G2), $R^{25}$ to $R^{27}$ individually represent a hydrogen atom, an alkyl group having 1 to 4 carbon atoms, or a phenyl group. Alternatively, $R^{25}$ to $R^{27}$ may individually represent a main chain composed of atoms of two or more of C, O, Si, N, S, and P.

[Chemical Formula 2]

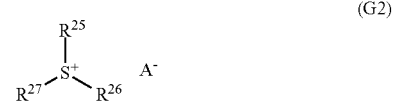

(G2)

As an ionic liquid containing quaternary ammonium cations, an ionic liquid represented by General Formula (G4), (G5), or (G6) below can be used, for example.

[Chemical Formula 3]

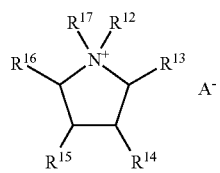

(G4)

In General Formula (G4), $R^{12}$ to $R^{17}$ individually represent an alkyl group, a methoxy group, a methoxymethyl group, or a methoxyethyl group each having 1 or more and 20 or less carbon atoms, or a hydrogen atom.

[Chemical Formula 4]

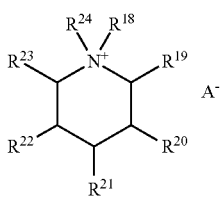

(G5)

In General Formula (G5), $R^{18}$ to $R^{24}$ individually represent an alkyl group, a methoxy group, a methoxymethyl group, a methoxyethyl group each having 1 or more and 20 or less carbon atoms, or a hydrogen atom.

[Chemical Formula 5]

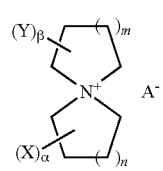

(G6)

In General Formula (G6), n and m are greater than or equal to 1 and less than or equal to 3. Assume that α is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. When α or β is 0, at least one of two aliphatic rings is unsubstituted. Note that the case where both α and β are 0 is excluded. X or Y is a substituent such as a straight-chain or side-chain alkyl group having 1 to 4 carbon atoms, a straight-chain or side-chain alkoxy group having 1 to 4 carbon atoms, or a straight-chain or side-chain alkoxyalkyl group having 1 to 4 carbon atoms.

As an ionic liquid containing pyridinium cations, an ionic liquid represented by General Formula (G3) below may be used, for example. In General Formula (G3), $R^6$ represents an alkyl group or a main chain composed of atoms of two or more of C, O, Si, N, S, and P atoms, and $R_7$ to $R_{11}$ individually represent a hydrogen atom or an alkyl group having 1 to 4 carbon atoms. The main chain represented by $R^6$ may have a substituent. Examples of the substituent include an alkyl group and an alkoxy group.

[Chemical Formula 6]

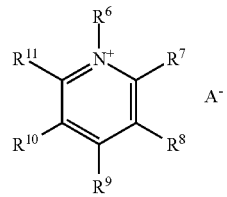

(G3)

Anions that can be used as the anions 683 can be referred to for $A^-$ shown in General Formulas (G1) to (G6).

When pyridinium cations with a molecular weight of 150 or less are used as the cations 682, the cations 682 diffuse in the electrolytic solution fast and might reach the surface of the negative electrode, easily causing a decomposition reaction. In contrast, tertiary sulfonium cations with a molecular weight of 110 or more, imidazolium cations with a molecular weight of 100 or more, and quaternary ammonium cations with a molecular weight of 130 or more are preferably used as the cations 682, in which case the diffusion rate of the cations 682 may be lower than that of the first cations 681. Note that tertiary sulfonium cations with a molecular weight of 220 or less, and imidazolium cations with a molecular weight of 250 or less, preferably 175 or less, are more preferably used as the cations 682, in which case an increase in the viscosity of the electrolytic solution can be small.

The ionic liquid of one embodiment of the present invention is preferably any of the ionic liquids represented by General Formulas (G1) to (G6), more preferably the ionic liquid represented by General Formula (G1) or (G2), still more preferably the ionic liquid represented by General Formula (G1).

As the anions 683, monovalent amide-based anions, monovalent methide-based anions, fluorosulfonate anions, perfluoroalkylsulfonate anions, tetrafluoroborate anions, perfluoroalkylborate anions, hexafluorophosphate anions ($PF_6^-$), perfluoroalkylphosphate anions, or the like can be used.

As the anions 683, for example, monovalent amide-based anions, monovalent methide-based anions, fluorosulfonate anions ($SO_3F^-$), fluoroalkylsulfonate anions, and the like are preferably used.

An example of monovalent amide-based anions is $(C_nF_{2n+1}SO_2)_2N^-$ (n=0 to 3). An example of monovalent cyclic amide-based anions is $(CF_2SO_2)_2N^-$. An example of monovalent methide-based anions is $(C_nF_{2n+1}SO_2)_3C^-$ (n=0 to 3). An example of monovalent cyclic methide-based anions is $(CF_2SO_2)_2C^-(CF_3SO_2)$. An example of fluoroalkyl sulfonic acid anions is $(C_mF_{2m+1}SO_3)^-$ (m=0 to 4). An example of fluoroalkylborate anions is $\{BF_n(C_mH_kF_{2m+1-k})_{4-n}\}^-$ (n=0 to 3, m=1 to 4, and k=0 to 2m). An example of fluoroalkylphosphate anions is $\{PF_n(C_mH_kF_{2m+1-k})_{6-n}\}^-$ (n=0 to 5, m=1 to 4, and k=0 to 2m). These anions are preferably used because interactions with the first cations 681 and the cations 682 may be small. The small interaction between the first cations 681 and the anions 683 may increase the diffusion rate of the first cations 681.

Furthermore, the small interaction between the cations 682 and the anions 683 may lower the melting point of the ionic liquid in the electrolytic solution.

Examples of monovalent amide-based anions include bis(fluorosulfonyl)amide anions and bis(trifluoromethanesulfonyl)amide anions.

As the anions 683, tetrafluoroborate anions ($BF_4^-$), fluoroalkylborate anions, or fluoroalkylphosphate anions may alternatively be used.

A compound used for the power storage device of one embodiment of the present invention includes a cation represented by General Formula (G7) and its counter anion.

[Chemical Formula 7]

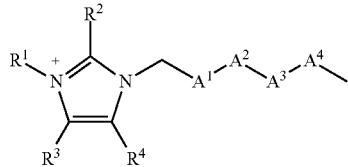

(G7)

In General Formula (G7), $R^1$ represents an alkyl group having 1 to 4 carbon atoms, $R^2$ to $R^4$ individually represent a hydrogen atom or an alkyl group having 1 to 4 carbon atoms, $A^1$ to $A^4$ individually represent a methylene group or an oxygen atom, and at least one of $A^1$ to $A^4$ represents an oxygen atom.

When substituents (including substituents represented by $A^1$ to $A^4$ in General Formula (G7)) are bonded to nitrogen of the imidazolium cation, the cation in the ionic liquid has a sterically bulky structure and thus side reactions (e.g., cation insertion into graphite and decomposition of the cation during charge, and gas generation associated with the insertion and the decomposition) in a battery can be inhibited. However, the viscosity of the ionic liquid is likely to be enhanced as the number of carbon atoms in $A^1$ to $A^4$ is larger; therefore, it is preferable to control the ionic liquid in accordance with desirable charge and discharge efficiency and desirable viscosity.

The anions contained in the ionic liquid are monovalent anions which form the ionic liquid with the imidazolium cations. Examples of the anions include monovalent amide-based anions, monovalent methide-based anions, fluorosulfonic acid anions ($SO_3F^-$), fluoroalkyl sulfonic acid anions, tetrafluoroborate anions ($BF_4^-$), fluoroalkylborate anions, hexafluorophosphate anions ($PF_6^-$), and fluoroalkylphosphate anions. An example of monovalent amide-based anions is $(C_nF_{2n+1}SO_2)_2N^-$ (n=0 to 3). An example of monovalent cyclic amide-based anions is $(CF_2SO_2)_2N^-$. An example of monovalent methide-based anions is $(C_nF_{2n+1}SO_2)_3C^-$ (n=0 to 3). An example of monovalent cyclic methide-based anions is $(CF_2SO_2)_2C^-$ $(CF_3SO_2)$. An example of fluoroalkyl sulfonic acid anions is $(C_mF_{2m+1}SO_3)^-$ (m=0 to 4). An example of fluoroalkylborate anions is $\{BF_n(C_mH_kF_{2m+1-k})_{4-n}\}^-$ (n=0 to 3, m=1 to 4, and k=0 to 2m). An example of fluoroalkylphosphate anions is $\{PF_n(C_mH_kF_{2m+1-k})_{6-n}\}^-$ (n=0 to 5, m=1 to 4, and k=0 to 2m). Note that the anions are not limited thereto.

The anions in the ionic liquid are preferably bis(fluorosulfonyl)amide anions, which are monovalent amide-based anions. An ionic liquid containing bis(fluorosulfonyl)amide anions and cations has high conductivity and relatively low viscosity. A power storage device including the ionic liquid and using graphite for a negative electrode can be charged and discharged.

A compound used for the power storage device of one embodiment of the present invention includes an anion and a cation represented by General Formula (G8).

[Chemical Formula 8]

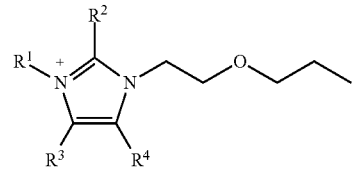

(G8)

In General Formula (G8), $R^1$ represents an alkyl group having 1 to 4 carbon atoms, $R^2$ to $R^4$ individually represent a hydrogen atom or an alkyl group having 1 to 4 carbon atoms.

The anions contained in the ionic liquid are monovalent anions which form the ionic liquid with the imidazolium cations. Examples of the anions include monovalent amide-based anions, monovalent methide-based anions, fluorosulfonic acid anions ($SO_3F^-$), fluoroalkyl sulfonic acid anions, tetrafluoroborate anions ($BF_4^-$), fluoroalkylborate anions, hexafluorophosphate anions ($PF_6^-$), and fluoroalkylphosphate anions. An example of monovalent amide-based anions is $(C_nF_{2n+1}SO_2)_2N^-$ (n=0 to 3). An example of monovalent cyclic amide-based anions is $(CF_2SO_2)_2N^-$. An example of monovalent methide-based anions is $(C_nF_{2n+1}SO_2)_3C^-$ (n=0 to 3). An example of monovalent cyclic methide-based anions is $(CF_2SO_2)_2C^-$ $(CF_3SO_2)$. An example of fluoroalkyl sulfonic acid anions is $(C_mF_{2m+1}SO_3)^-$ (m=0 to 4). An example of fluoroalkylborate anions is $\{BF_n(C_mH_kF_{2m+1-k})_{4-n}\}^-$ (n=0 to 3, m=1 to 4, and k=0 to 2m). An example of fluoroalkylphosphate anions is $\{PF_n(C_mH_kF_{2m+1-k})_{6-n}\}^-$ (n=0 to 5, m=1 to 4, and k=0 to 2m). Note that the anions are not limited thereto.

The anions in the ionic liquid are preferably monovalent amide-based anions.

A compound used for the power storage device of one embodiment of the present invention includes a cation represented by General Formula (G9) and its counter anion.

[Chemical Formula 9]

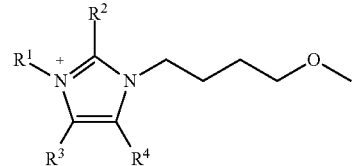

(G9)

In General Formula (G9), $R^1$ represents an alkyl group having 1 to 4 carbon atoms, $R^2$ to $R^4$ individually represent a hydrogen atom or an alkyl group having 1 to 4 carbon atoms.

The anions contained in the ionic liquid are monovalent anions which form the ionic liquid with the imidazolium cations. Examples of the anions include monovalent amide-based anions, monovalent methide-based anions, fluorosulfonic acid anions (SO₃F⁻), fluoroalkyl sulfonic acid anions, tetrafluoroborate anions (BF₄⁻), fluoroalkylborate anions, hexafluorophosphate anions (PF₆⁻), and fluoroalkylphosphate anions. An example of monovalent amide-based anions is $(C_nF_{2n+1}SO_2)_2N^-$ (n=0 to 3). An example of monovalent cyclic amide-based anions is $(CF_2SO_2)_2N^-$. An example of monovalent methide-based anions is $(C_nF_{2n+1}SO_2)_3C^-$ (n=0 to 3). An example of monovalent cyclic methide-based anions is $(CF_2SO_2)_2C^-$ $(CF_3SO_2)$. An example of fluoroalkyl sulfonic acid anions is $(C_mF_{2m+1}SO_3)^-$ (m=0 to 4). An example of fluoroalkylborate anions is $\{BF_n(C_mH_kF_{2m+1-k})_{4-n}\}^-$ (n=0 to 3, m=1 to 4, and k=0 to 2m). An example of fluoroalkylphosphate anions is $\{PF_n(C_mH_kF_{2m+1-k})_{6-n}\}^-$ (n=0 to 5, m=1 to 4, and k=0 to 2m). Note that the anions are not limited thereto.

The anions in the ionic liquid are preferably monovalent amide-based anions.

The alkyl groups in the ionic liquids represented by General Formulas (G7) to (G9) may each be either a straight-chain alkyl group or a branched-chain alkyl group, such as an ethyl group or a tert-butyl group. In the ionic liquid represented by General Formula (G7), it is preferred that $A^1$ to $A^4$ not have an oxygen-oxygen bond (peroxide). An oxygen-oxygen single bond breaks very easily and is highly reactive; thus, the ionic liquid with the bond might be explosive. Thus, the ionic liquid is not suitable for power storage devices.

Specific examples of the cation represented by General Formula (G1) below include Structural Formulas (111) to (174).

[Chemical Formula 10]

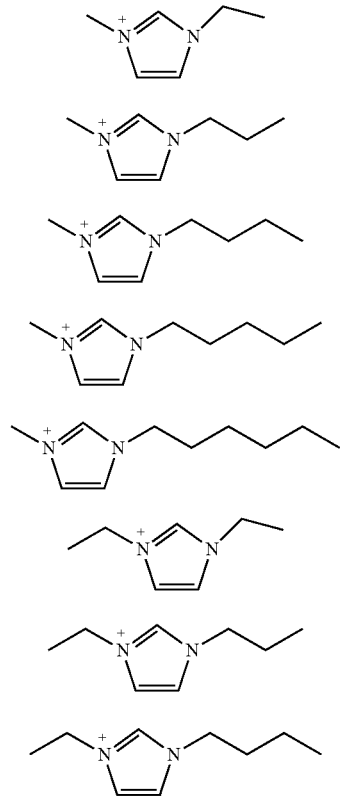

(111)
(112)
(113)
(114)
(115)
(116)
(117)
(118)

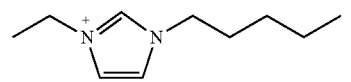

(119)

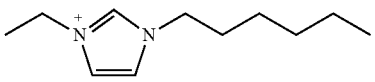

(120)

[Chemical Formula 11]

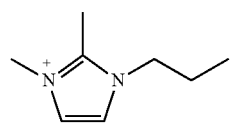

(121)

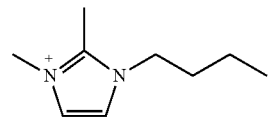

(122)

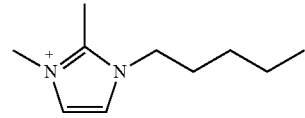

(123)

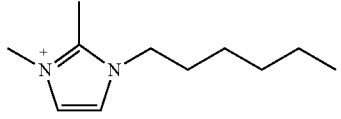

(124)

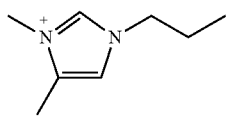

(125)

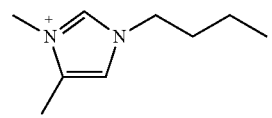

(126)

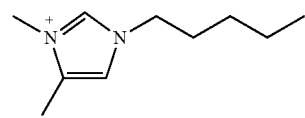

(127)

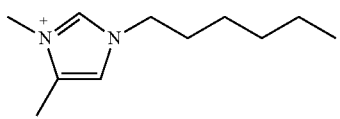

(128)

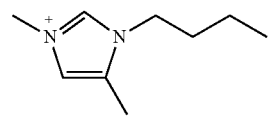

(129)

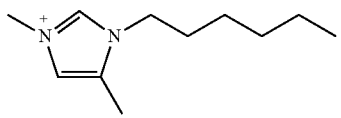

(130)

-continued
[Chemical Formula 12]
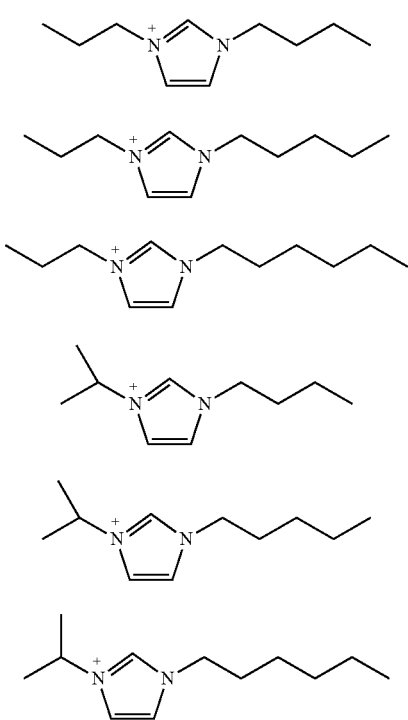
(131)
(132)
(133)
(134)
(135)
(136)
[Chemical Formula 13]
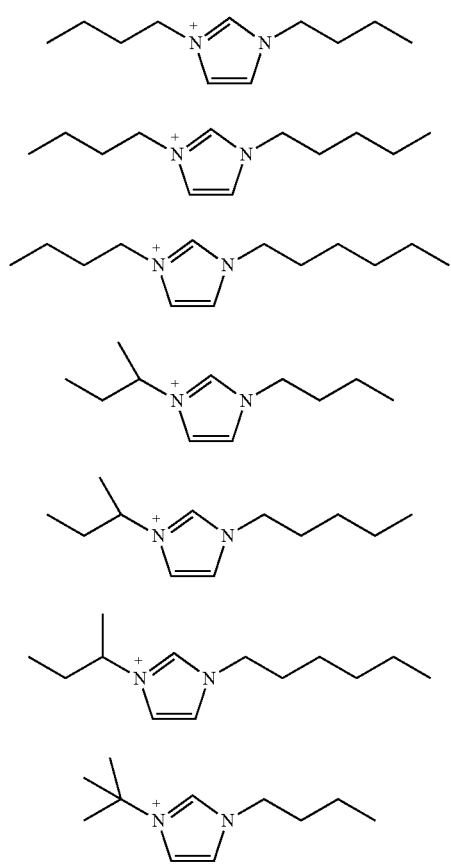
(137)
(138)
(139)
(140)
(141)
(142)
(143)
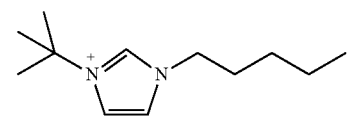
(144)
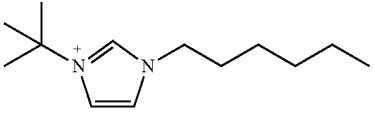
(145)
[Chemical Formula 14]
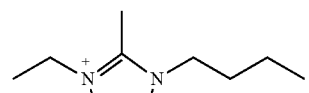
(146)
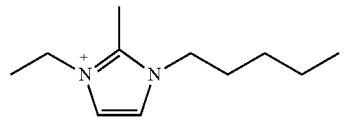
(147)
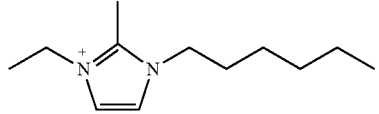
(148)
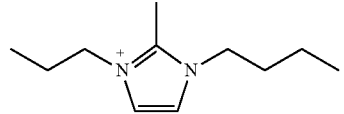
(149)
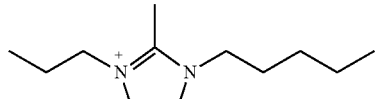
(150)
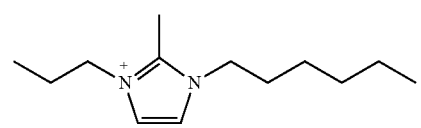
(151)
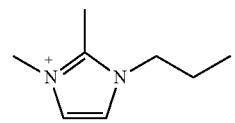
(152)
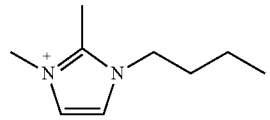
(153)
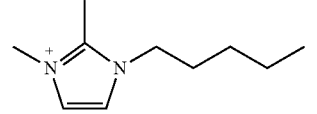
(154)
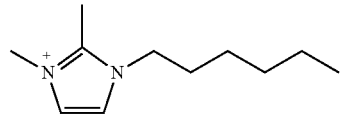
(155)

[Chemical Formula 15]
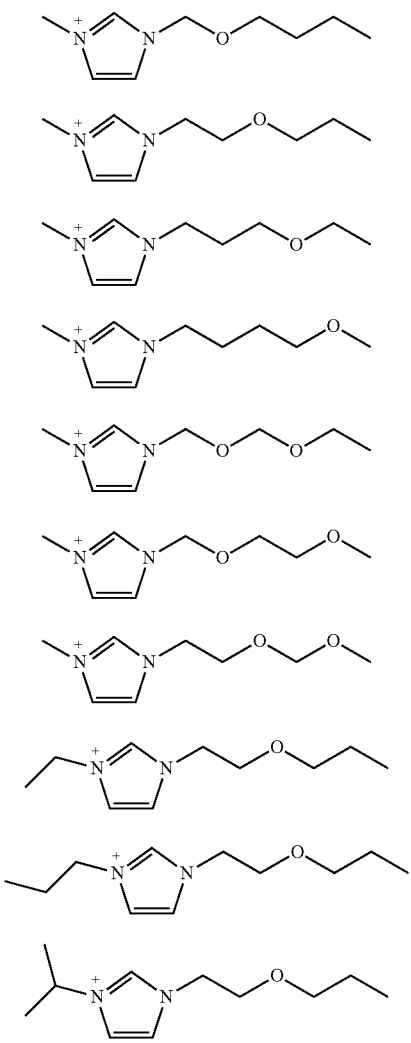
[Chemical Formula 16]
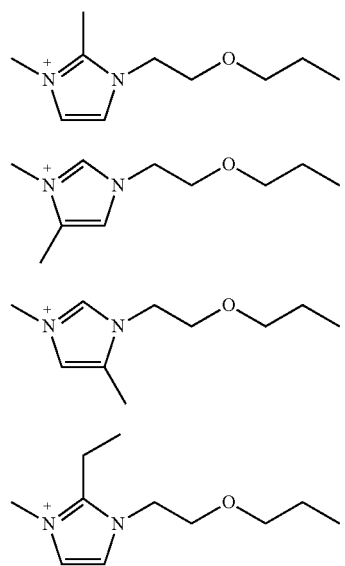
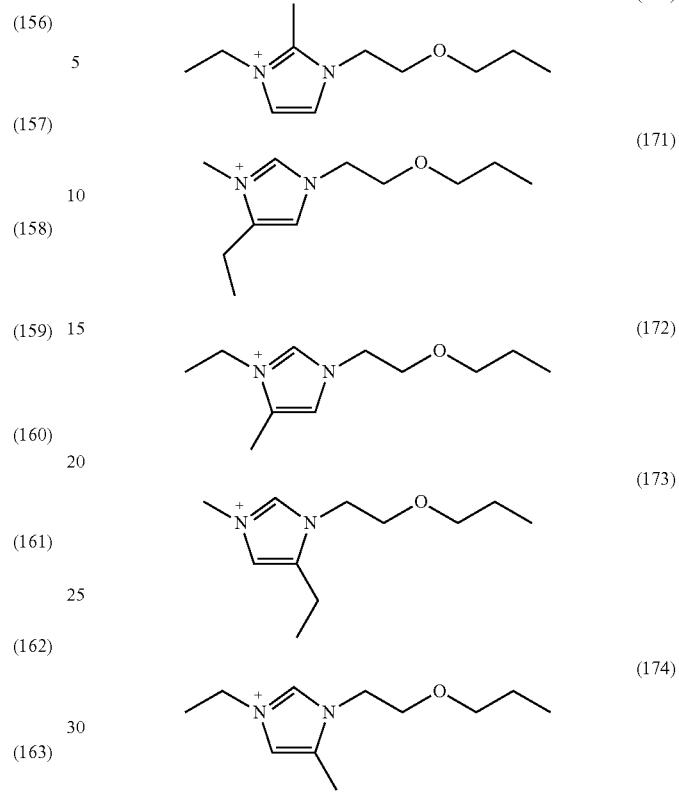
Specific examples of the cation represented by General Formula (G2) below include Structural Formulas (201) to (215).
[Chemical Formula 17]
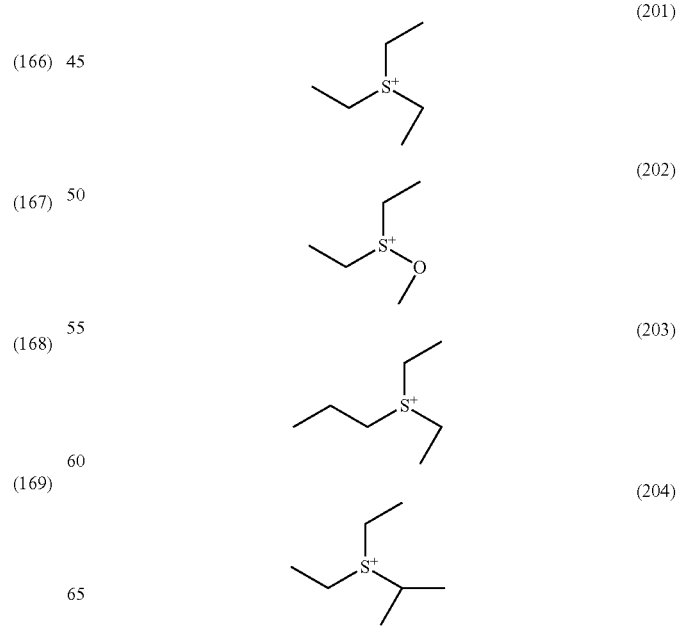

(205) 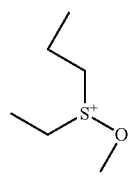

(206) 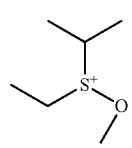

(207) 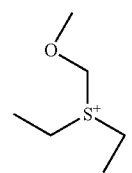

(208) 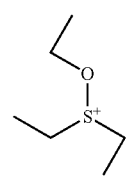

(209) 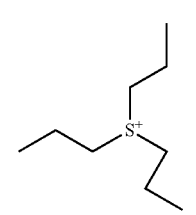

(210) 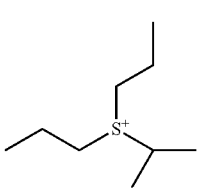

(211) 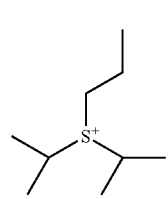

(212) 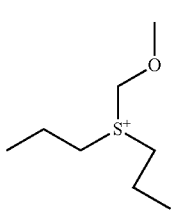

(213) 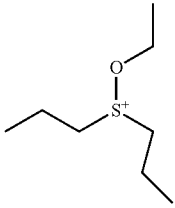

(214) 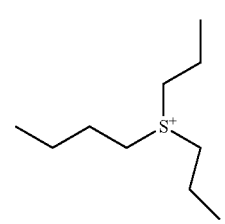

(215) 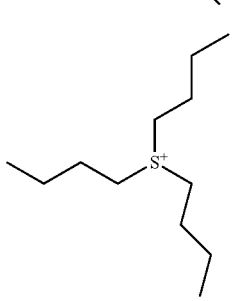

[Negative Electrode Active Material]

In the case where the active material is a negative electrode active material, for example, an alloy-based material, a carbon-based material, or the like can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

It is known that the volume of an alloy-based material of silicon or the like expands due to an alloying reaction with lithium as disclosed in Patent Document 1. The expanded volume contracts due to a dealloying reaction with lithium. Charge and discharge of the storage battery are accompanied by expansion and contraction of the negative electrode active material.

In the state where the negative electrode active material expands, the coating film 685 is formed on the surface of the negative electrode active material. After that, the negative electrode active material whose surface is provided with the coating film 685 contracts. In the contraction, stress from the coating film 685 is imposed on the negative electrode active material, easily forming a crack or the like in the negative electrode active material, for example. Furthermore, in the contraction, the coating film 685 might be caught in the crack, expanding the crack or causing pulverization of the active material. A mixed region of the pulverized negative electrode active material and the coating film caught in the crack formed in the negative electrode active material is formed on the surface of the negative electrode active material. The pulverized negative electrode active material might lose electrical conduction. In that case, no charge and discharge reactions might occur, resulting in a decrease in the capacity of the storage battery. Thus, the negative electrode active material is preferably prevented from being cracked and pulverized.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Note that it is known that when lithium ions are intercalated in graphite, the interlayer distance of graphite increases from 0.336 nm to 0.370 nm, for example (see Non-patent Document 1, pp. 333-334). That is, the interlayer distance increases by approximately 11%.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

[Predoping]

In the case where a coating film is formed in the initial charge and discharge cycle, an irreversible reaction occurs. For example, in the case where one of an irreversible reaction at the positive electrode and an irreversible reaction at the negative electrode is greater, the balance between charge and discharge might be disrupted, resulting in a decrease in the capacity of the storage battery. Replacing an electrode used as a counter electrode after charge and discharge using the counter electrode are performed can inhibit a decrease in capacity. For example, charge or charge and discharge are performed using a positive electrode in combination with a negative electrode, and then, the positive electrode is removed to be replaced with another positive electrode in the storage battery. This may inhibit a decrease in the capacity of the storage battery. This method may be called predoping or preaging.

Inhibiting deposition of the coating film 685 on the surface of the negative electrode active material can prevent the negative electrode active material from being cracked and pulverized in some cases.

The negative electrode of one embodiment of the present invention preferably includes a first element and carbon. The first element is preferably any of silicon, tin, gallium, aluminum, germanium, lead, antimony, bismuth, silver, zinc, cadmium, and indium.

[Layers Included in Negative Electrode]

The negative electrode of one embodiment of the present invention includes a negative electrode active material and a first layer on the surface of the negative electrode active material. The first layer may be called a coating film. The thickness of the first layer is preferably larger than or equal to 10 nm and smaller than or equal to 1000 nm, more preferably larger than or equal to 50 nm and smaller than or equal to 200 nm, still more preferably larger than or equal to 50 nm and smaller than or equal to 100 nm.

Alternatively, the negative electrode of one embodiment of the present invention includes a first region, a second region in contact with a surface of the first region, and a third region in contact with a surface of the second region. The second region and the third region each have a shape of a layer. The thickness of the second region is preferably larger than or equal to 10 nm and smaller than or equal to 500 nm, more preferably larger than or equal to 50 nm and smaller than or equal to 200 nm, still more preferably larger than or equal to 50 nm and smaller than or equal to 100 nm. The thickness of the third region is preferably larger than or equal to 10 nm and smaller than or equal to 1000 nm, more preferably larger than or equal to 50 nm and smaller than or equal to 200 nm, still more preferably larger than or equal to 50 nm and smaller than or equal to 100 nm. The atomic ratio of carbon to the first element in the first region is $x_1:y_1$. The atomic ratio of carbon to the first element in the second region is $x_2:y_2$. The atomic ratio of carbon to the first element in the third region is $x_3$:$y_3$. $x_1/y_1$ is preferably smaller than or equal to 3, more preferably smaller than or equal to 1.5. $x_2/y_2$ is preferably larger than or equal to 0.1 and smaller than 10, more preferably larger than or equal to 0.3 and smaller than or equal to 5. $x_3/y_3$ is preferably larger than or equal to 5, more preferably larger than or equal to 10, still more preferably larger than or equal to 20.

When the intensity ratio of carbon to the first element in the first region, which is obtained by EDX analysis, is $x_1$:$y_1$, the intensity ratio of carbon to the first element in the second region is $x_2$:$y_2$, and the intensity ratio of carbon to the first element in the third region is $x_3$:$y_3$, $x_1/y_1$ is preferably smaller than or equal to 0.3, $x_2/y_2$ is preferably larger than or equal to 0.1 and smaller than or equal to 5, more preferably larger than or equal to 0.3 and smaller than or equal to 3, and $x_3/y_3$ is preferably larger than or equal to 2, more preferably larger than or equal to 5, still more preferably larger than or equal to 10.

When the intensity ratio of carbon to the first element in the first region, which is obtained by EELS analysis, is $x_1$:$y_1$, the intensity ratio of carbon to the first element in the second region is $x_2$:$y_2$, and the intensity ratio of carbon to the first element in the third region is $x_3$:$y_3$, $x_1/y_1$ is preferably smaller than or equal to 0.3, $x_2/y_2$ is preferably larger than or equal to 0.1 and smaller than 5, more preferably larger than or equal to 0.3 and smaller than or equal to 3, and $x_3/y_3$ is preferably larger than or equal to 2, more preferably larger than or equal to 5, still more preferably larger than or equal to 10.

Figure 54A:
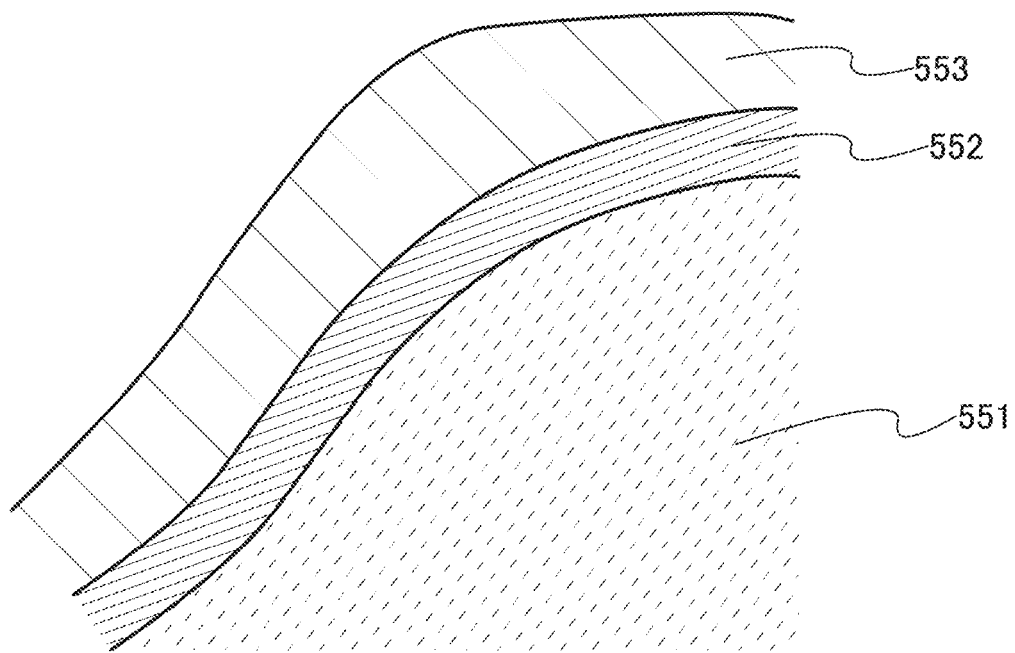
FIGS. 54A and 54B illustrate a negative electrode of one embodiment of the present invention.
Figure 54B:
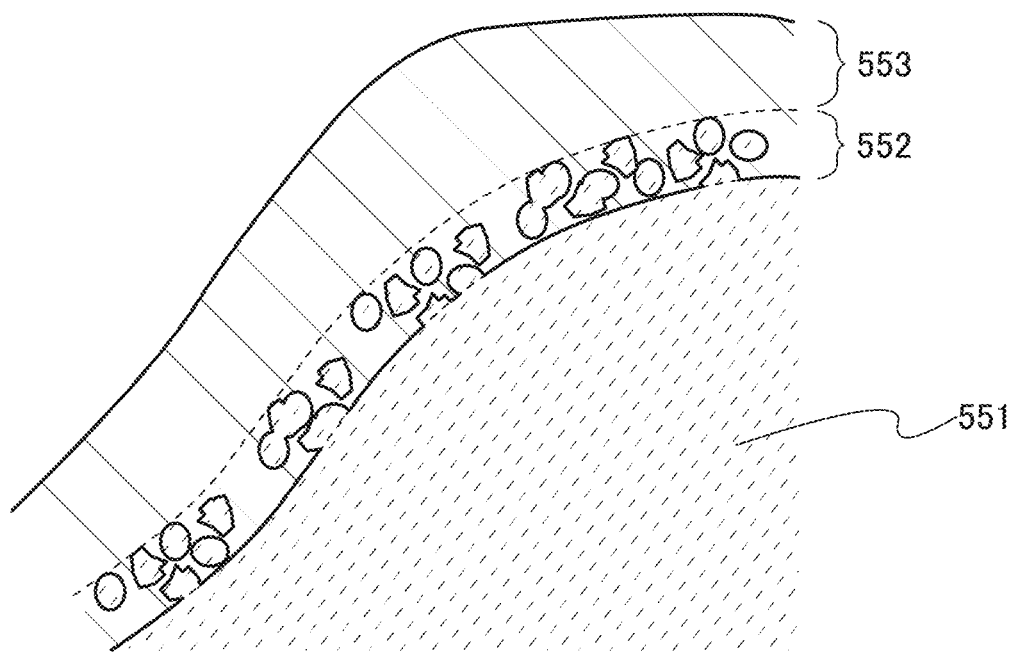

FIG. 54A illustrates an example where a negative electrode includes a first region 551, a second region 552, and a third region 553. As illustrated in FIG. 54B, the second region 552 may be a mixed region of a material of the first region 551 and a material of the third region 553. For example, the first region 551 is a negative electrode active material, and the third region 553 is a coating film formed by deposition of a decomposition product of an electrolytic solution. In the case where the negative electrode active material includes the first element, e.g., silicon, and the decomposition product of the electrolytic solution includes carbon, the first region 551 includes silicon and carbon such that the amount of carbon is smaller than that of silicon. The third region 553 includes silicon and carbon such that the amount of carbon is larger than that of silicon. That is, $x_3/y_3$ is larger than $x_1/y_1$.

For the S2p spectrum of XPS analysis of the negative electrode of one embodiment of the present invention, the spectral intensity at around 168 eV is two or more times, three or more times, or four or more times the spectral intensity at around 163 eV, for example.

A current collector included in each of the positive electrode and the negative electrode can be formed using a material that has high conductivity, such as a metal of stainless steel, gold, platinum, aluminum, titanium, or the like, or an alloy thereof. In the case where the current collector is used in the positive electrode, it is preferred that it not dissolve at the potential of the positive electrode. In the case where the current collector is used in the negative electrode, it is preferred that it not be alloyed with carrier ions such as lithium ions. Alternatively, the current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector can have any of various shapes including a foil-like shape, a plate-like shape (sheet-like shape), a net-like shape, a punching-metal shape, and an expanded-metal shape. The current collector preferably has a thickness of 5 μm to 30 μm inclusive.

Examples of a positive electrode active material include a composite oxide with an olivine crystal structure, a composite oxide with a layered rock-salt crystal structure, and a composite oxide with a spinel crystal structure.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used. $LiCoO_2$ is particularly preferable because it has a high capacity, stability in the air higher than that of $LiNiO_2$, and thermal stability higher than that of $LiNiO_2$, for example. It is preferable to add a small amount of lithium nickel oxide ($LiNiO_2$ or $LiNi_{1-x}M_xO_2$(M=Co, Al, or the like)) to a lithium-containing material with a spinel crystal structure which contains manganese such as $LiMn_2O_4$ because the characteristics of a secondary battery using such a material can be improved.

The average diameter of primary particles of the positive electrode active material is preferably greater than or equal to 5 nm and less than or equal to 50 μm, more preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a transmission electron microscope (TEM). The specific surface area can be measured by a gas adsorption method.

Another example of the positive electrode active material is a lithium-manganese composite oxide that is represented by a composition formula $Li_aMn_bM_cO_d$. Here, the element M is preferably a metal element other than lithium and manganese, or silicon or phosphorus, more preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d < 0.5$. To achieve a high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$: $MnCO_3$: NiO=0.84:0.8062:0.318. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 2A:
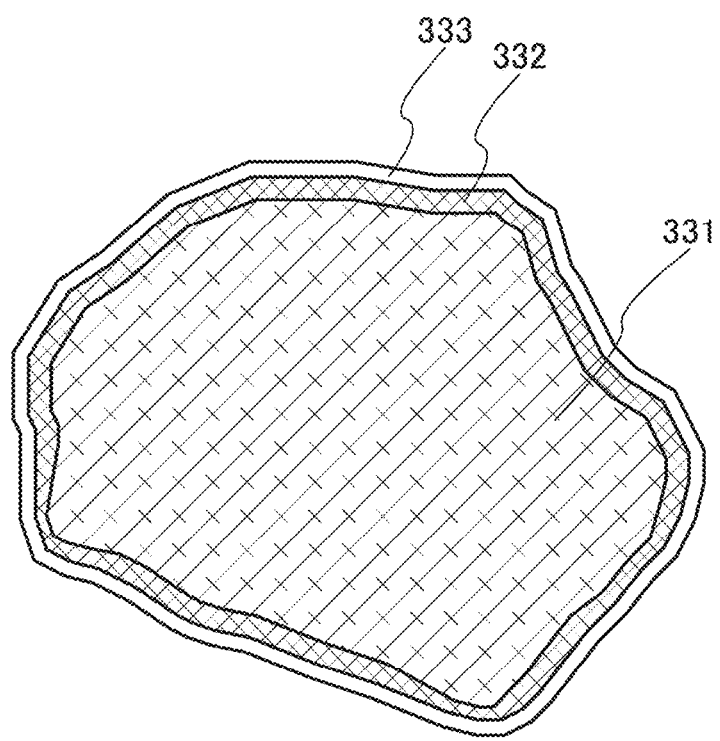
FIGS. 2A and 2B each illustrate a particle of one embodiment of the present invention.
Figure 2B:
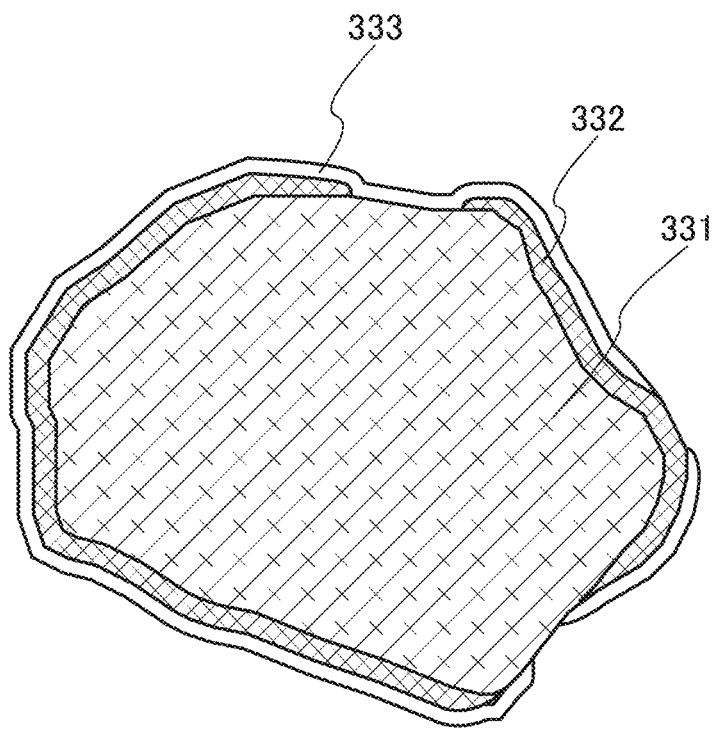

FIGS. 2A and 2B each illustrate an example of a cross-sectional view of a particle of a lithium-manganese composite oxide having a region with different crystal structures, crystal orientations, or oxygen contents.

As illustrated in FIG. 2A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 2B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by $a1:b1:c1:d1$; and the atomic ratio of lithium to manganese, the element M, and oxygen in the region 332 is represented by $a2:b2:c2:d2$. Note that the composition of each of the region 331 and the region 332 can be measured by, for example, EDX using a TEM. In measurement by EDX, the proportion of lithium is sometimes difficult to measure. Thus, a difference between the region 331 and the region 332 in composition except for lithium will be described below. Here, $d1/(b1+c1)$ is preferably greater than or equal to 2.2, more preferably greater than or equal to 2.3, still more preferably greater than or equal to 2.35 and less than or equal to 3. Furthermore, $d2/(b2+c2)$ is preferably less than 2.2, more preferably less than 2.1, much more preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d < 0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the region 332 and the region 331. The transition layer is a region where the composition, crystal structure, or crystal lattice constant changes continuously or stepwise. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

The region 333 preferably contains carbon or a metal compound. Examples of the metal include cobalt, aluminum, nickel, iron, manganese, titanium, zinc, and lithium. Examples of the metal compound include an oxide and a fluoride of the metal.

It is particularly preferable that the region 333 contain carbon. Since carbon has high conductivity, the particle covered with carbon in the electrode of the power storage device can reduce the resistance of the electrode, for example. The region 333 preferably includes a graphene compound. The use of the graphene compound in the region 333 allows the lithium-manganese composite oxide particle to be efficiently coated with the region 333. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the secondary battery using the lithium-manganese composite oxide as a positive electrode material can have improved cycle performance.

The thickness of the region 333 is preferably greater than or equal to 0.4 nm and less than or equal to 40 nm.

Furthermore, the average diameter of primary particles of the lithium-manganese composite oxide is preferably greater than or equal to 5 nm and less than or equal to 50 mm, more preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average diameter of secondary particles is preferably greater than or equal to 5 µm and less than or equal to 50 µm.

The positive electrode and the negative electrode may include a conductive additive. Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound may have excellent electrical characteristics of high conductivity and excellent physical properties of high flexibility and high mechanical strength. A graphene compound has a planar shape and enables low-resistant surface contact. Furthermore, a graphene compound has extremely high conductivity even with a small thickness in some cases and thus allows a conductive path to be formed in an active material layer efficiently even with a small amount. Thus, a graphene compound is preferably used as a conductive additive, in which case the area where an active material and the conductive additive are in contact with each other can be increased and electrical resistance may be reduced. Here, it is particularly preferred that graphene, multilayer graphene, or reduced graphene oxide (hereinafter referred to as RGO) be used as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. In such a case, it is particularly preferred that a graphene compound with extremely high conductivity that can efficiently form a conductive path even in a small amount is used.

A cross-sectional structure example of the active material layer containing a graphene compound as a conductive additive will be described below.

Figure 3A:
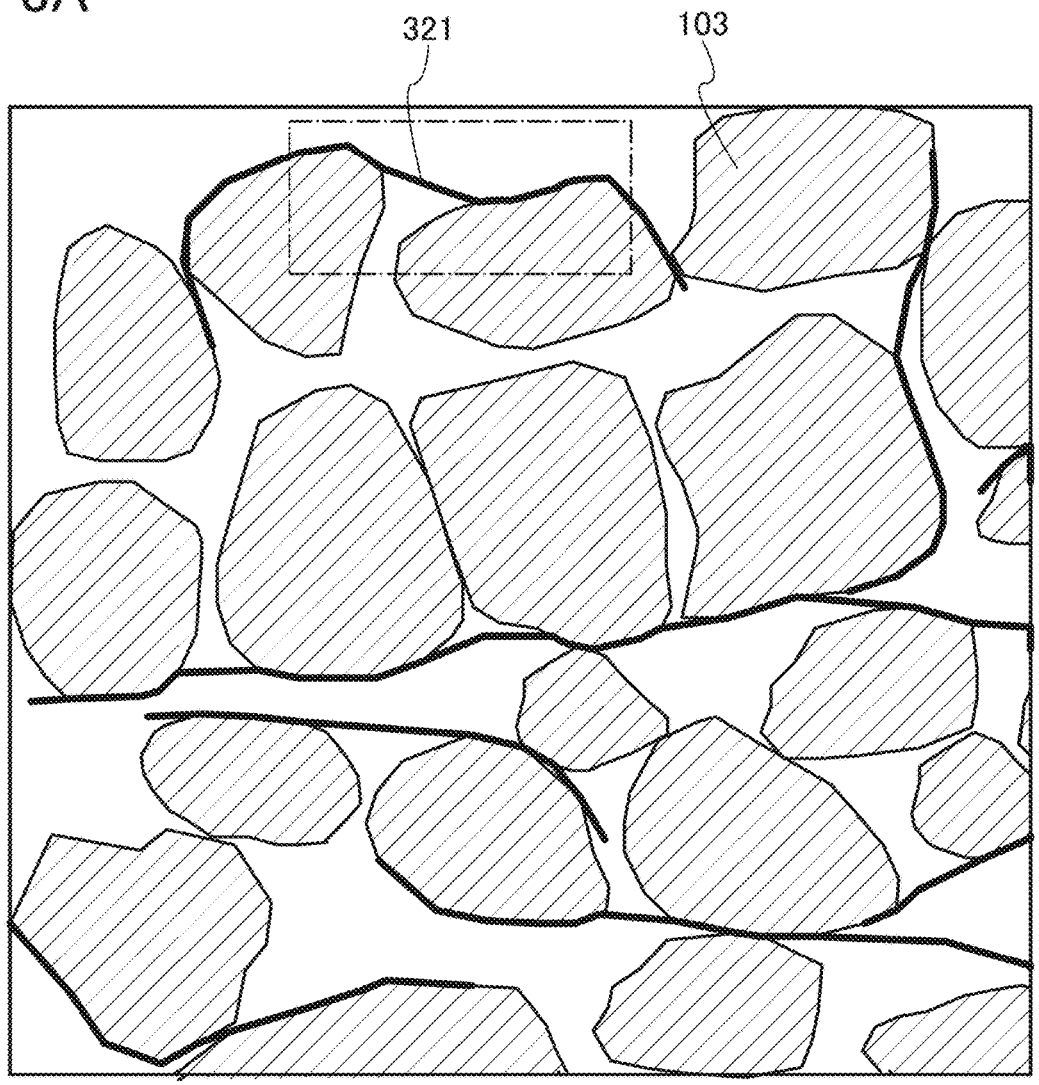
FIGS. 3A and 3B are diagrams illustrating part of a cross section of an electrode.
Figure 3B:
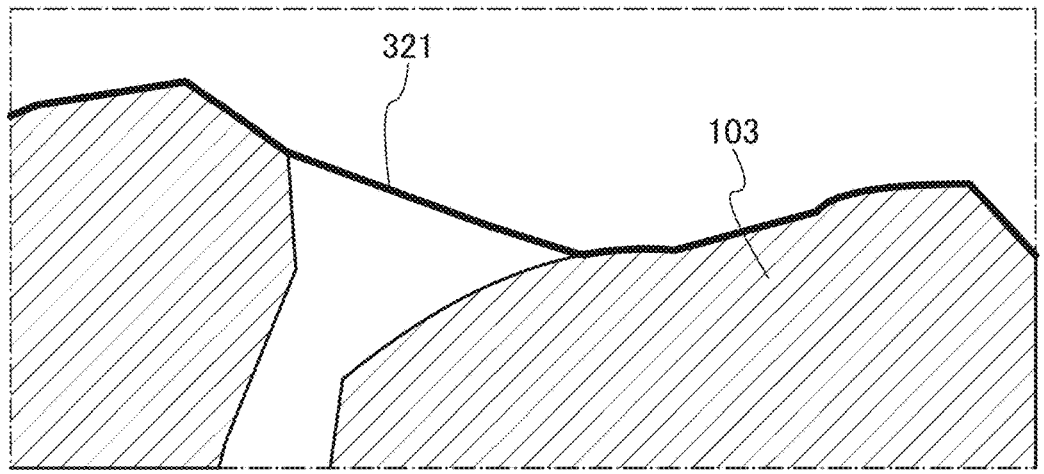

FIG. 3A is a longitudinal sectional view of the active material layer. The active material layer includes the active material particles 103, graphene compounds 321 as a conductive additive, and a binder (not illustrated). Here, graphene or multilayer graphene can be used as the graphene compound 321, for example. The graphene compound 321 preferably has a sheet-like shape. The graphene compound 321 may have a sheet-like shape formed of a plurality of sheets of multilayer graphene and/or a plurality of sheets of graphene that partly overlap with each other.

The longitudinal section of the active material layer in FIG. 3A shows substantially uniform dispersion of the graphene compounds 321 in the active material layer. The graphene compounds 321 are schematically shown by thick lines in FIG. 3A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103. Furthermore, the graphene compounds 321 are also in surface contact with each other; consequently, the plurality of graphene compounds 321 form a three-dimensional network for electric conduction.

Here, a plurality of graphene compounds are bonded to each other to form net-like graphene compound sheet (hereinafter referred to as a graphene compound net or a graphene net). The graphene net covering the active material can function as a binder for binding active materials. The amount of the binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer is formed in such a manner that graphene oxide flakes are used as the graphene compounds 321 and mixed with an active material. When graphene oxide flakes with extremely high dispersibility in a polar solvent are used for the formation of the graphene compounds 321, the graphene compounds 321 can be substantially uniformly dispersed in the active material layer. The solvent is removed by volatilization from a dispersion medium in which graphene oxide flakes are uniformly dispersed, and the graphene oxide is reduced; hence, the graphene compounds 321 remaining in the active material layer partly overlap with each other and are dispersed such that surface contact is made, thereby forming a three-dimensional conduction path. Note that graphene oxide flakes can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compounds 321 than that of a normal conductive additive. Thus, the proportion of the active material particles 103 in the active material layer can be increased. Accordingly, the discharge capacity of a power storage device can be increased.

The positive electrode and the negative electrode may each include a binder. As the binder, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

Two or more of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolytic solution. Here, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

[Method for Fabricating Electrode]

In examples of methods for fabricating negative and positive electrodes, a slurry is formed and an electrode is fabricated by application of the slurry. A method for forming a slurry used for electrode fabrication will be described.

A polar solvent is preferably used as the solvent used for formation of the slurry. Examples of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

First, the active material, the conductive additive, and the binder are mixed to form Mixture A (Step S110). Next, the solvent is added to Mixture A and kneading (mixing with a high viscosity) is performed, so that Mixture B is formed (Step S120). Here, Mixture B is preferably in a paste form, for example. In the case where a second binder is added in a later step S141, a first binder is not necessarily added in Step S110 in some cases.

Next, the solvent is added to Mixture B and kneading is performed, so that Mixture C is formed (Step S130).

Next, in the case where the second binder is used, the second binder is added to form Mixture D (Step S141). At this time, a solvent may be added. In the case where the second binder is not used, a solvent is added as needed to form Mixture E (Step S142).

Then, Mixture D or Mixture E is mixed in a reduced-pressure atmosphere to form Mixture F (Step S150). At this time, a solvent may be added. In the mixing and kneading steps in Steps S110 to S150, a mixer may be used, for example.

Next, the viscosity of Mixture F is measured (Step S160). After that, a solvent is added as needed to adjust the viscosity. Through the above steps, slurry for application of the active material layer is obtained.

Here, for example, the higher the viscosity of Mixtures C to F in Steps S130 to S160 is, the higher the dispersibility of the active material, the binder, and the conductive additive in the mixtures is (the better they are mixed together), in some cases. Thus, the viscosity F is preferably higher. However, an excessively high viscosity of Mixture F is not preferred in terms of productivity because it might reduce the electrode application speed.

Next, a method for forming the active material layer on the current collector with the use of the formed slurry will be described.

First, the slurry is applied to the current collector. Before the application of the slurry, surface treatment may be performed on the current collector. Examples of surface treatment include corona discharge treatment, plasma treatment, and undercoat treatment. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

For the application of the slurry, a slot die method, a gravure method, a blade method, or combination of any of them can be used. Furthermore, a continuous coater or the like may be used for the application.

Then, the solvent of the slurry is volatilized to form the active material layer. The steps for volatilizing the solvent of the slurry are as follows, for example.

The step of volatilizing the solvent of the slurry is preferably performed at a temperature in the range from 50° C. to 200° C. inclusive, more preferably from 60° C. to 150° C. inclusive.

Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example.

The temperature may be increased in stages. For example, after heat treatment is performed at 60° C. or lower for shorter than or equal to 10 minutes, another heat treatment may further be performed at higher than or equal to 65° C. for longer than or equal to 1 minute.

The thickness of the active material layer formed through the above steps is, for example, preferably greater than or equal to 5 μm and less than or equal to 300 μm, more preferably greater than or equal to 10 μm and less than or equal to 150 μm. Furthermore, the loading of the active material in the active material layer is, for example, preferably greater than or equal to 2 mg/cm$^2$ and less than or equal to 50 mg/cm$^2$.

The active material layer may be formed over only one surface of the current collector, or the active material layers may be formed such that the current collector is sandwiched therebetween. Alternatively, the active material layers may be formed such that part of the current collector is sandwiched therebetween.

After the volatilization of the solvent from the active material layer, pressing may be performed by a compression method such as a roll press method or a flat plate press method. In performing pressing, heat may be applied.

Note that the active material layer may be predoped. There is no particular limitation on the method for predoping the active material layer. For example, the active material layer may be predoped electrochemically. For example, before a battery is assembled, the active material layer can be predoped with lithium in an electrolytic solution described later with the use of a lithium metal as a counter electrode. Alternatively, predoping may be performed using a positive electrode for predoping as a counter electrode of a negative electrode, and then, the positive electrode for predoping may be removed. Predoping can particularly inhibit a decrease in initial charge and discharge efficiency, leading to an increase in the capacity of the storage battery.

This embodiment can be implemented in combination with any of the other embodiments as appropriate.

(Embodiment 2)

In this embodiment, power storage devices of embodiments of the present invention will be described.

Examples of the power storage device of one embodiment of the present invention include a secondary battery that utilizes an electrochemical reaction, such as such as a lithium-ion battery, an electrochemical capacitor such as an electric double-layer capacitor or a redox capacitor, an air battery, and a fuel battery.

<Thin Storage Battery>

Figure 4:
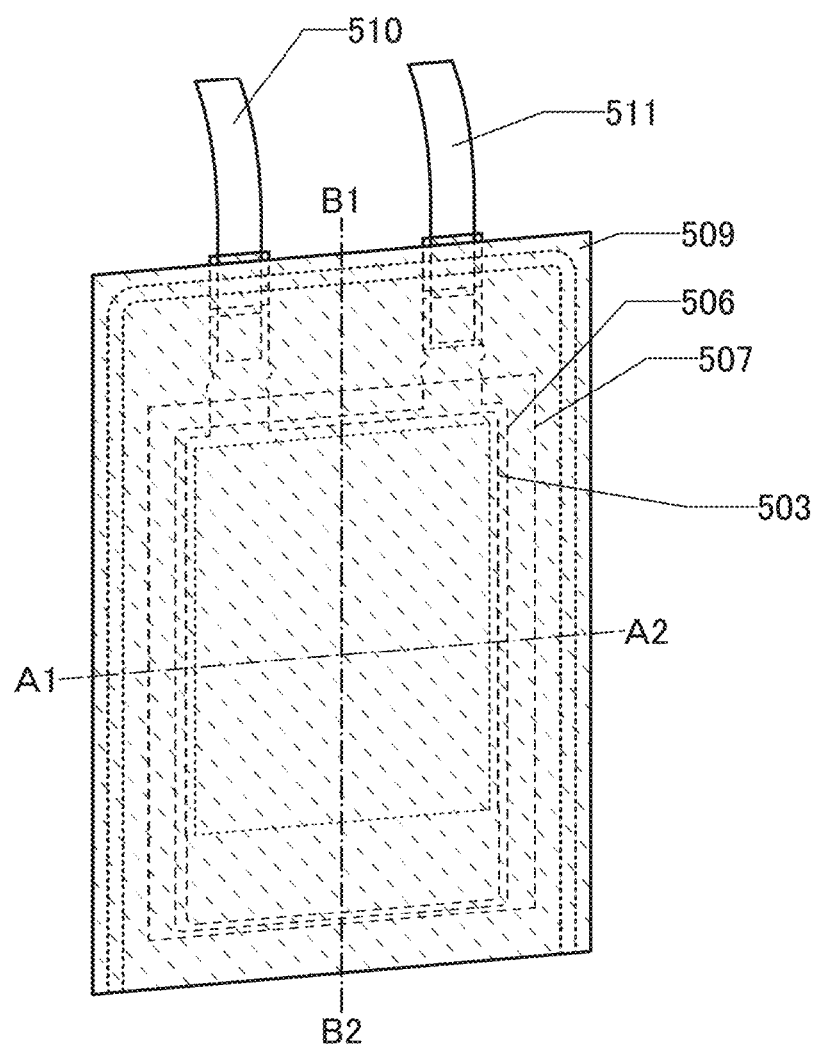
FIG. 4 illustrates a storage battery.

FIG. 4 illustrates a thin storage battery as an example of a power storage device. When a flexible thin storage battery is used in an electronic device at least part of which is flexible, the storage battery can be bent as the electronic device is bent.

Figure 5A:
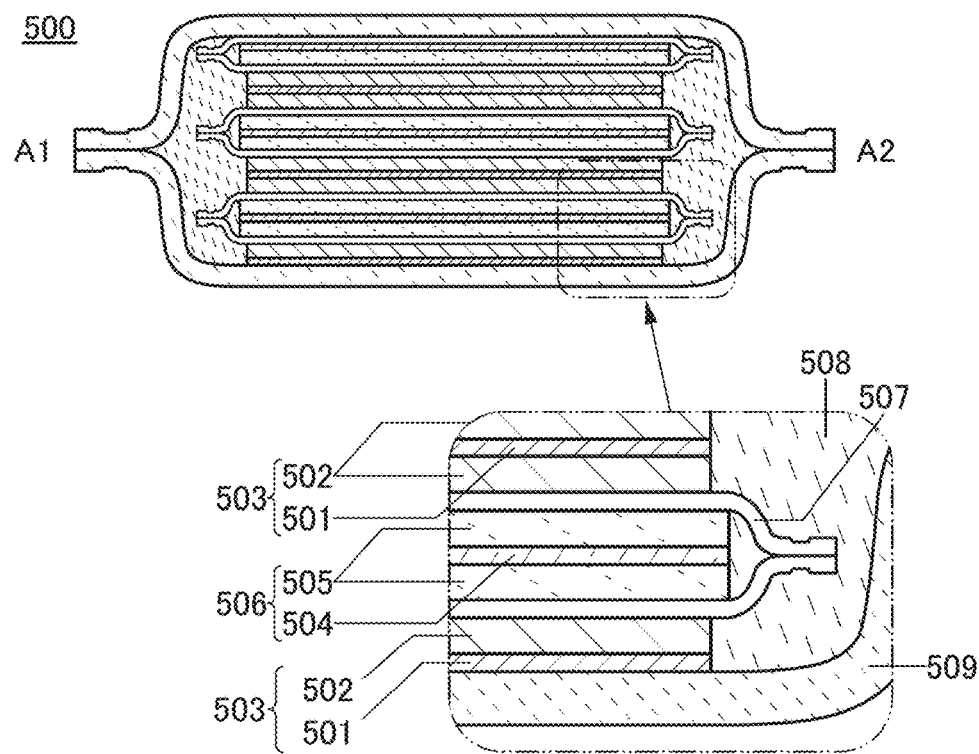
FIGS. 5A and 5B are each a cross-sectional view of a storage battery.
Figure 5B:
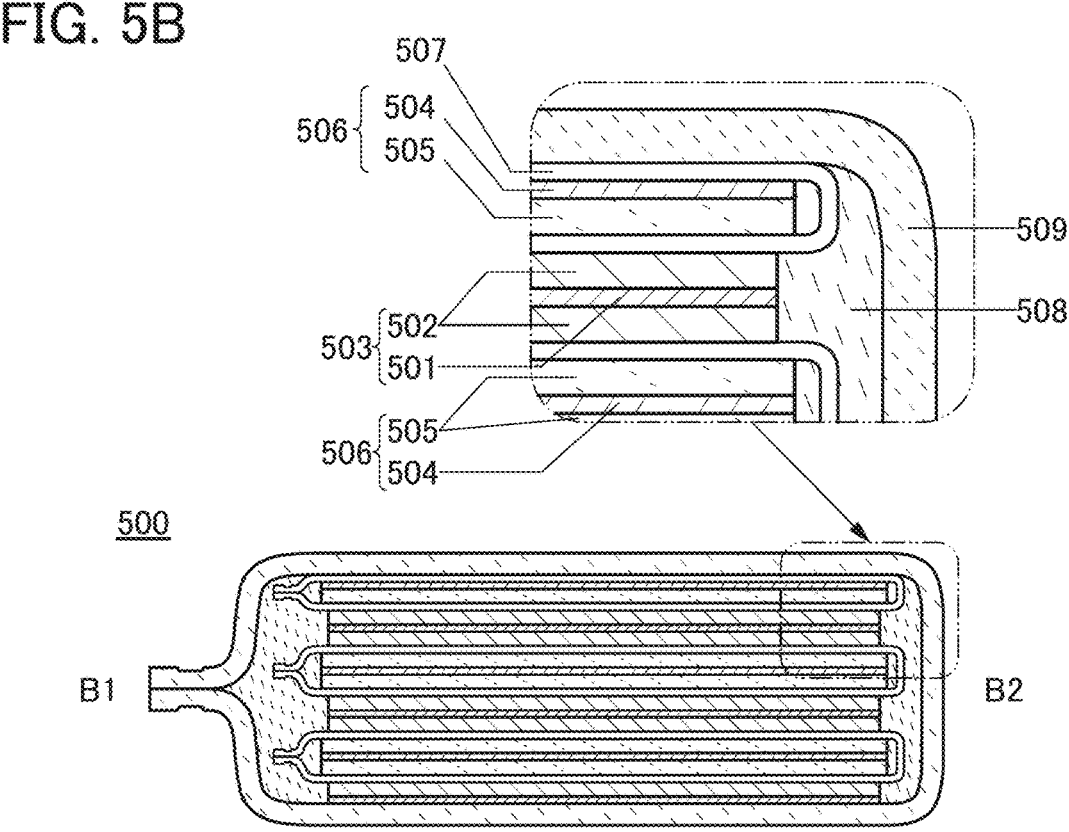

FIG. 4 is an external view of a storage battery 500, which is a thin storage battery. FIG. 5A is a cross-sectional view along dashed-dotted line A1-A2 in FIG. 4, and FIG. 5B is a cross-sectional view along dashed-dotted line B1-B2 in FIG. 4. The storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is contained in the exterior body 509.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gel polymer electrolyte obtained in such a manner that a polymer is swelled with an electrolytic solution may be used.

Examples of host polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 6A:
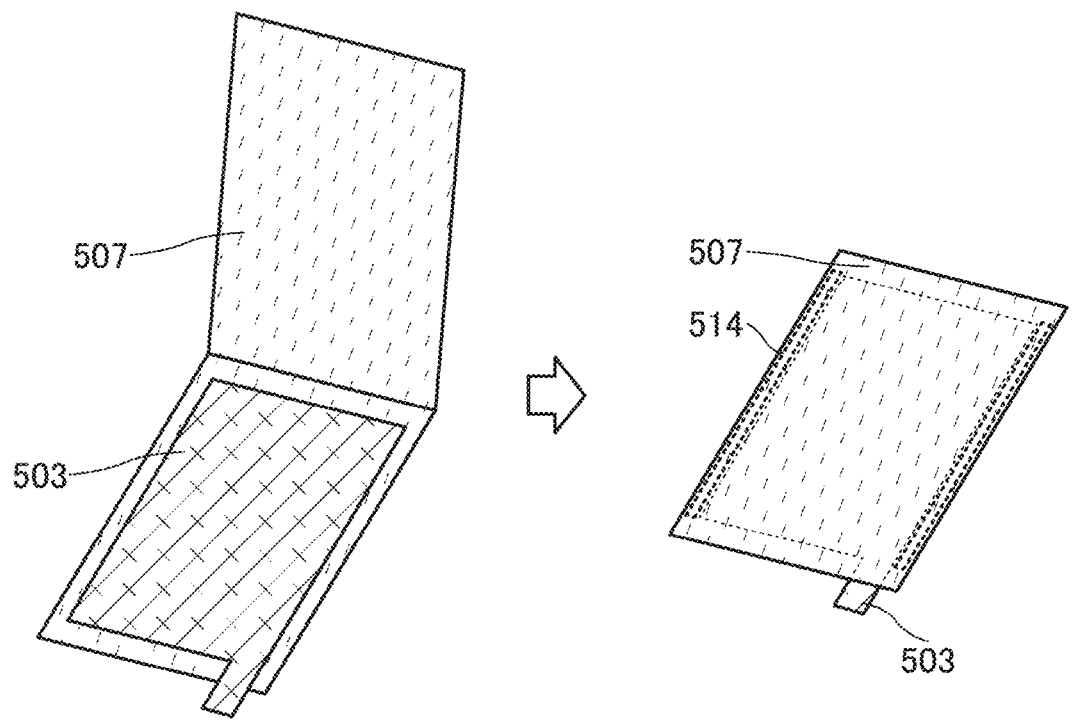
FIGS. 6A and 6B illustrate a method for fabricating a storage battery.
Figure 6B:
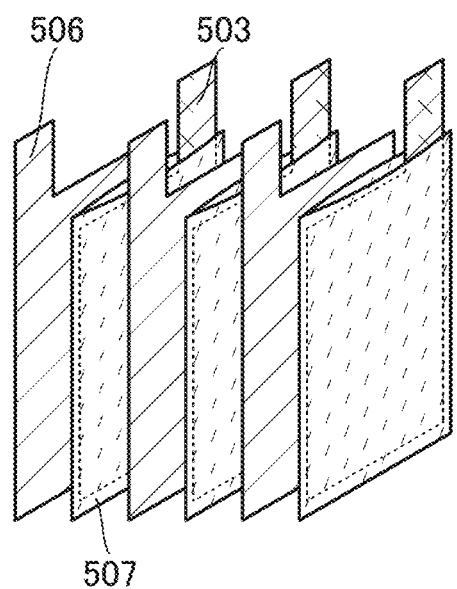

The separator 507 is preferably formed to have a bag-like shape to surround one of the positive electrode 503 and the negative electrode 506. For example, as illustrated in FIG. 6A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 6B, the positive electrodes 503 surrounded by the separators 507 and the negative electrodes 506 are alternately stacked and provided in the exterior body 509, whereby the storage battery 500 can be formed.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where the reaction potential of the positive electrode or the negative electrode is out of the range of the potential window of the electrolytic solution 508, the electrolytic solution is decomposed by charge and discharge operations of a storage battery in some cases. In the case where the electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased.

When the resistance is extremely increased, the negative electrode potential is lowered. Consequently, lithium is intercalated into graphite and lithium is deposited on the surface of graphite. The lithium deposition might reduce capacity. For example, if a film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the negative electrode potential reaches the potential of lithium because of an increase in a charging voltage.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a film on a surface of graphite. The formed coating film may thus be densified when the charging state is held at a temperature higher than room temperature after the release of the gas, for example.

Figure 7A:
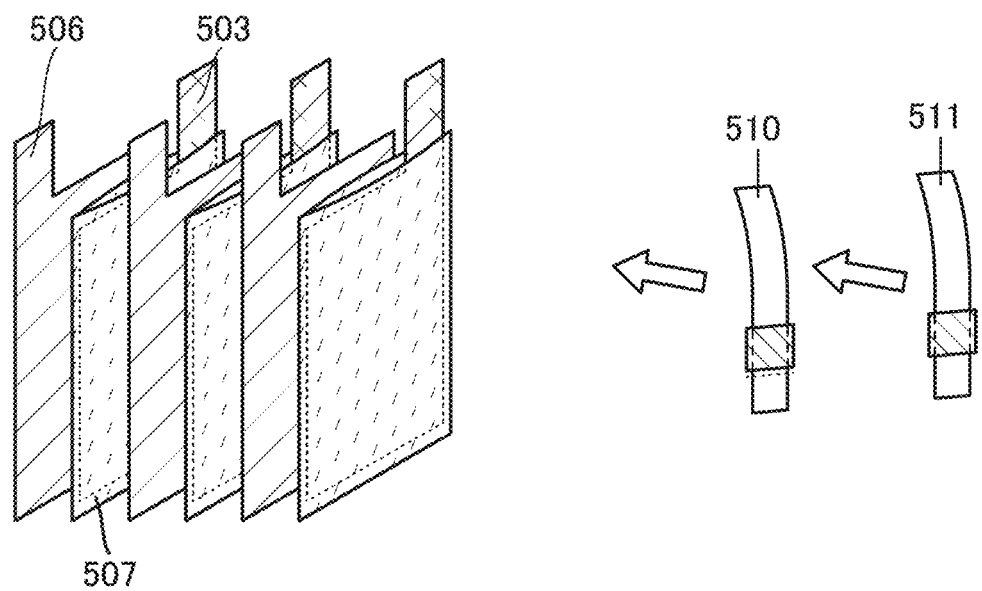
FIGS. 7A and 7B illustrate a method for fabricating a storage battery.
Figure 7B:
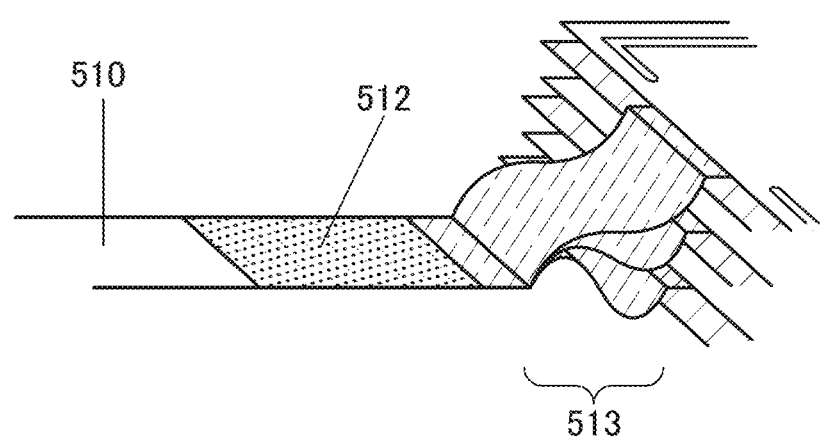

FIGS. 7A and 7B illustrate an example where current collectors are welded to a lead electrode. As illustrated in FIG. 7A, the positive electrodes 503 each wrapped by the separator 507 and the negative electrodes 506 are alternately stacked. Then, the positive electrode current collectors 501 are welded to the positive electrode lead electrode 510, and the negative electrode current collectors 504 are welded to the negative electrode lead electrode 511. FIG. 7B illustrates an example in which the positive electrode current collectors 501 are welded to the positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 7B, and it is therefore possible to relieve stress due to external force applied after fabrication of the storage battery 500. The reliability of the storage battery 500 can be thus increased.

In the storage battery 500 illustrated in FIG. 4 and FIGS. 5A and 5B, the positive electrode current collectors 501 in the positive electrode 503 and the negative electrode current collectors 504 in the negative electrode 506 are welded to the positive electrode lead electrode 510 and a negative electrode lead electrode 511, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside of the exterior body 509 without using lead electrodes.

Figure 8:
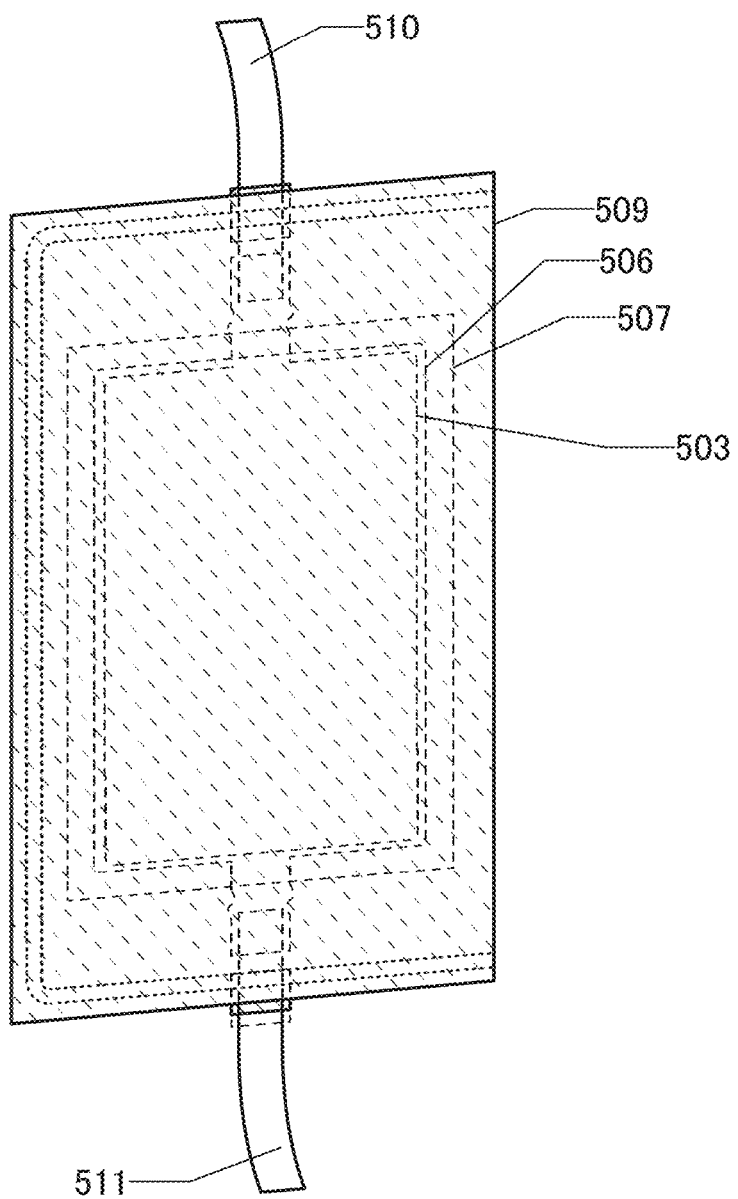
FIG. 8 illustrates a storage battery.

Although the positive electrode lead electrode 510 and the negative electrode lead electrode 511 are provided on the same side in FIG. 4, the positive electrode lead electrode 510 and the negative electrode lead electrode 511 may be provided on different sides as illustrated in FIG. 8. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 5A and 5B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of electrode active material layers, the storage battery can have a high capacity. In contrast, in the case of using a small number of electrode active material layers, the storage battery can have a small thickness and high flexibility.

[Predoping]

Figure 9A:
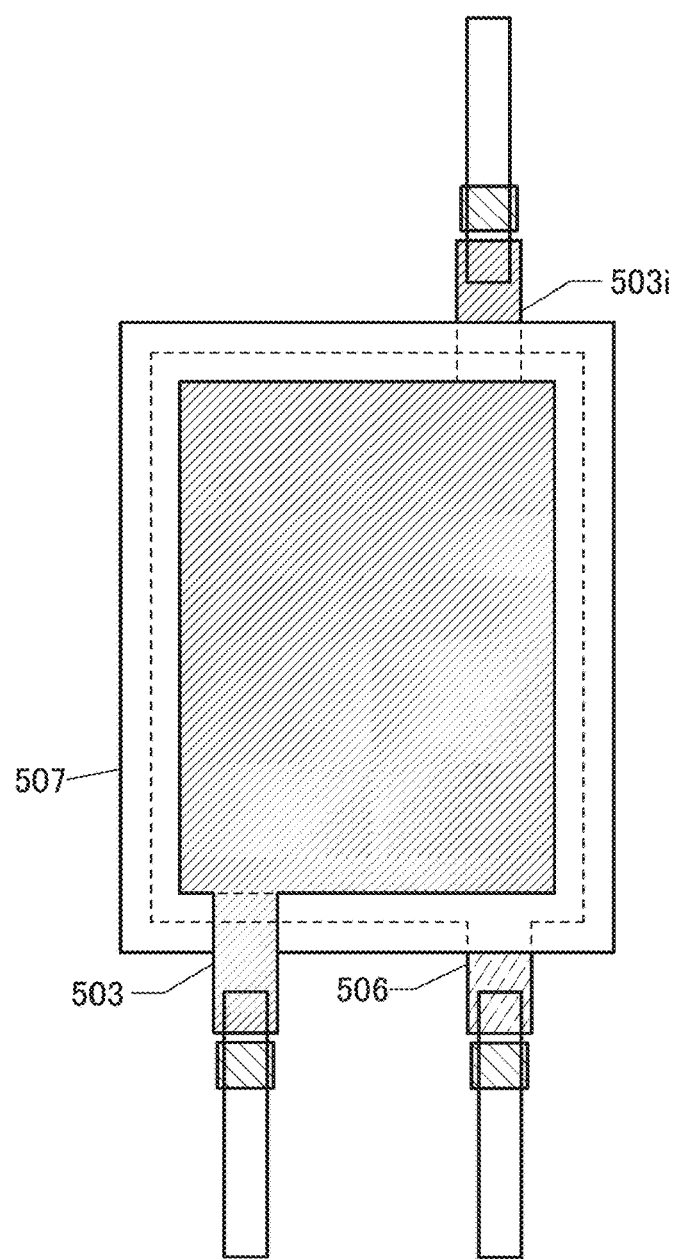
FIGS. 9A and 9B illustrate a method for fabricating a storage battery.
Figure 9B:
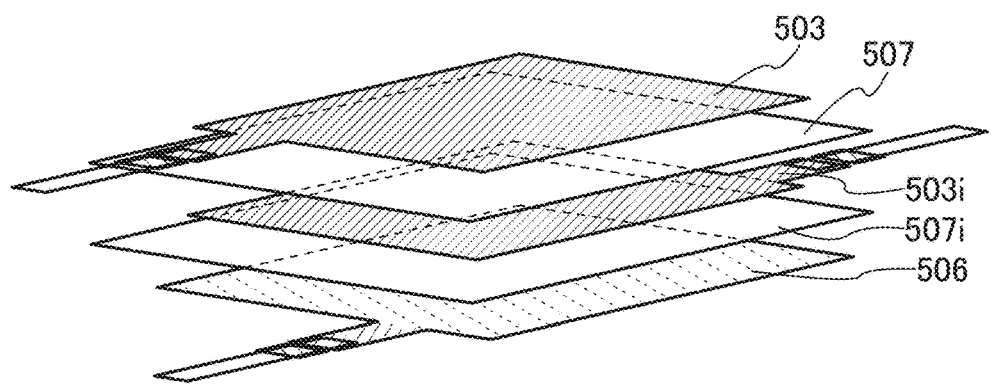

Here, an example of the case where the negative electrode 506 included in the storage battery 500 is predoped will be described. FIG. 9A illustrates the top surface of a stack in which positive electrodes, a negative electrode, and separators are stacked, and FIG. 9B is a perspective view of FIG. 9A. A separator 507i is stacked over the negative electrode 506, a positive electrode 503i for predoping is stacked over the separator 507i, the separator 507 is stacked over the positive electrode 503i, and the positive electrode 503 is stacked over the separator 507. Note that for the separator 507i, the description of the separator 507 can be referred to. The positive electrode 503i includes a positive electrode active material layer 502i and a positive electrode current collector 501i. For the positive electrode 503i, the positive electrode active material layer 502i, and the positive electrode current collector 501i, the respective descriptions of the positive electrode 503, the positive electrode active material layer 502, and the positive electrode current collector 501 can be referred to. The positive electrode 503 and the positive electrode 503i may include different positive electrode active materials.

Figure 10A:
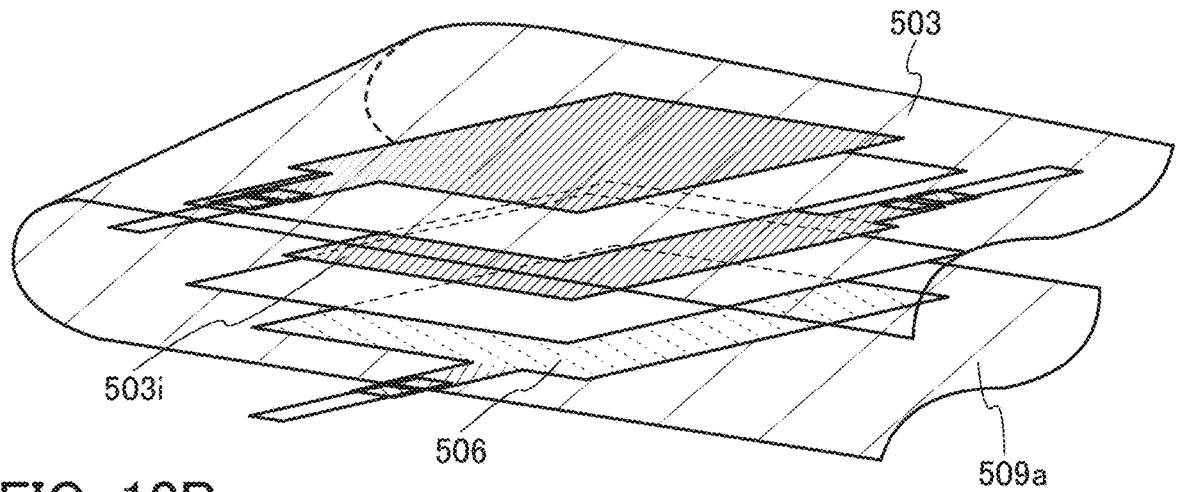
FIGS. 10A and 10B illustrate a method for fabricating a storage battery.

The stack illustrated in FIGS. 9A and 9B is sandwiched by a sheet 509a serving as an exterior body as in a perspective view of FIG. 10A.

Figure 10B:
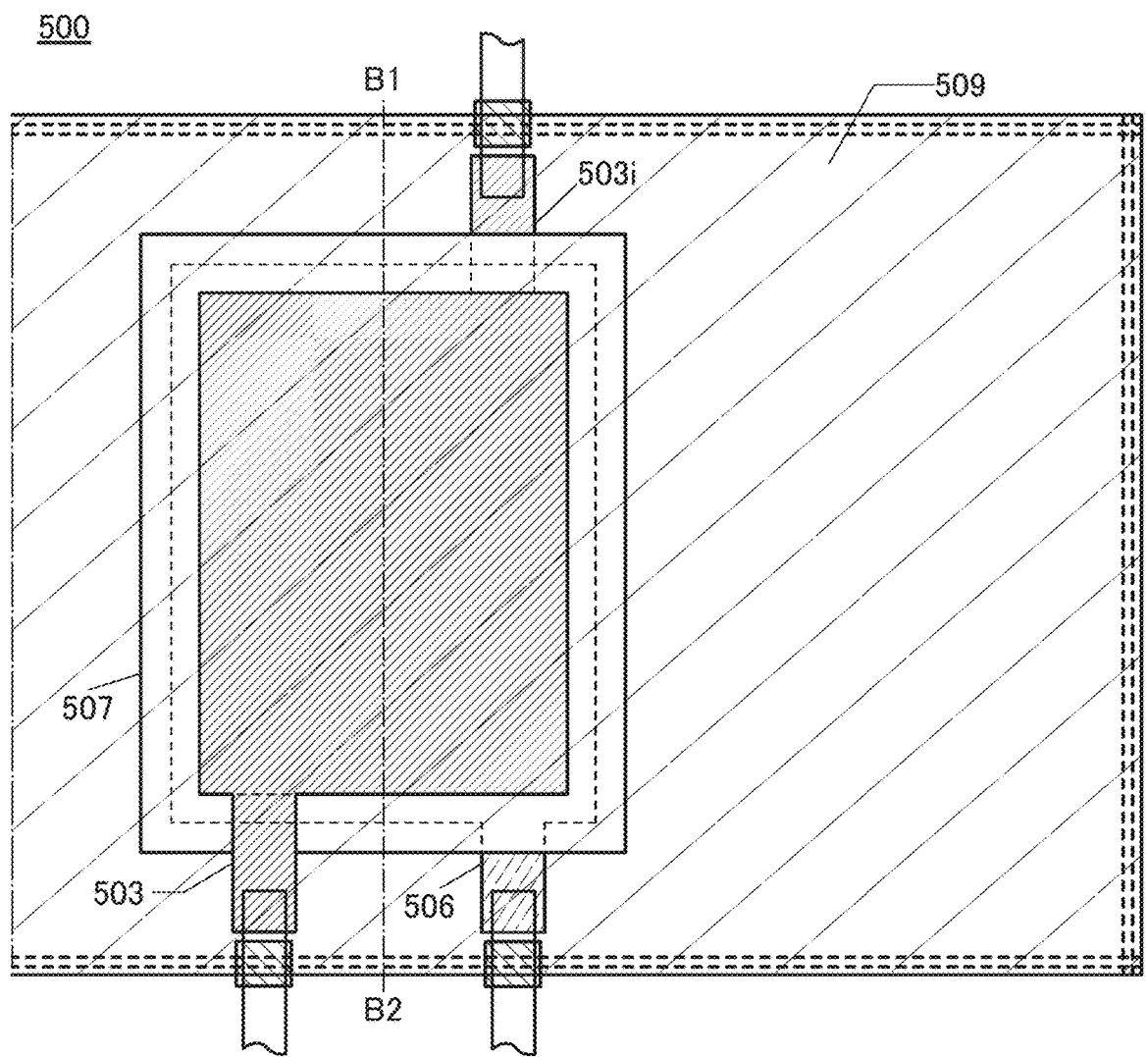
Figure 11A:
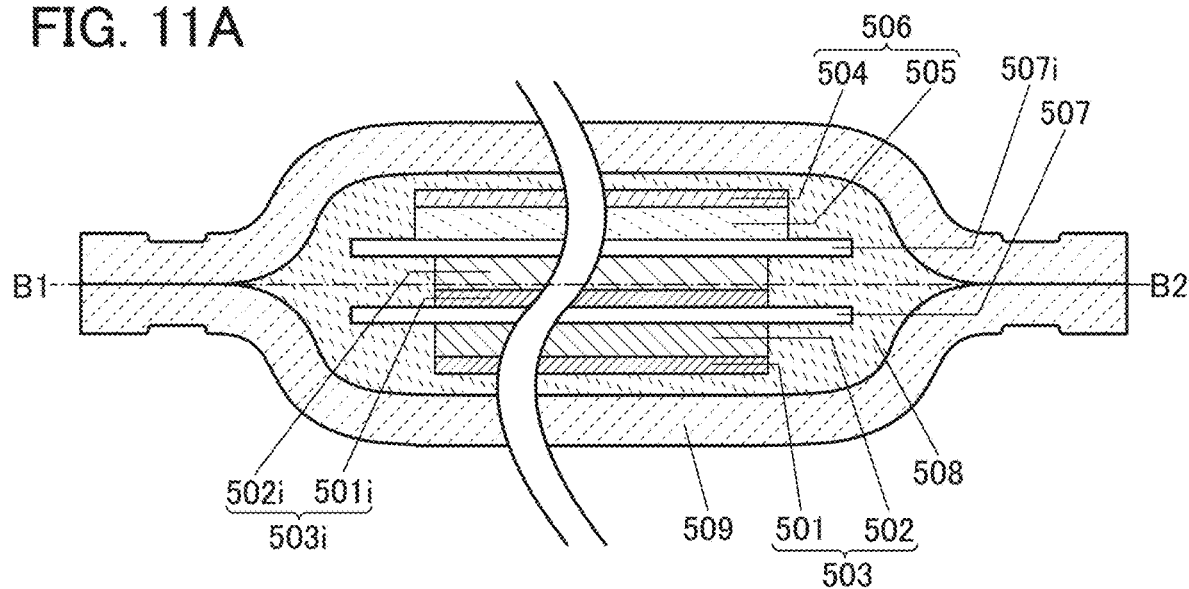
FIGS. 11A to 11C illustrate a method for fabricating a storage battery.

Then, three sides of the sheet 509a are sealed with heat or the like to form the exterior body 509, so that the storage battery 500, which is a thin storage battery, is fabricated, as in a top view of FIG. 10B. FIG. 11A is a cross-sectional view of the storage battery along the dashed-dotted line B1-B2 in FIG. 10B.

Then, predoping is performed using the negative electrode 506 and the positive electrode 503i of the fabricated storage battery 500. For the predoping, only charge or both charge and discharge can be performed, for example.

Figure 11B:
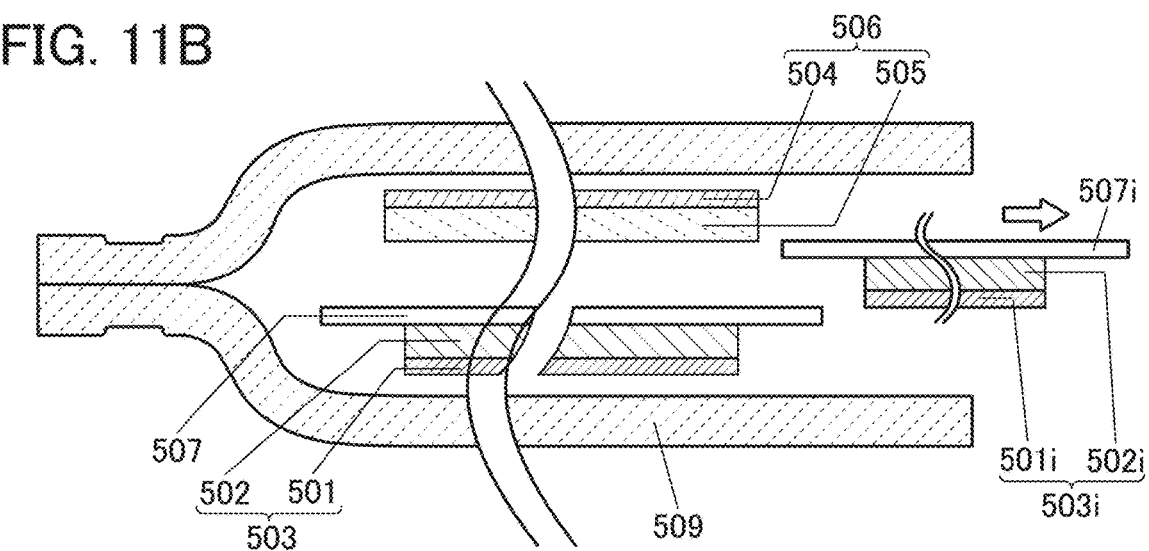

After the predoping, one side of the exterior body 509 is cut open. Then, as in a cross-sectional view of FIG. 11B, the positive electrode 503i and the separator 507i are taken out from the opened exterior body 509. At this time, the separator 507 may be taken out instead of the separator 507i. The separator 507i is not necessarily taken out and may be left in the storage battery 500.

Figure 11C:
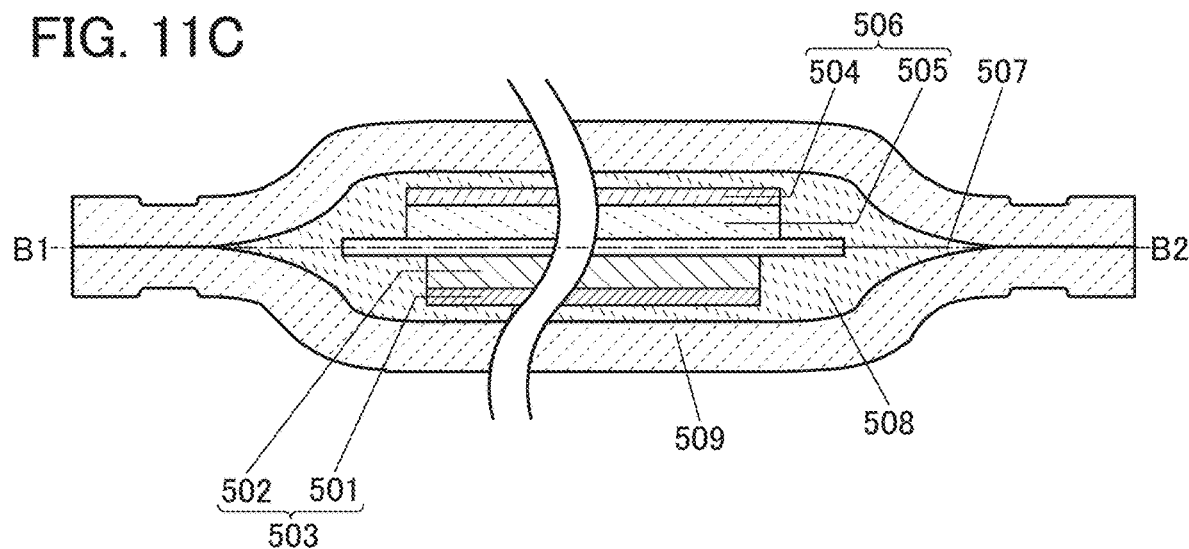

After that, the opened side of the exterior body 509 is sealed as in a cross-sectional view of FIG. 11C. Through the above process, predoping can be performed.

Figure 12A:
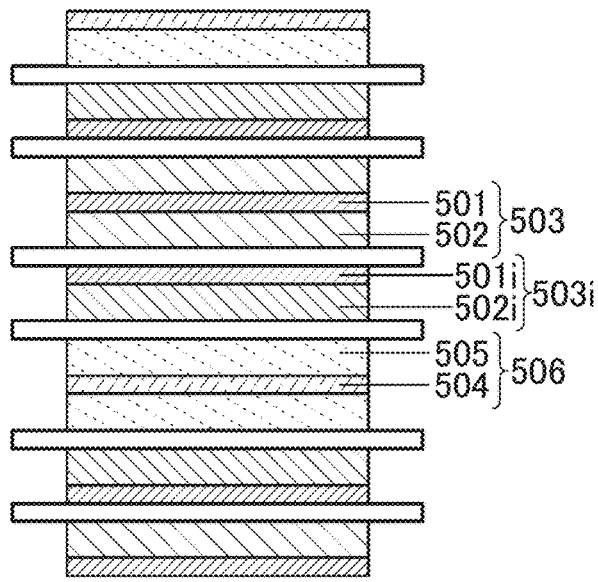
FIGS. 12A to 12C illustrate a method for fabricating a storage battery.
Figure 12B:
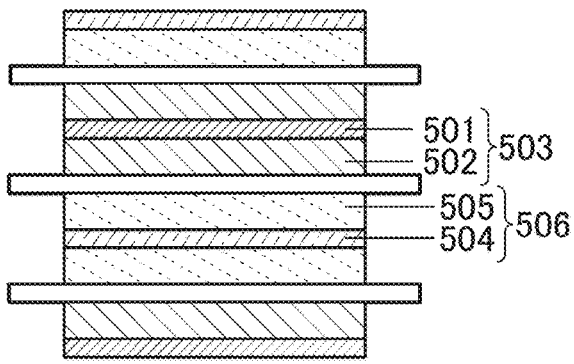
Figure 12C:
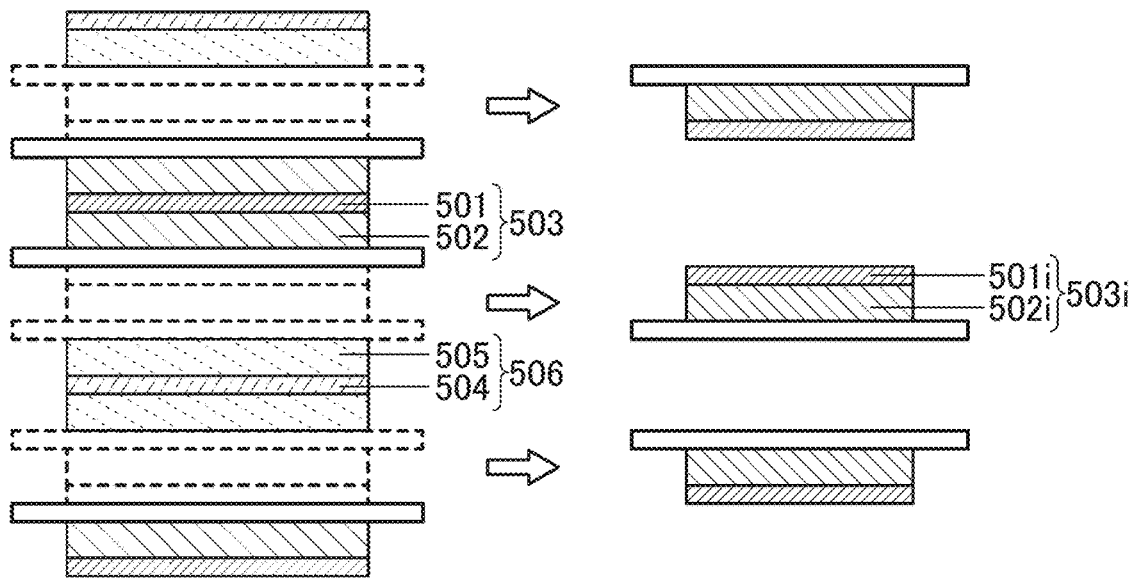

Although the example in FIGS. 9A to 9C to FIGS. 11A to 11C includes one positive-negative electrode active material layer pair (the positive and negative electrode active material layers face each other), the number of positive-negative electrode active material layer pairs when predoping is performed is not limited to one. The example in FIGS. 12A to 12C includes three positive-negative electrode active material layer pairs (the positive and negative electrode active material layers of each pair face each other). In FIG. 12A, the positive electrode 503i is located between the positive electrode 503 and the negative electrode 506 facing each other. First, predoping is performed using the positive electrode 503i and the negative electrode 506. After that, the positive electrode 503i are removed as illustrated in FIG. 12B, so that the storage battery is obtained in which three positive-negative electrode active material layer pairs are included and the positive and negative electrode active material layers of each pair face each other as illustrated in FIG. 12C.

In the above structure, the exterior body 509 of the secondary battery can change its form such that the smallest curvature radius is greater than or equal to 3 mm and less than or equal to 30 mm, preferably greater than or equal to 3 mm and less than or equal to 10 mm. One or two films are used as the exterior body of the storage battery. In the case where the storage battery has a layered structure, the storage battery has a cross section sandwiched by two curved surfaces of the films when it is bent.

Figure 13A:
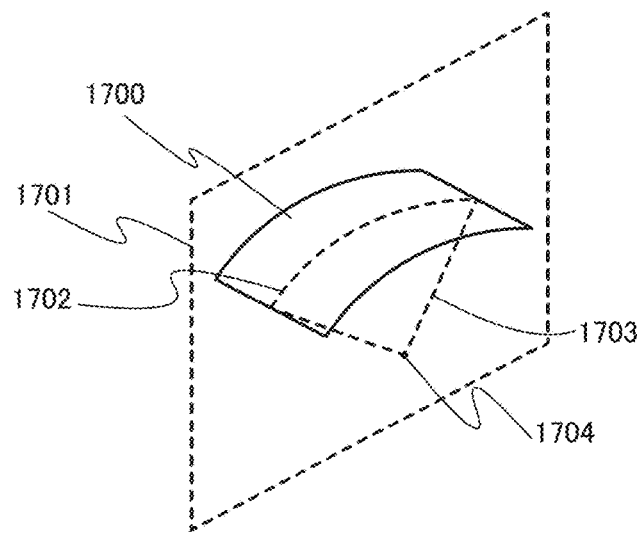
FIGS. 13A to 13C illustrate the curvature radius of a surface.
Figure 13B:
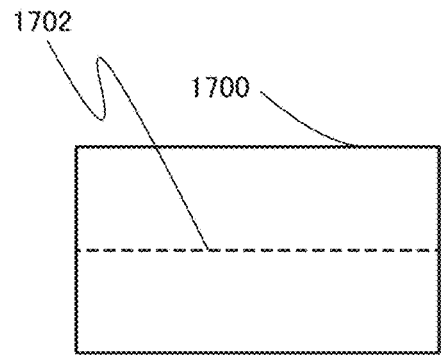
Figure 13C:
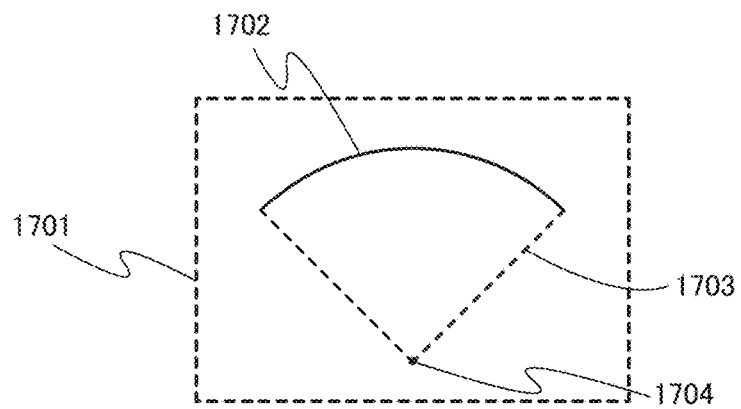

Description will be given of the radius of curvature of a surface with reference to FIGS. 13A to 13C. In FIG. 13A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 13B is a top view of the curved surface 1700. FIG. 13C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 14A:
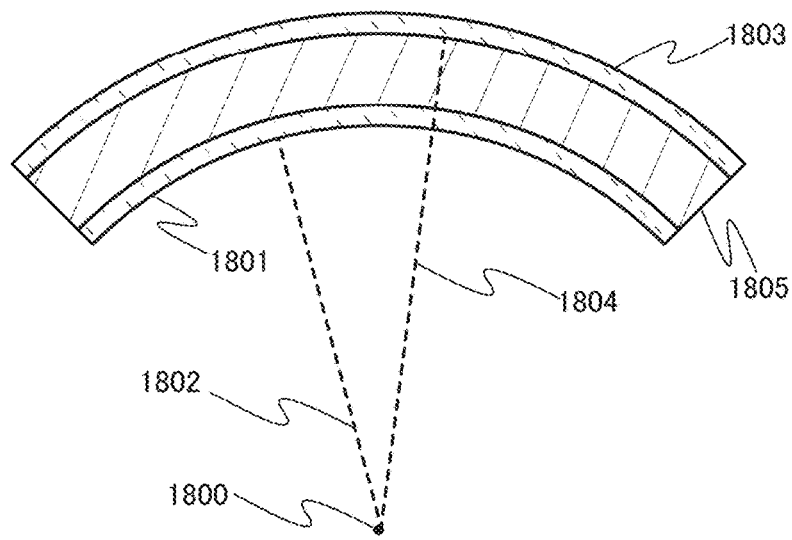
FIGS. 14A to 14D illustrate the curvature radius of a film.
Figure 14B:
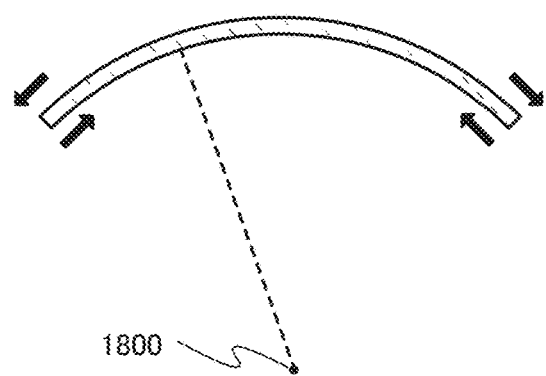

In the case of bending a secondary battery in which a component 1805 including electrodes, an electrolytic solution, and the like is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 14A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 14B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 14C:
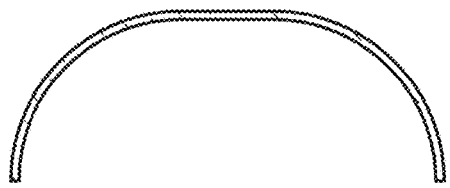
Figure 14D:
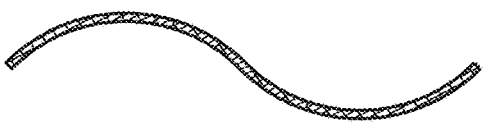

Note that the cross-sectional shape of the secondary battery is not limited to a simple arc shape, and the cross section can be partly arc-shaped; for example, a shape illustrated in FIG. 14C, a wavy shape illustrated in FIG. 14D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 17A:
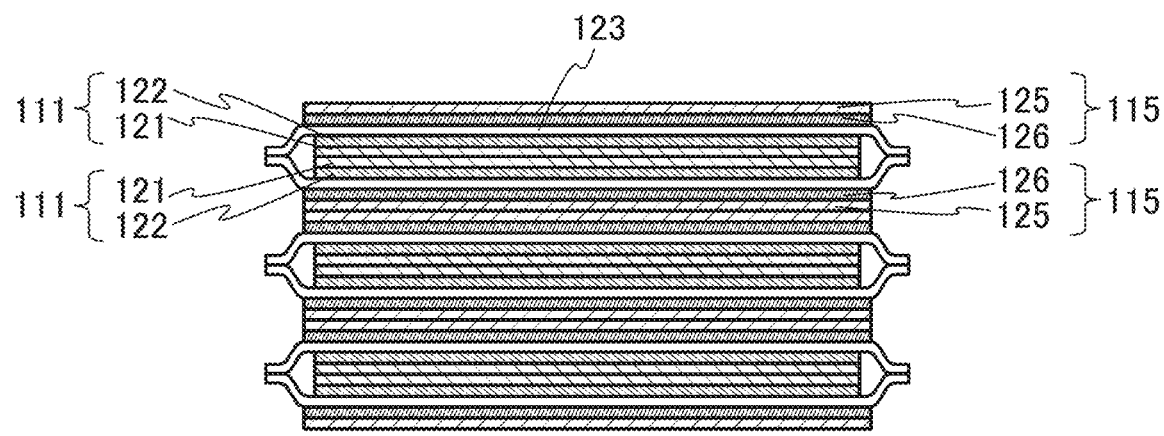
FIGS. 17A to 17C are each a part of a cross-sectional view of a storage battery.

FIG. 17A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 17A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the storage battery 500 is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body 509 of the storage battery 500 in the case where the storage battery 500 is curved, for example. Therefore, the deterioration of the storage battery 500 can be inhibited. Furthermore, the storage battery 500 can have high reliability.

Figure 17B:
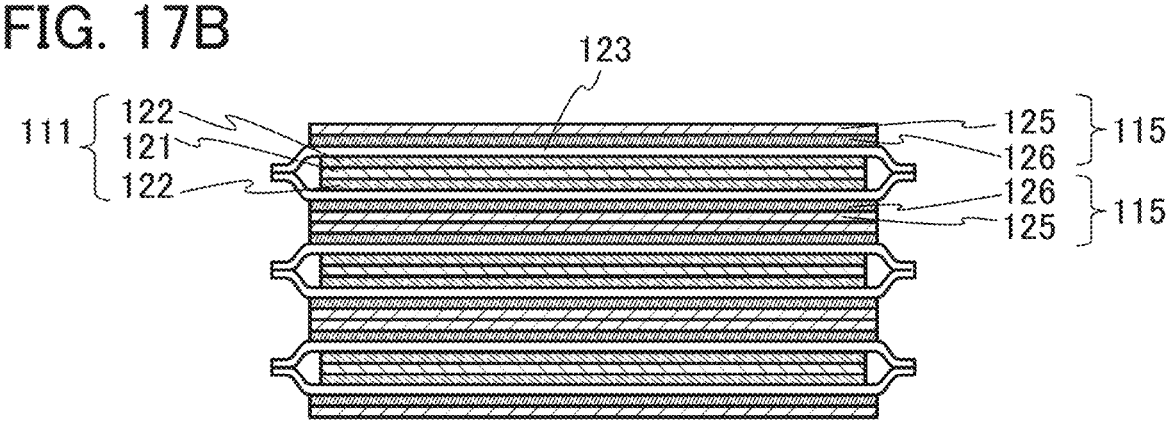

FIG. 17B illustrates an example of a stack of the positive electrodes 111 and the negative electrodes 115 which is different from that in FIG. 17A. The structure illustrated in FIG. 17B is different from that in FIG. 17A in that the positive electrode active material layers 122 are provided on both surfaces of the positive electrode current collector 121. When the positive electrode active material layers 122 are provided on both the surfaces of the positive electrode current collector 121 as illustrated in FIG. 17B, the capacity per unit volume of the storage battery 500 can be increased.

Figure 17C:
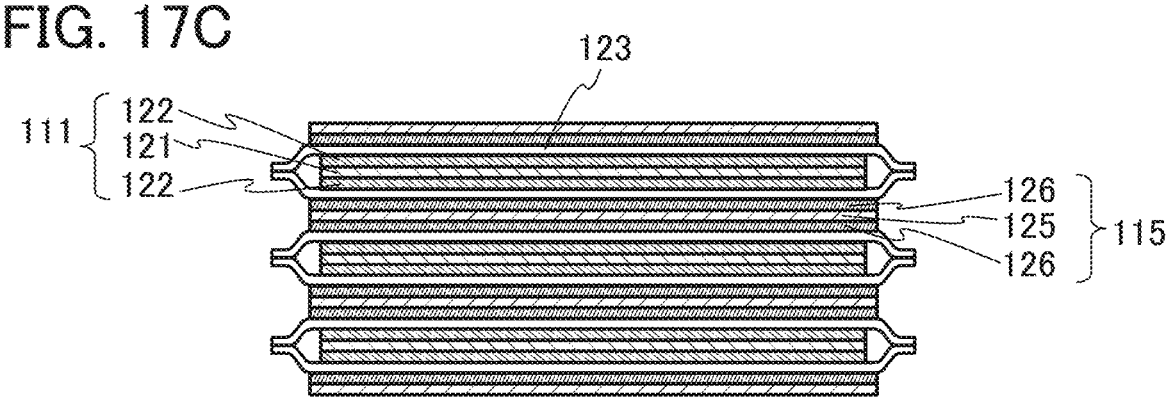

FIG. 17C illustrates an example of a stack of the positive electrodes 111 and the negative electrodes 115 which is different from that in FIG. 17B. The structure illustrated in FIG. 17C is different from that in FIG. 17B in that the negative electrode active material layers 126 are provided on both surfaces of the negative electrode current collector 125. When the negative electrode active material layers 126 are provided on both the surfaces of the negative electrode current collector 125 as illustrated in FIG. 17C, the capacity per unit volume of the storage battery 500 can be further increased.

Figure 18A:
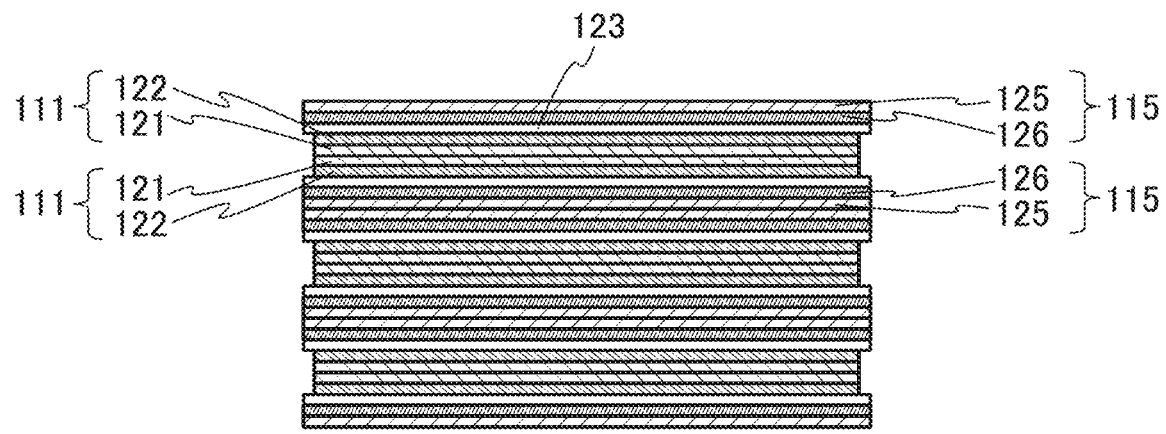
FIGS. 18A and 18B are each a part of a cross-sectional view of a storage battery.

In the structures illustrated in FIGS. 17A to 17C, the separator 123 has a bag-like shape by which the positive electrodes 111 are surrounded; however, one embodiment of the present invention is not limited thereto. FIG. 18A illustrates an example in which the separator 123 has a different structure from that in FIG. 17A. The structure illustrated in FIG. 18A is different from that in FIG. 17A in that the separator 123, which is sheet-like, is provided between every pair of the positive electrode active material layer 122 and the negative electrode active material layer 126. In the structure illustrated in FIG. 18A, six positive electrodes 111 and six negative electrodes 115 are stacked, and six separators 123 are provided.

Figure 18B:
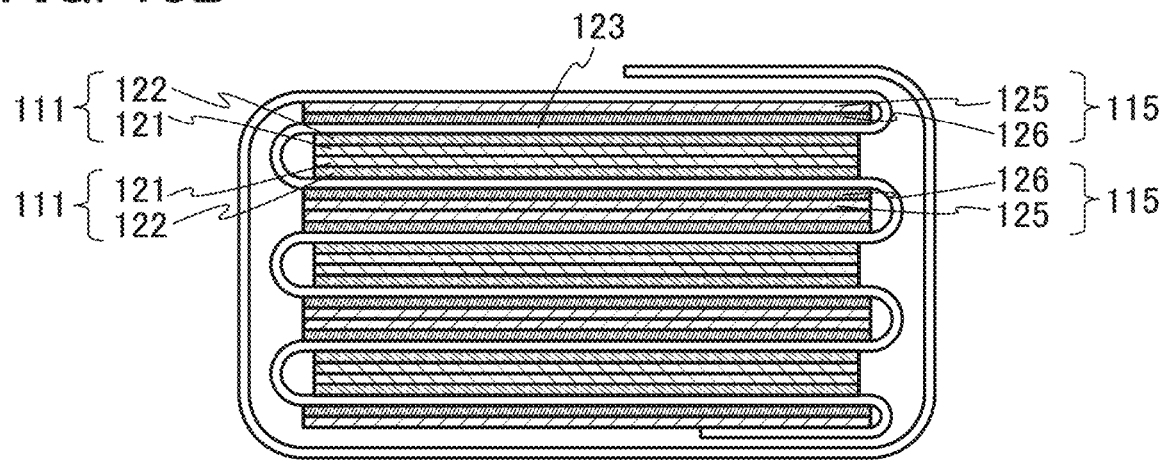

FIG. 18B illustrates an example in which the separator 123 different from that in FIG. 18A is provided. The structure illustrated in FIG. 18B is different from that in FIG. 18A in that one sheet of separator 123 is folded more than once to be interposed between every pair of the positive electrode active material layer 122 and the negative electrode active material layer 126. It can be said that the structure illustrated in FIG. 18B is a structure in which the separators 123 in the respective layers which are illustrated in FIG. 18A are extended and connected together between the layers. In the structure of FIG. 18B, six positive electrodes 111 and six negative electrodes 115 are stacked and thus the separator 123 needs to be folded at least five times. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 19A:
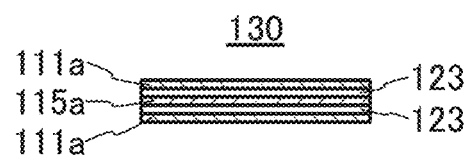
FIGS. 19A to 19C are parts of cross-sectional views of a storage battery.
Figure 19B:
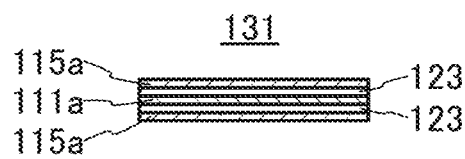
Figure 19C:
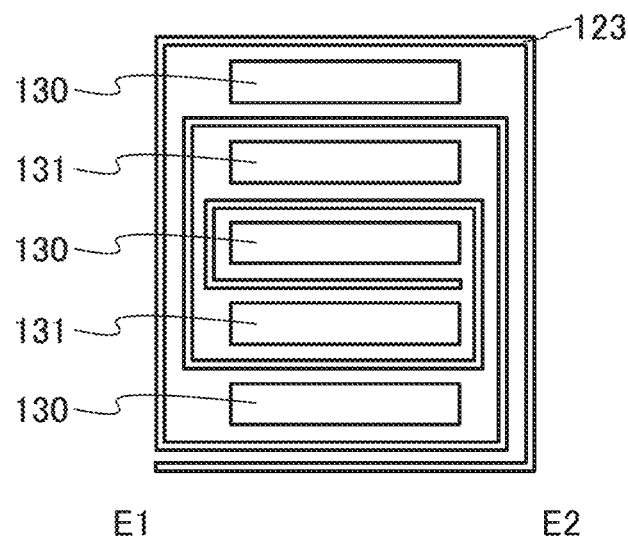

Note that the positive electrode, the negative electrode, and the separator may be stacked as illustrated in FIGS. 19A to 19C. FIG. 19A is a cross-sectional view of a first electrode assembly 130, and FIG. 19B is a cross-sectional view of a second electrode assembly 131. FIG. 19C is a cross-sectional view taken along the dashed-dotted line A1-A2 in FIG. 4. In FIG. 19C, the first electrode assembly 130, the second electrode assembly 131, and the separator 123 are selectively illustrated for the sake of clarity.

As illustrated in FIG. 19C, the storage battery 500 includes a plurality of first electrode assemblies 130 and a plurality of second electrode assemblies 131.

As illustrated in FIG. 19A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 19B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 19C, the plurality of first electrode assemblies 130 and the plurality of second electrode assemblies 131 are covered with the wound separator 123.

[Coin-type Storage Battery]

Figure 15A:
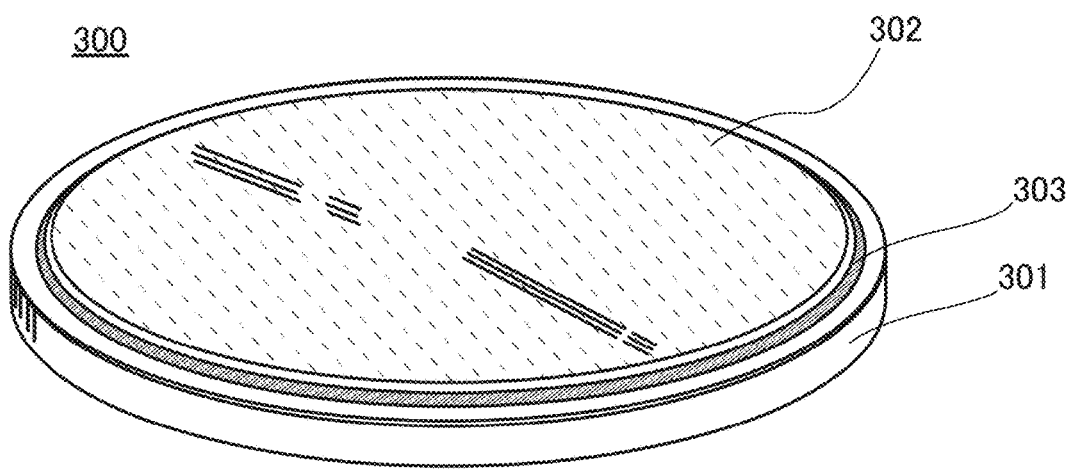
FIGS. 15A and 15B illustrate a coin-type storage battery.
Figure 15B:
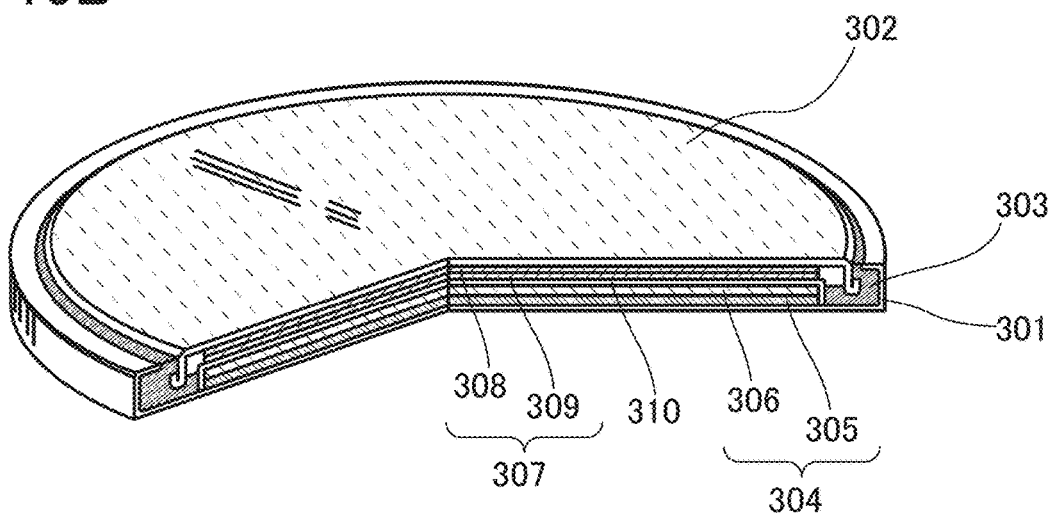

Next, an example of a coin-type storage battery will be described as an example of a power storage device with reference to FIGS. 15A and 15B. FIG. 15A is an external view of a coin-type (single-layer flat type) storage battery, and FIG. 15B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 15B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 16A:
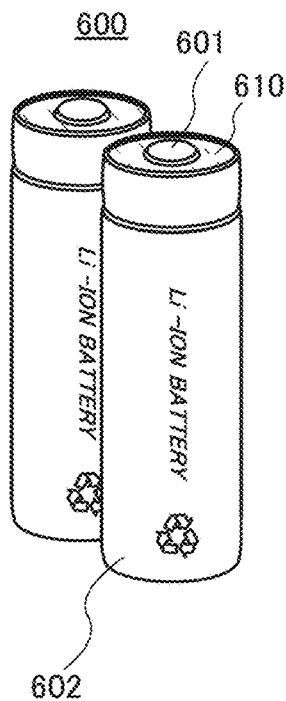
FIGS. 16A and 16B illustrate a cylindrical storage battery.

Next, an example of a cylindrical storage battery will be described as an example of a power storage device with reference to FIGS. 16A and 16B. As illustrated in FIG. 16A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 16B:
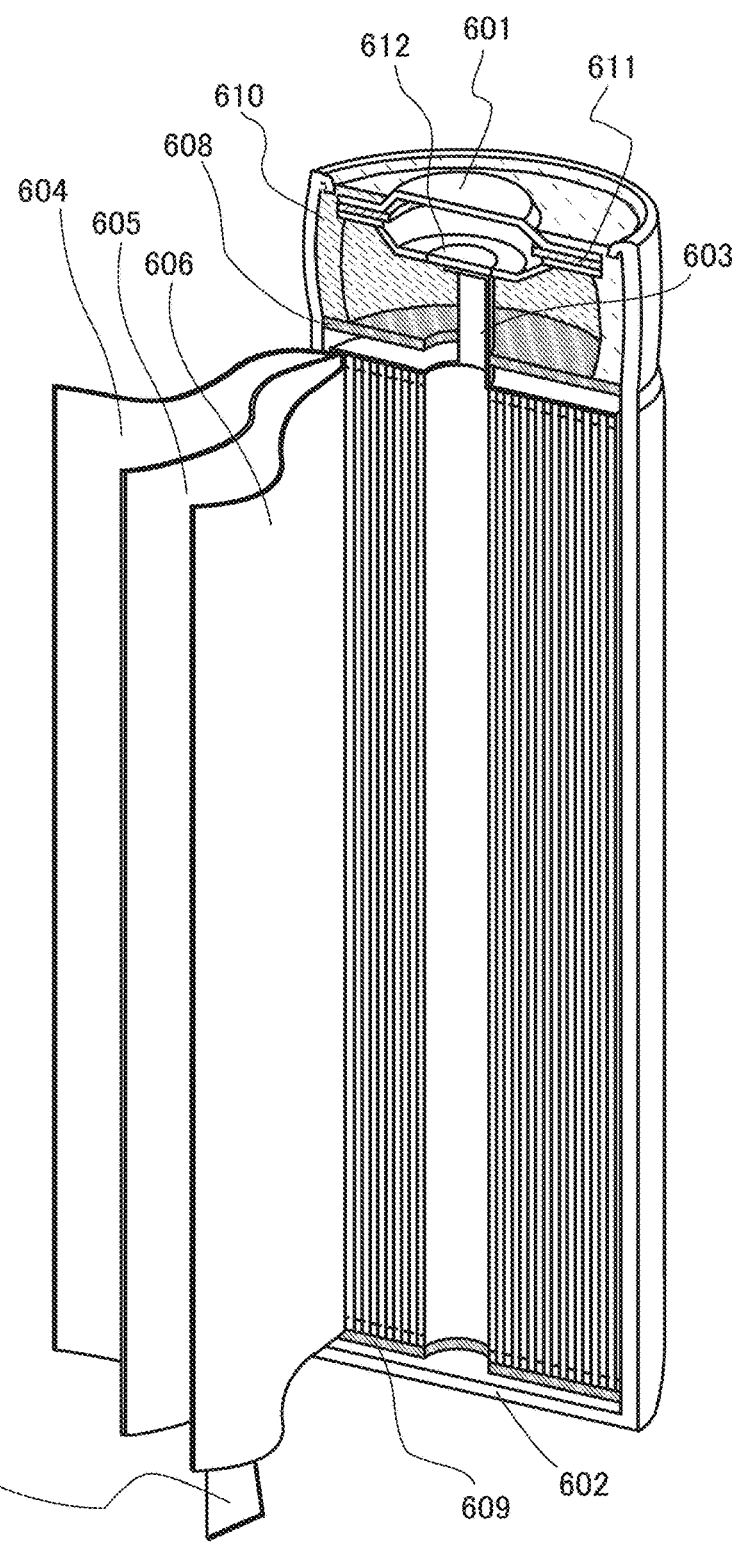

FIG. 16B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The description of the positive electrode 503 can be referred to for the positive electrode 604. The description of the negative electrode 506 can be referred to for the negative electrode 606. The description of the method for fabricating an electrode that is described in Embodiment 1 can be referred to for the positive electrode 604 and the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 16A and 16B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 20A to 20C to FIGS. 24A and 24B illustrate examples of other storage batteries.

<Structural Example of Thin Storage Battery>

FIGS. 20A to 20C and FIGS. 21A to 21C illustrate structural examples of thin storage batteries. A wound body 993 illustrated in FIG. 20A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 20A:
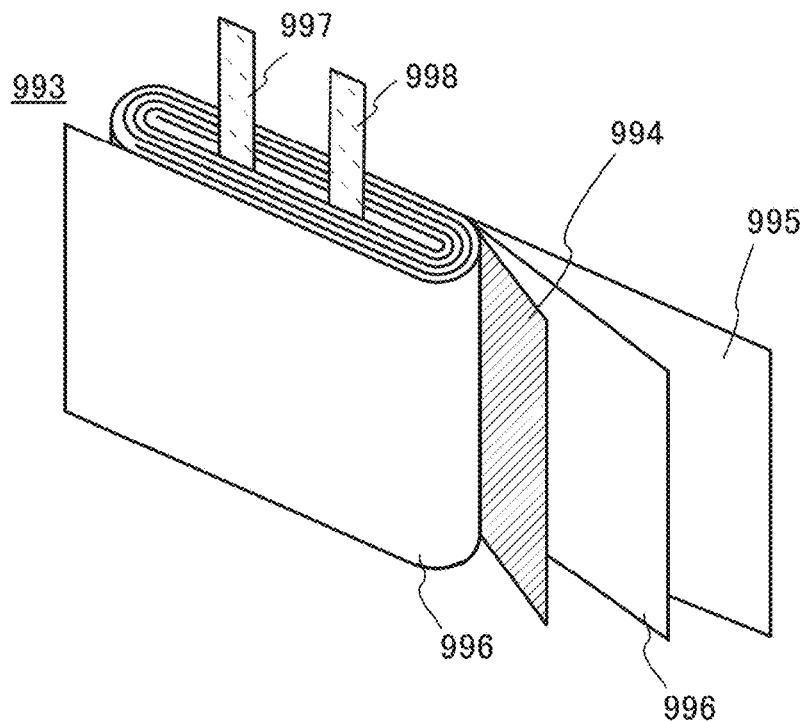
FIGS. 20A to 20C illustrate an example of a storage battery.
Figure 20B:
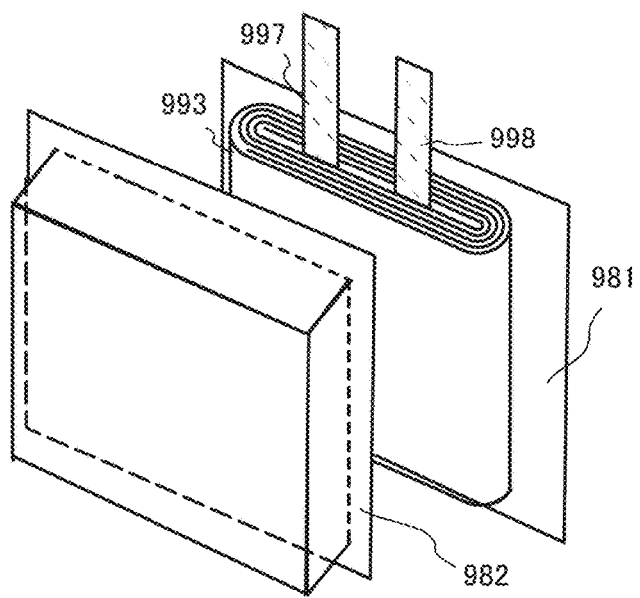
Figure 20C:
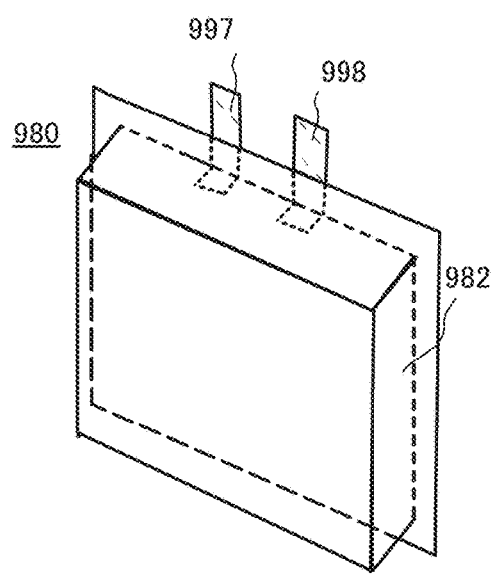

In a storage battery 990 illustrated in FIGS. 20B and 20C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 20B and 20C illustrate an example where a space is formed by two films, the wound body 993 may be placed in a space formed by bending one film.

Furthermore, in fabricating a flexible power storage device, a resin material or the like can be used for an exterior body and a sealed container of the power storage device. In that case, a resin material or the like is used for the exterior body and the sealed container. Note that in the case where a resin material is used for the exterior body and the sealed container, a conductive material is used for a portion connected to the outside.

For example, FIGS. 21B and 21C illustrate another example of a flexible thin storage battery. The wound body 993 illustrated in FIG. 21A is the same as that illustrated in FIG. 20A, and the detailed description thereof is omitted.

In the storage battery 990 illustrated in FIGS. 21B and 21C, the wound body 993 is packed in an exterior body 991.

The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the cycle performance of the battery can be improved.

<Structural Example of Power Storage System>

Structural examples of power storage systems will be described with reference to FIGS. 22A and 22B to FIGS. 24A and 24B. Here, a power storage system refers to, for example, a device including a power storage device.

Figure 22A:
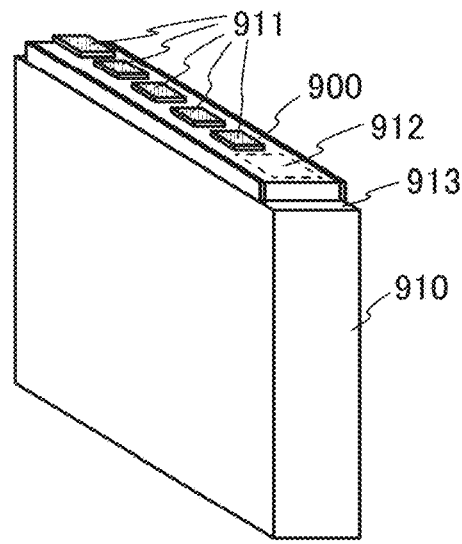
FIGS. 22A and 22B illustrate an example of a power storage system.
Figure 22B:
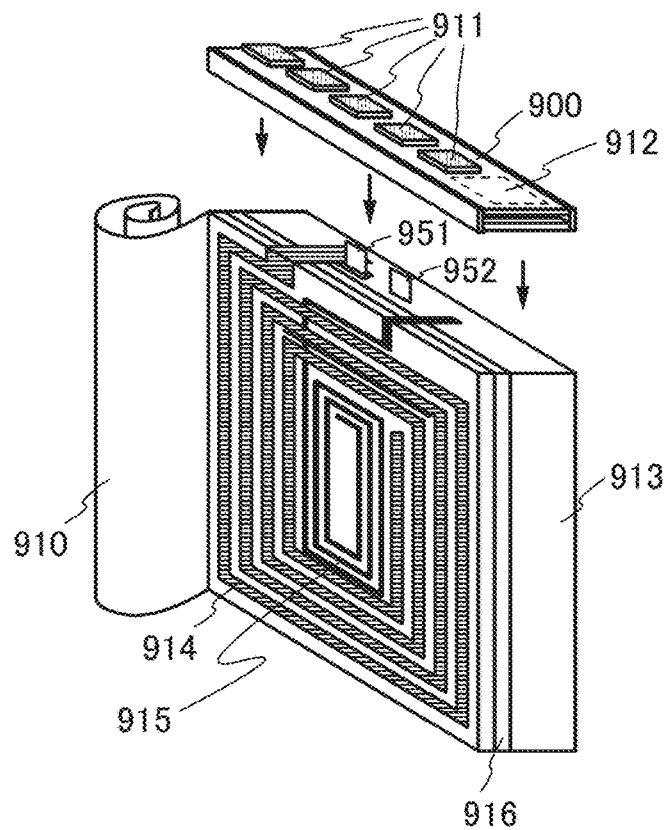

FIGS. 22A and 22B are external views of a power storage system. The power storage system includes a circuit board 900 and a storage battery 913. A label 910 is attached to the storage battery 913. As shown in FIG. 22B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 22A and 22B.

For example, as shown in FIGS. 23A1 and 23A2, two opposite surfaces of the storage battery 913 in FIGS. 22A and 22B may be provided with respective antennas. FIG. 23A1 is an external view showing one side of the opposite surfaces, and FIG. 23A2 is an external view showing the other side of the opposite surfaces. For portions similar to those in FIGS. 22A and 22B, the description of the power storage system illustrated in FIGS. 22A and 22B can be referred to as appropriate.

As illustrated in FIG. 23A1, the antenna 914 is provided on one of the opposite surfaces of the storage battery 913 with the layer 916 interposed therebetween, and as illustrated in FIG. 23A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 23B1 and 23B2, two opposite surfaces of the storage battery 913 in FIGS. 22A and 22B may be provided with different types of antennas. FIG. 23B1 is an external view showing one side of the opposite surfaces, and FIG. 23B2 is an external view showing the other side of the opposite surfaces. For portions similar to those in FIGS. 22A and 22B, the description of the power storage system illustrated in FIGS. 22A and 22B can be referred to as appropriate.

As illustrated in FIG. 23B1, the antenna 914 is provided on one of the opposite surfaces of the storage battery 913 with the layer 916 interposed therebetween, and as illustrated in FIG. 23B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 24A:
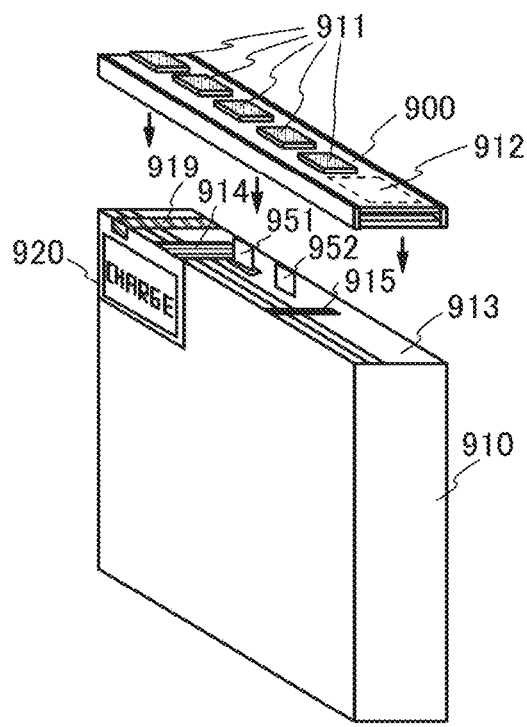
FIGS. 24A and 24B illustrate an example of a power storage system.

Alternatively, as illustrated in FIG. 24A, the storage battery 913 in FIGS. 22A and 22B may be provided with a display device 920. The display device 920 is electrically connected to the terminal 911 via a terminal 919. It is possible that the label 910 is not provided in a portion where the display device 920 is provided. For portions similar to those in FIGS. 22A and 22B, the description of the power storage system illustrated in FIGS. 22A and 22B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 24B:
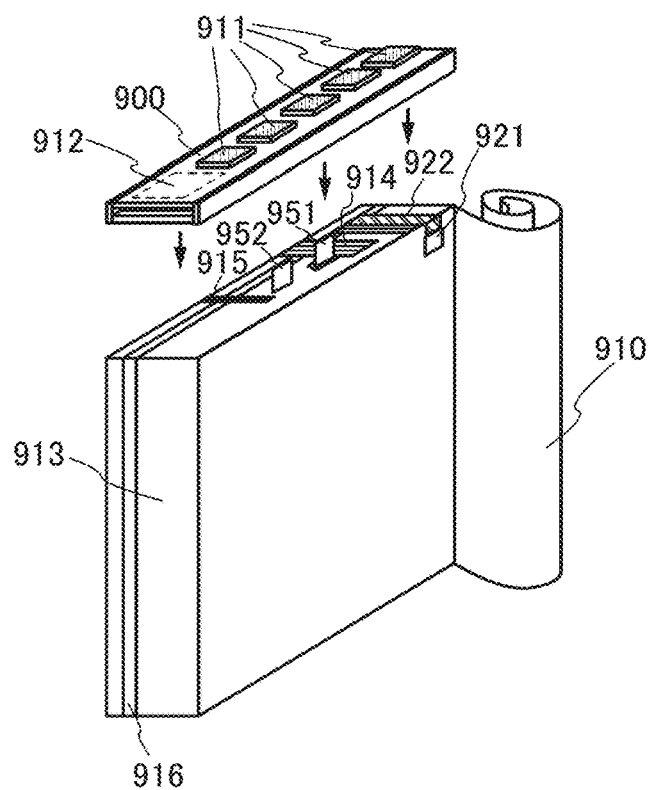

Alternatively, as illustrated in FIG. 24B, the storage battery 913 illustrated in FIGS. 22A and 22B may be provided with a sensor 921. The sensor 921 is electrically connected to the terminal 911 via a terminal 922. For portions similar to those in FIGS. 22A and 22B, the description of the power storage system illustrated in FIGS. 22A and 22B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used.

With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

(Embodiment 3)

In this embodiment, an example of an electronic device including a flexible power storage device will be described. FIGS. 25A to 25G illustrate examples of electronic devices including the flexible power storage devices described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 25A:
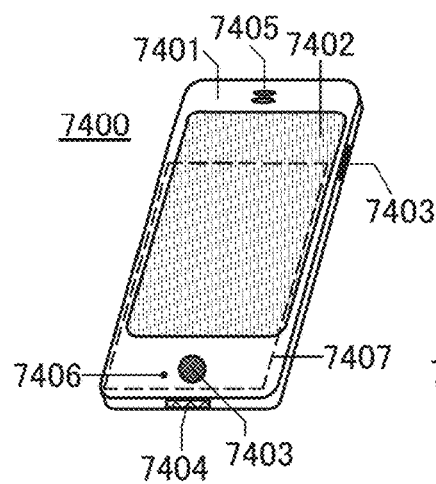
FIGS. 25A to 25G illustrate examples of electronic devices.

FIG. 25A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 25B:
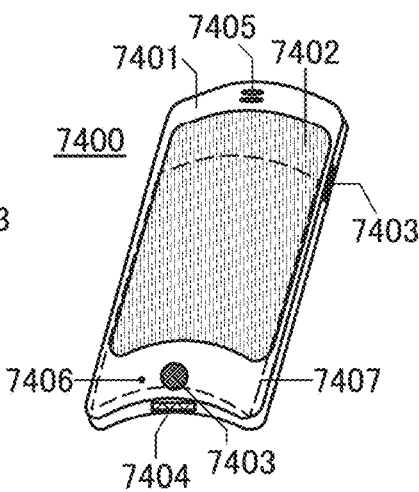
Figure 25C:
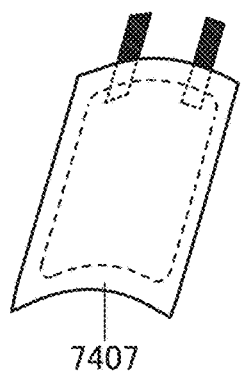

FIG. 25B illustrates the mobile phone 7400 that is bent. When the whole mobile phone 7400 is bent by the external force, the power storage device 7407 included in the mobile phone 7400 is also bent. FIG. 25C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 25D:
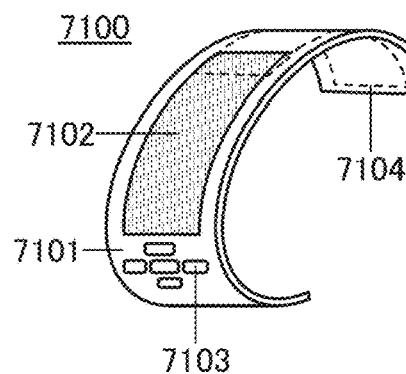
Figure 25E:
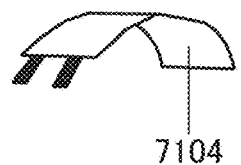

FIG. 25D illustrates an example of a bangle display device. A portable display device 7100 includes a housing 7101, a display portion 7102, an operation button 7103, and a power storage device 7104. FIG. 25E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 25F:
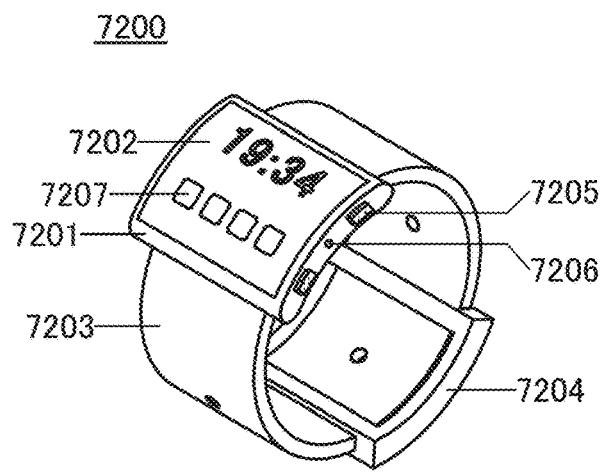

FIG. 25F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 25E that is in the state of being curved can be provided in the housing 7201. Alternatively, the power storage device 7104 illustrated in FIG. 25E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 25G:
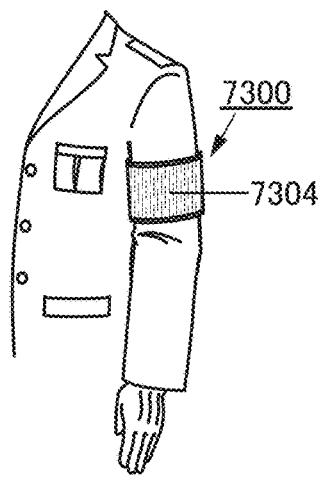

FIG. 25G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

(Embodiment 4)

In this embodiment, examples of electronic devices that can include power storage devices will be described.

Figure 26A:
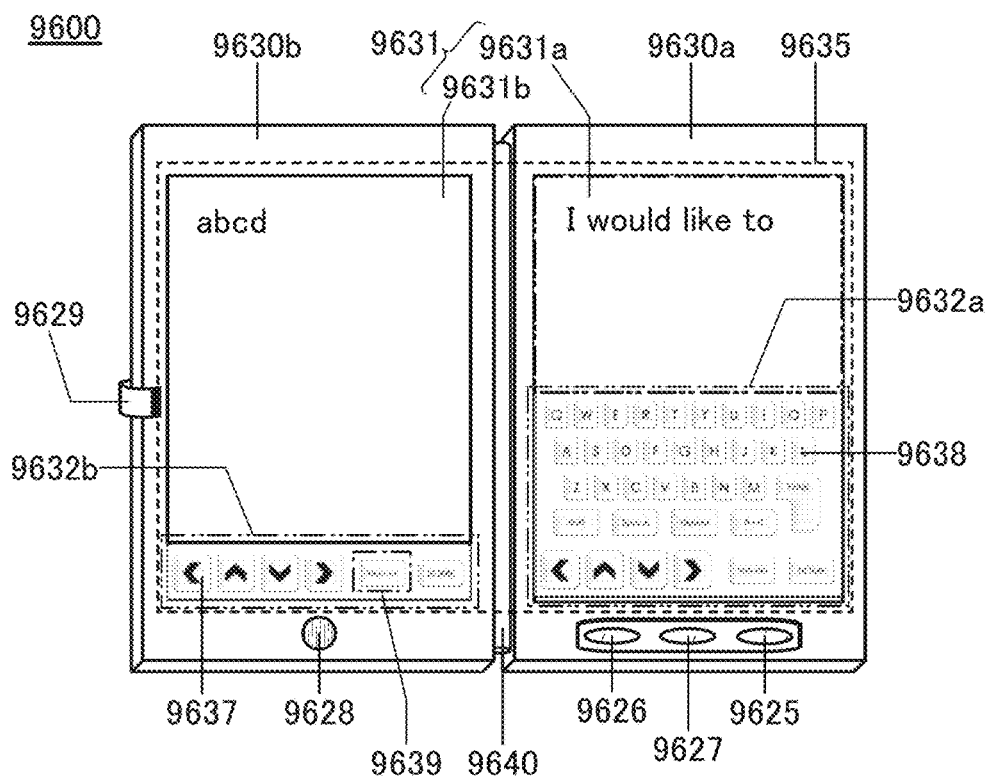
FIGS. 26A to 26C illustrate an example of an electronic device.
Figure 26B:
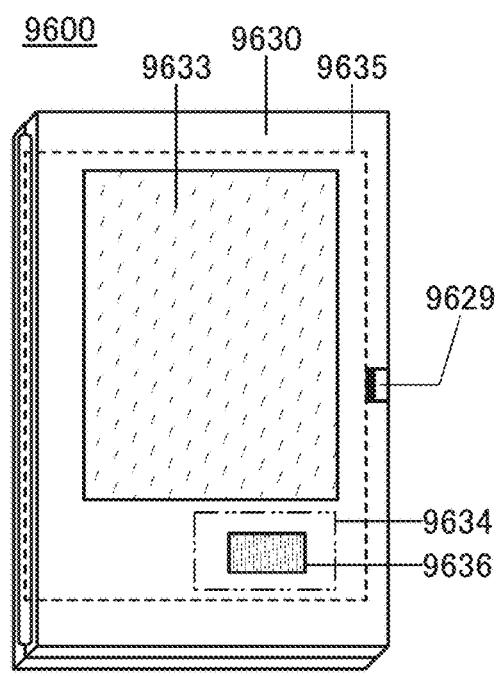

FIGS. 26A and 26B illustrate an example of a tablet terminal that can be folded in half. A tablet terminal 9600 illustrated in FIGS. 26A and 26B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 26A illustrates the tablet terminal 9600 that is opened, and FIG. 26B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 26A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 26B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 26A and 26B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 26C:
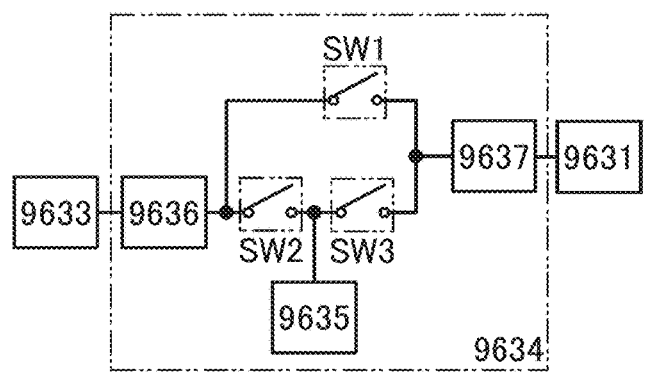

The structure and operation of the charge and discharge control circuit 9634 illustrated in FIG. 26B will be described with reference to a block diagram in FIG. 26C. The solar cell 9633, the power storage unit 9635, the DCDC converter 9636, a converter 9637, switches SW1 to SW3, and the display portion 9631 are illustrated in FIG. 26C, and the power storage unit 9635, the DCDC converter 9636, the converter 9637, and the switches SW1 to SW3 correspond to the charge and discharge control circuit 9634 in FIG. 26B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 27:
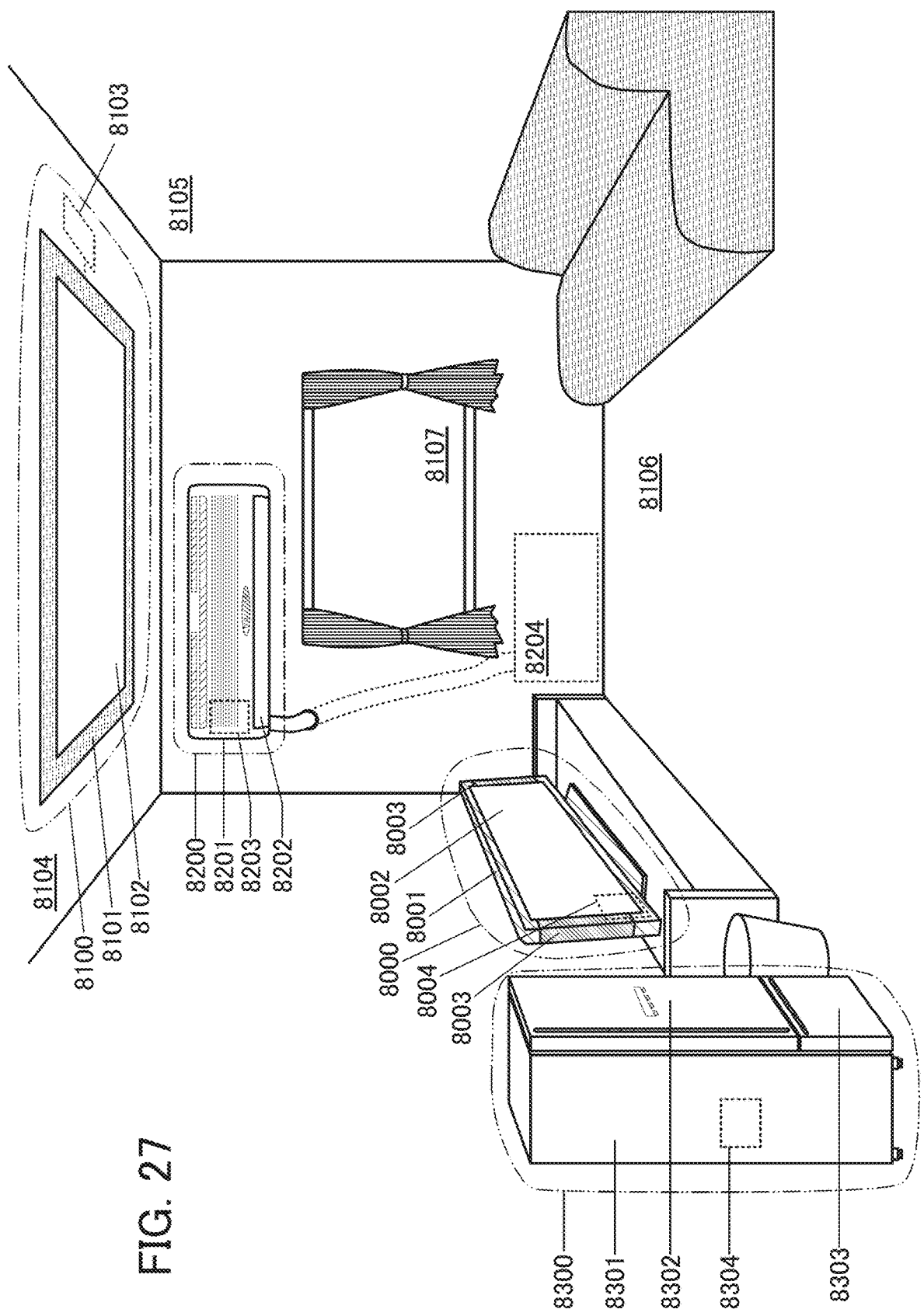
FIG. 27 illustrates examples of electronic devices.

FIG. 27 illustrates other examples of electronic devices. In FIG. 27, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 27 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 27 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 27, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 27 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 27 as an example, the power storage device of one embodiment of the present invention can be used in an air conditioner in which the functions of an indoor unit and an outdoor unit are integrated in one housing.

In FIG. 27, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 27. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

(Embodiment 5)

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 28A:
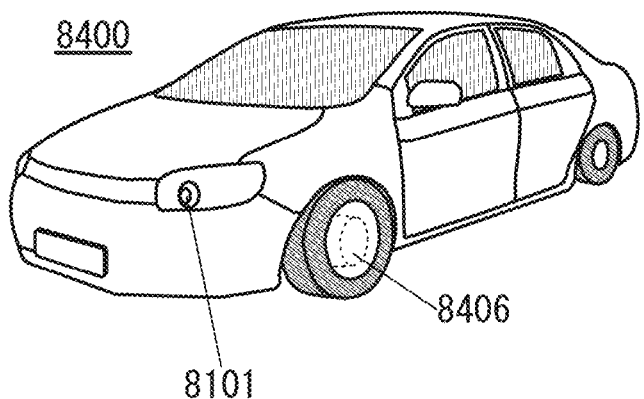
FIGS. 28A and 28B illustrate examples of electronic devices.
Figure 28B:
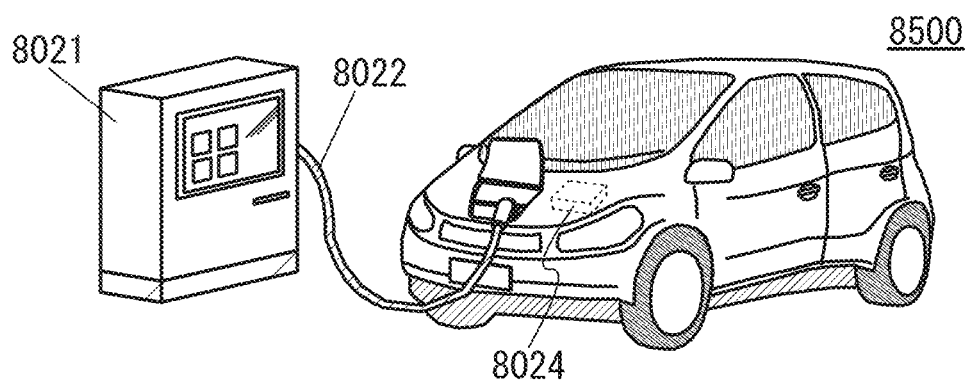

FIGS. 28A and 28B each illustrate an example of a vehicle using one embodiment of the present invention. An automobile 8400 illustrated in FIG. 28A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 28B illustrates an automobile 8500 including the power storage device. The automobile 8500 can be charged when the power storage device is supplied with electric power through external charging equipment by a plug-in system, a contactless power feeding system, or the like. In FIG. 28B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle performance and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

(Embodiment 6)

A battery control unit (battery management unit: BMU) that can be used in combination with battery cells each including the materials described in the above embodiment and transistors that are suitable for a circuit included in the battery control unit will be described with reference to FIG. 29 to FIG. 35. In this embodiment, in particular, a battery control unit of a power storage device including battery cells connected in series will be described.

When the plurality of battery cells connected in series are repeatedly charged and discharged, there occurs variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery control unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery control unit of the power storage device, the amount of charge that leaks from a battery can be reduced, and reduction in capacity with the lapse of time can be suppressed.

As the oxide semiconductor used in the channel formation region, an In—M—Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a TEM, a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an $InGaZnO_4$ crystal is analyzed by an out-of-plane method using an X-ray diffraction (XRD) apparatus, a peak may appear at a diffraction angle ($2\theta$) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film with an $InGaZnO_4$ crystal by an out-of-plane method, another peak may appear when $2\theta$ is around 36°, in addition to the peak at $2\theta$ of around 31°. The peak at $2\theta$ of around 36° indicates that a crystal having no c-axis alignment is included in part of the CAAC-OS film. It is preferable that in the CAAC-OS film, a peak appear when $2\theta$ is around 31° and that a peak not appear when $2\theta$ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery control unit which is used for such battery cells in the power storage device.

Figure 29:
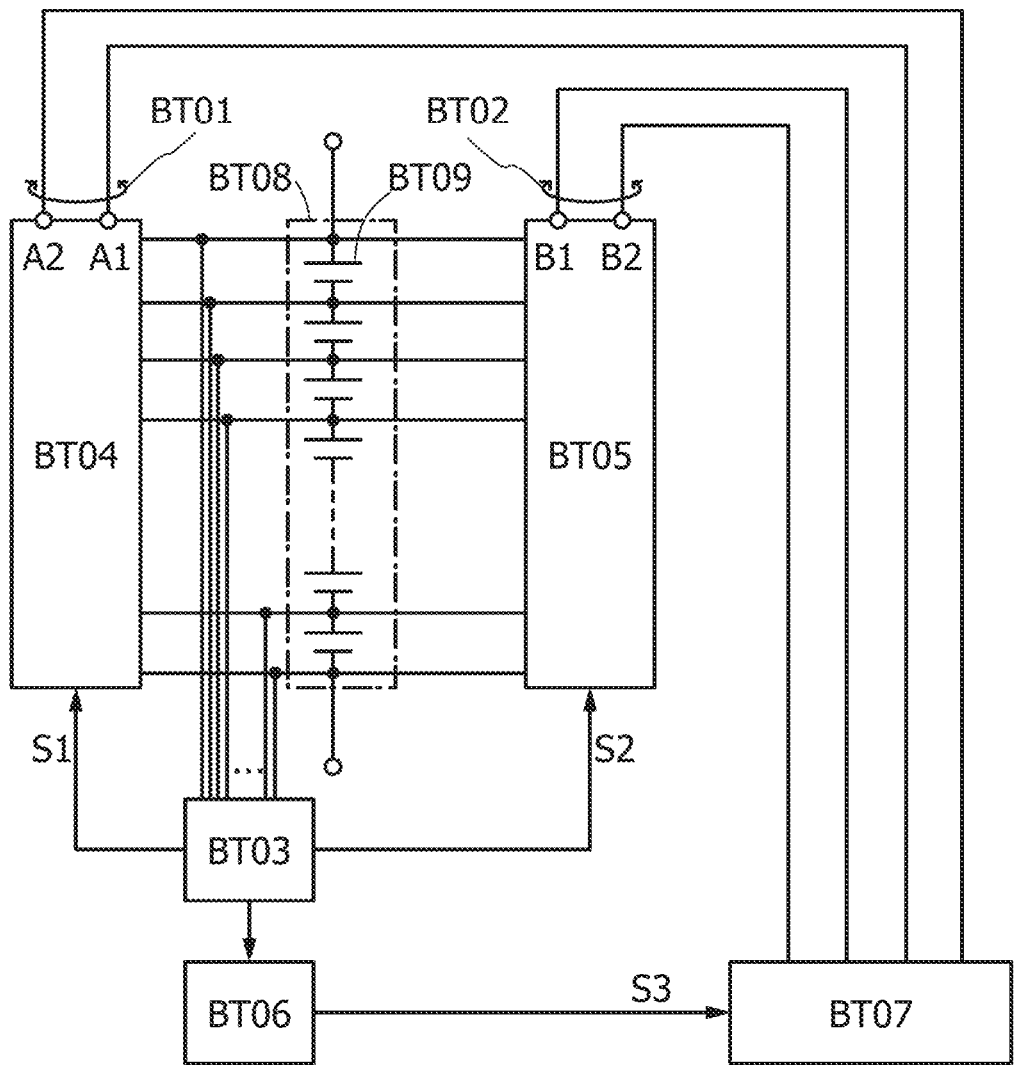
FIG. 29 is a block diagram illustrating one embodiment of the present invention.

FIG. 29 is an example of a block diagram of the power storage device. A power storage device BT00 illustrated in FIG. 29 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 29, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery control unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or overdischarged as the discharge battery cell group or the charge battery cell group.

Figure 30A:
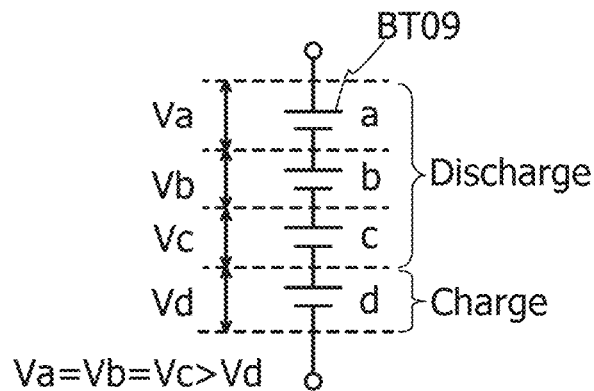
FIGS. 30A to 30C are schematic views each illustrating one embodiment of the present invention.
Figure 30B:
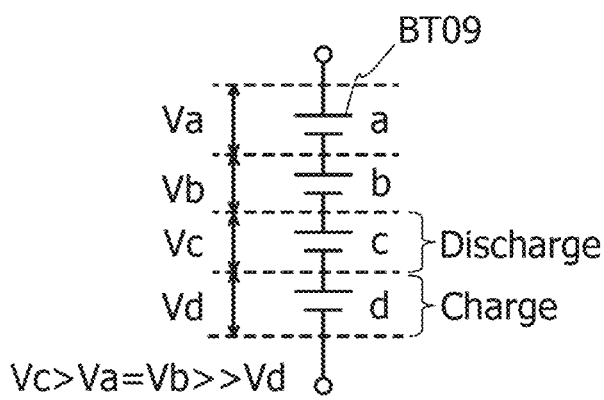
Figure 30C:
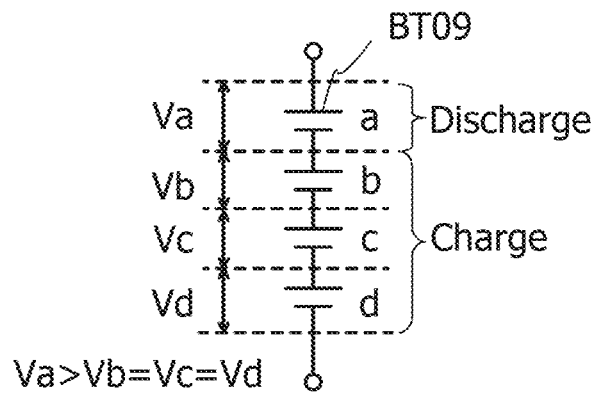

Here, operation examples of the switching control circuit BT03 in this embodiment will be described with reference to FIGS. 30A to 30C. FIGS. 30A to 30C illustrate the operation examples of the switching control circuit BT03. Note that FIGS. 30A to 30C each illustrate the case where four battery cells BT09 are connected in series as an example for convenience of explanation.

FIG. 30A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 30B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 30C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 30A to 30C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 31:
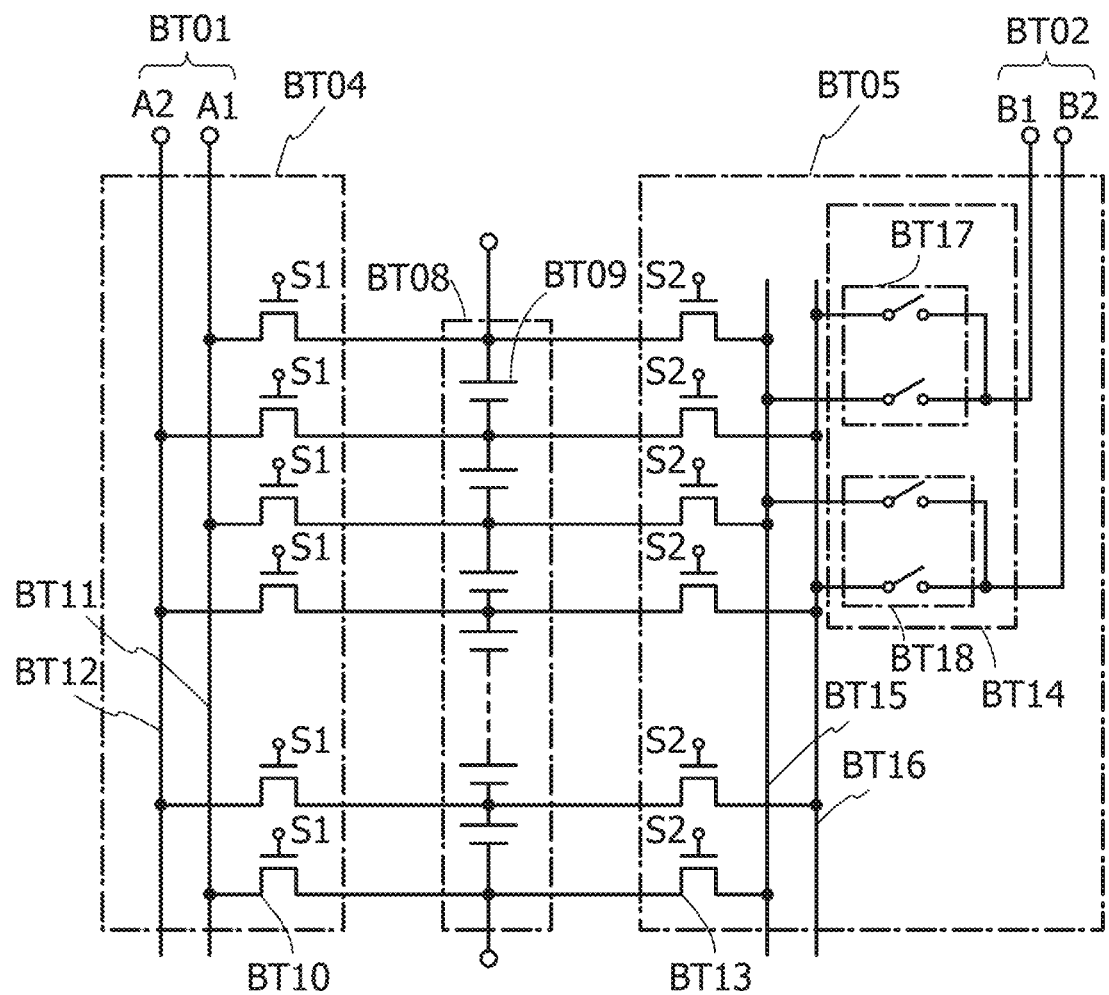
FIG. 31 is a circuit diagram illustrating one embodiment of the present invention.
Figure 32:
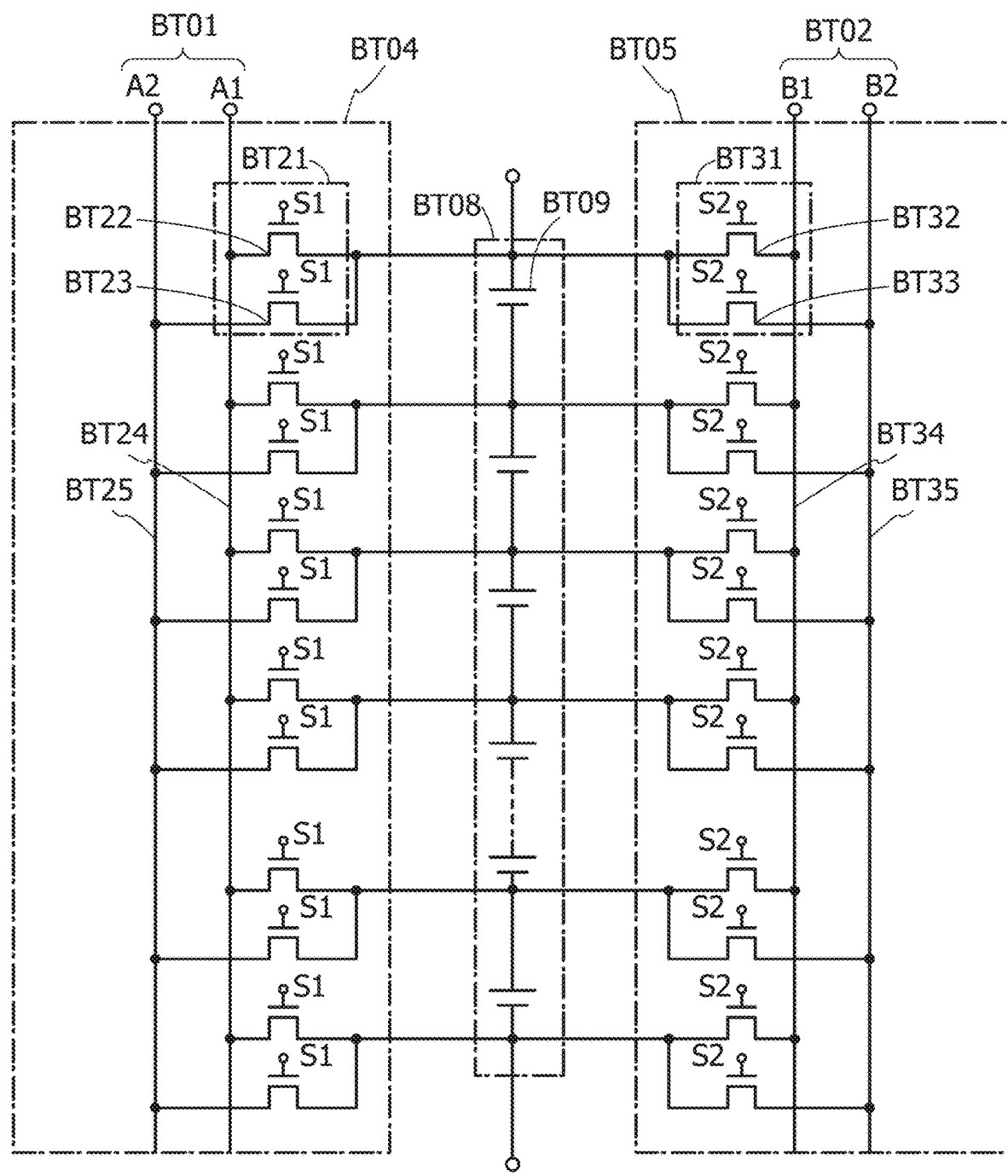
FIG. 32 is a circuit diagram illustrating one embodiment of the present invention.

FIG. 31 and FIG. 32 are circuit diagrams showing configuration examples of the switching circuits BT04 and BT05.

In FIG. 31, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 31, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or a drain of the transistor BT13 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 branch off from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14.

FIG. 32 is a circuit diagram illustrating configuration examples of the switching circuit BT04 and the switching circuit BT05 which are different from those of FIG. 31.

In FIG. 32, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 33A:
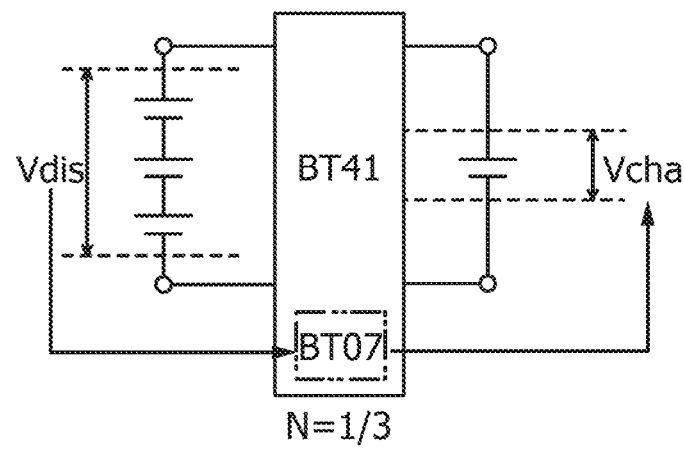
FIGS. 33A to 33C are schematic views each illustrating one embodiment of the present invention.
Figure 33B:
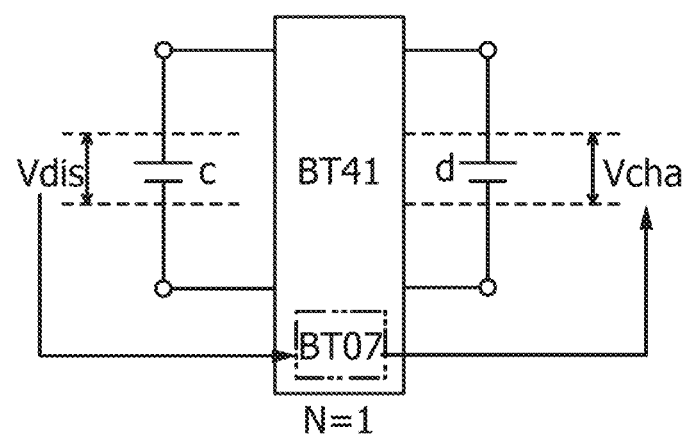
Figure 33C:
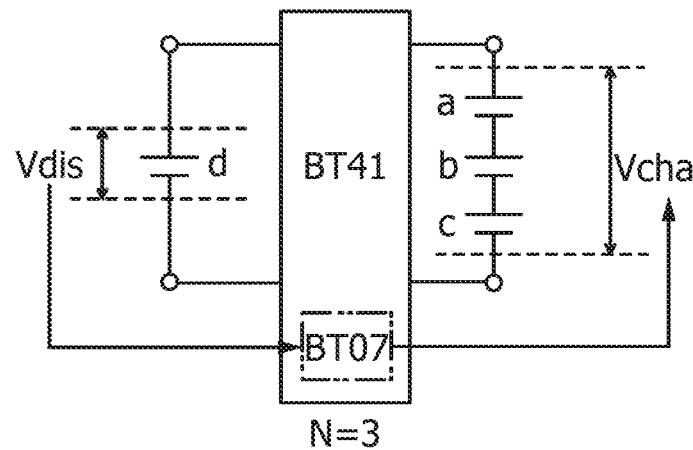

Here, operation examples of the voltage transformation control circuit BT06 in this embodiment will be described with reference to FIGS. 33A to 33C. FIGS. 33A to 33C are conceptual diagrams for explaining the operation examples of the voltage transformation control circuits BT06 for the discharge battery cell groups and the charge battery cell groups described in FIGS. 30A to 30C. FIGS. 33A to 33C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 33A, the series of three high-voltage cells a to c and one low-voltage cell d are connected in series as described in FIG. 30A. In this case, as described using FIG. 30A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 33A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the conversion ratio N for raising or lowering voltage larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N for raising or lowering voltage in order to make the voltage of the charge battery cell group equal to the charging voltage. The value of the current is set by the voltage transformation control circuit BT06.

In the example illustrated in FIG. 33A, since the number of the battery cells BT09 included in the discharge battery cell group is three and the number of the battery cells BT09 included in the charge battery cell group is one, the voltage transformation control circuit BT06 calculates a value which is slightly larger than $1/3$ as the conversion ratio N for raising or lowering voltage. Then, the voltage transformation control circuit BT06 outputs the voltage transformation signal S3, which lowers the discharging voltage in accordance with the conversion ratio N for raising or lowering voltage and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 33B and 33C, the conversion ratio N for raising or lowering voltage is calculated in a manner similar to that of FIG. 33A. In each of the examples illustrated in FIGS. 33B and 33C, since the number of the battery cells BT09 included in the discharge battery cell group is less than or equal to the number of the battery cells BT09 included in the charge battery cell group, the conversion ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 34:
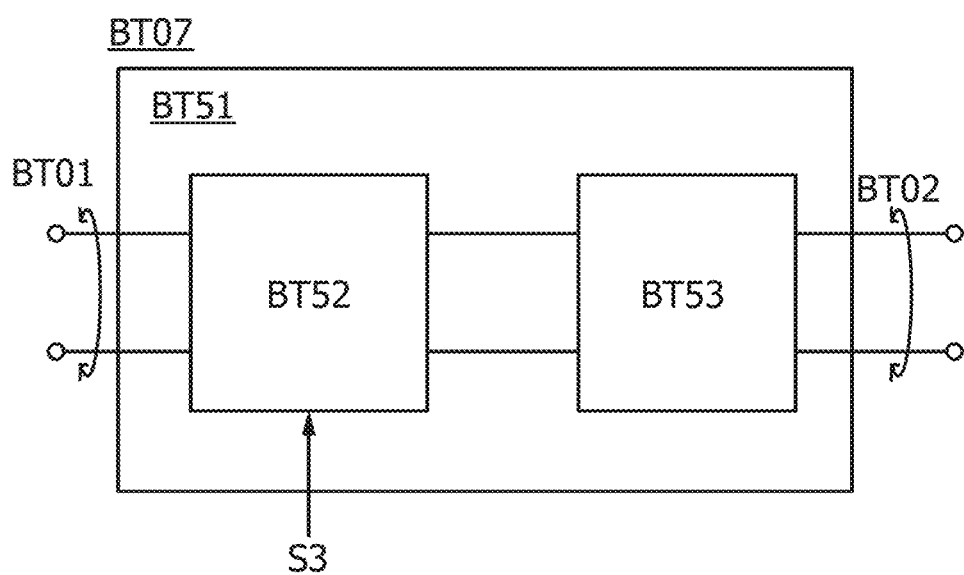
FIG. 34 is a block diagram illustrating one embodiment of the present invention.

The configuration of the voltage transformer circuit BT07 including the insulated DC-DC converter is illustrated in FIG. 34. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 35:
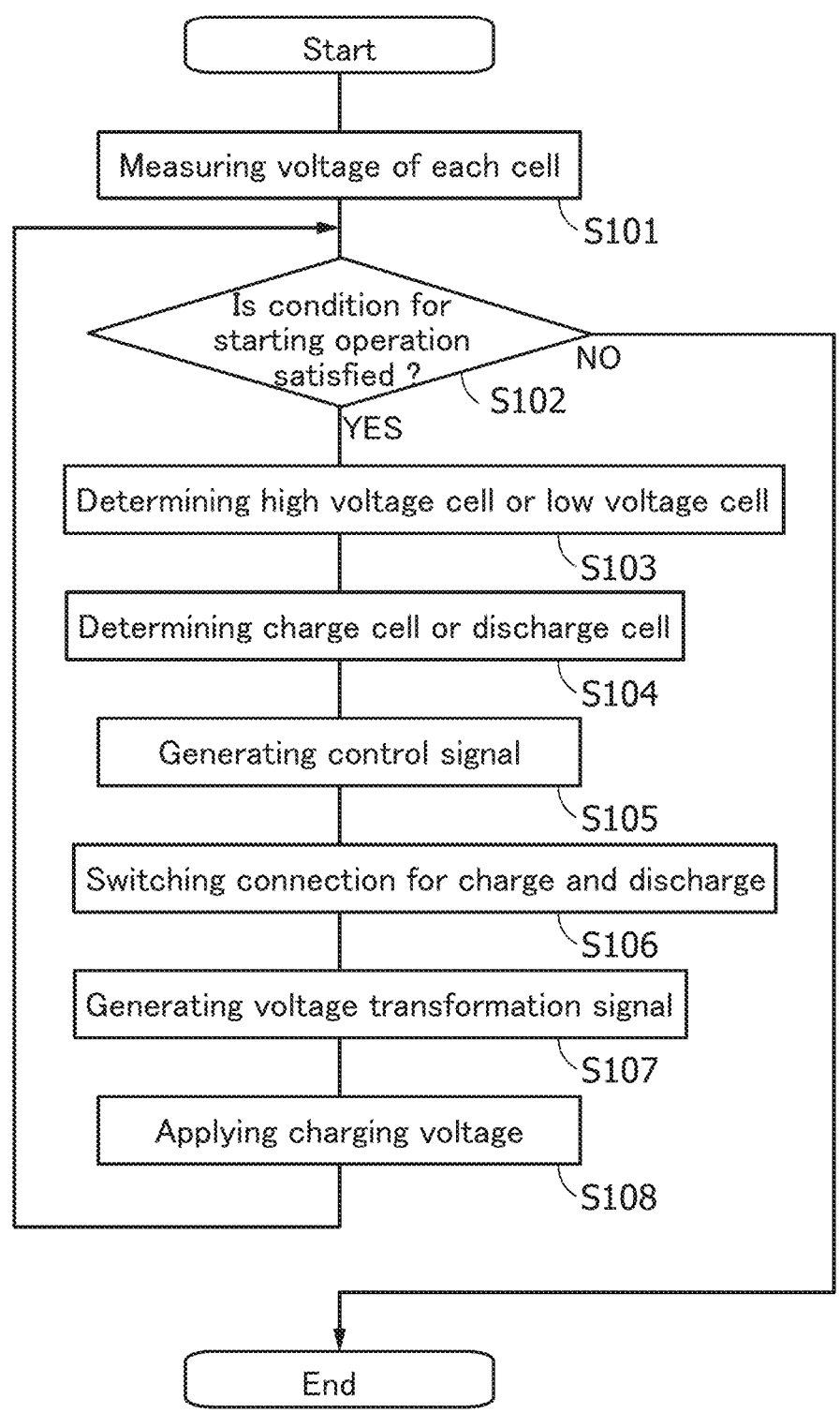
FIG. 35 is a flow chart showing one embodiment of the present invention.
Figure 36A:
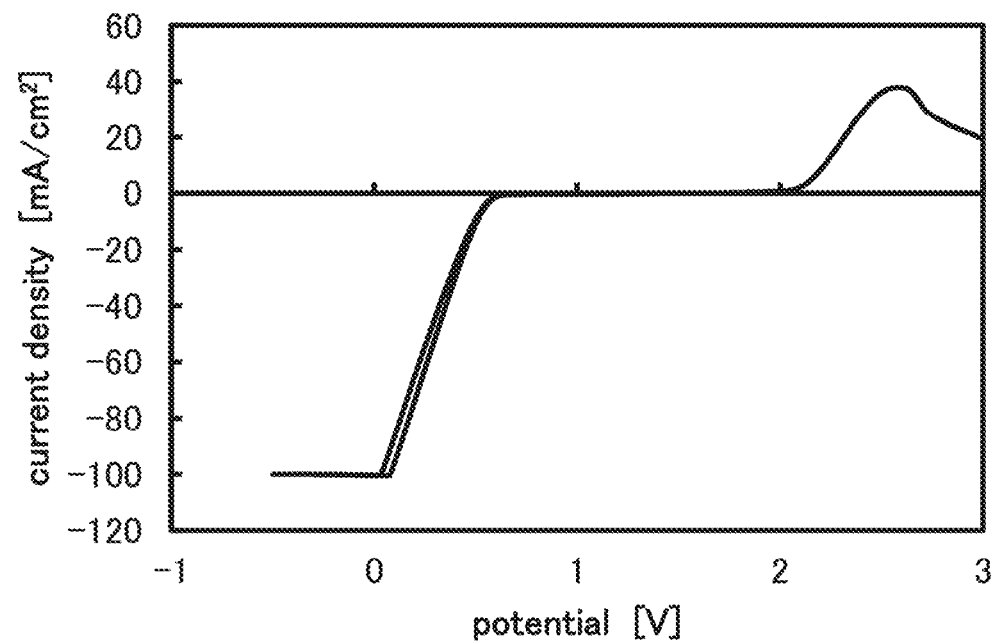
FIGS. 36A and 36B each show CV measurement results.
Figure 36B:
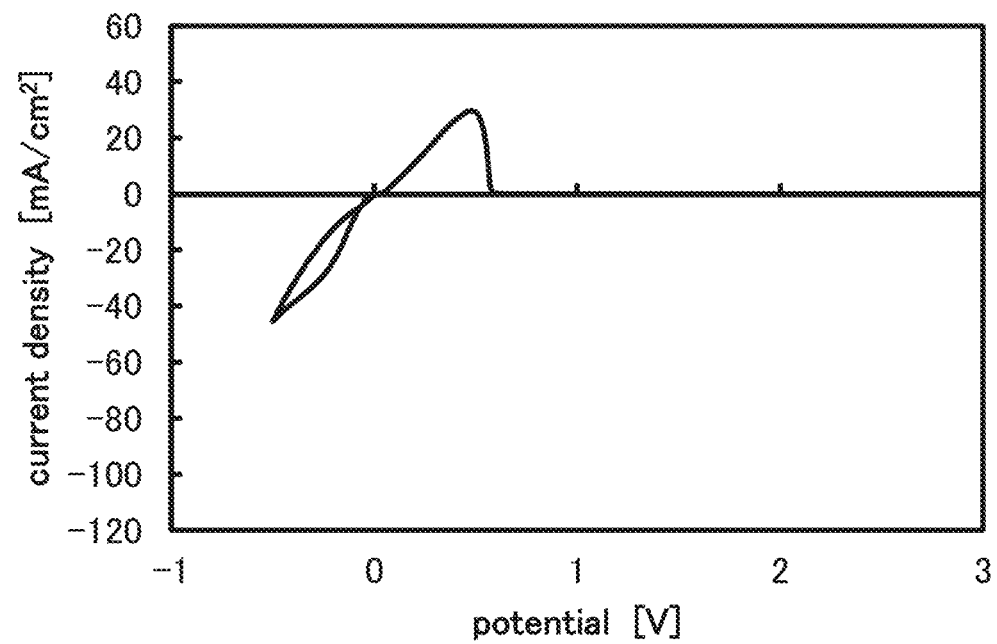
Figure 37A:
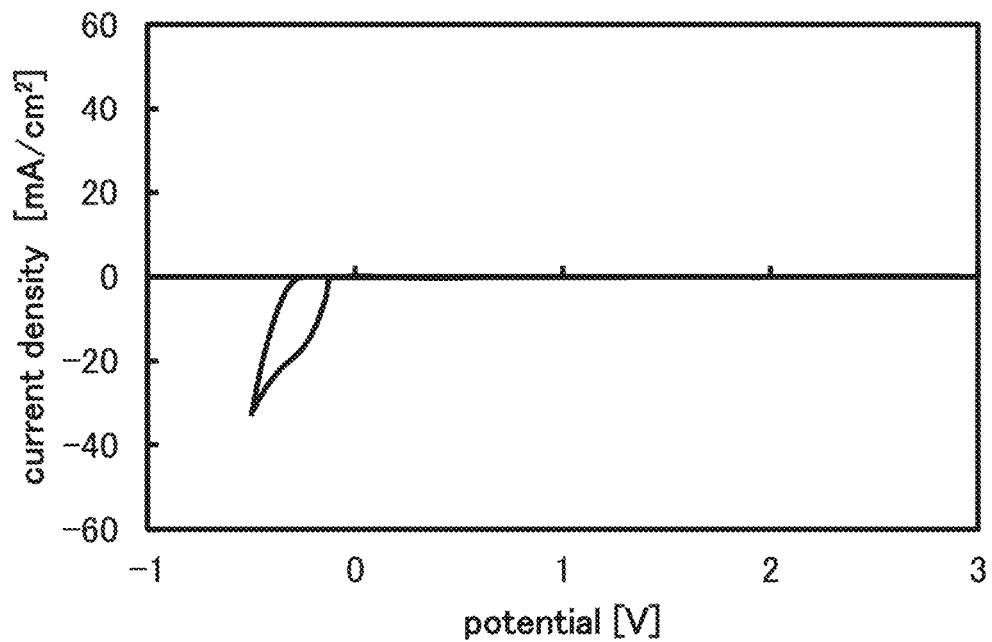
FIGS. 37A and 37B each show CV measurement results.
Figure 37B:
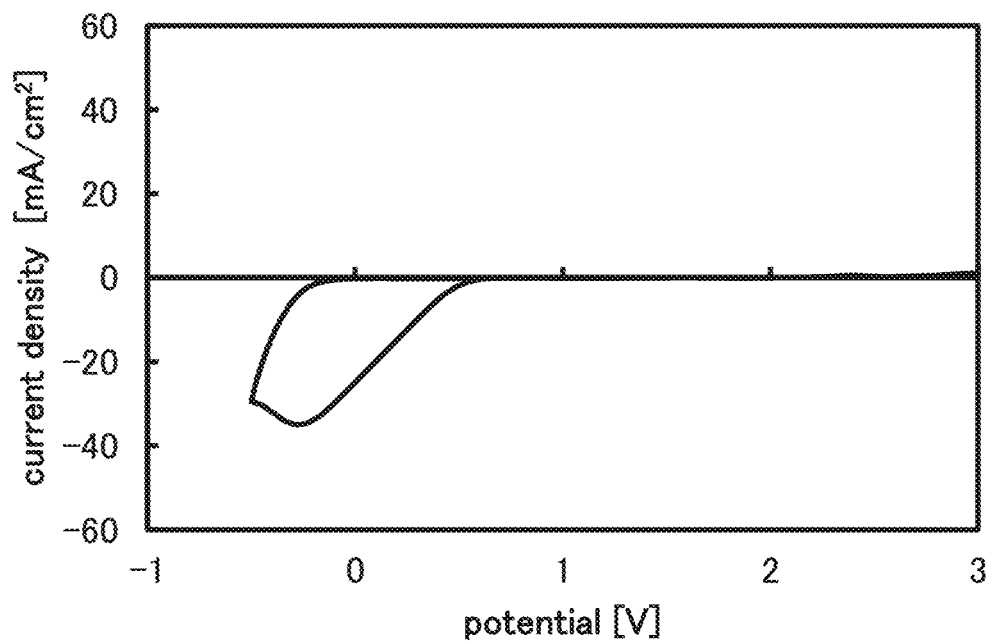

A flow of operations of the power storage device BT00 in this embodiment will be described with reference to FIG. 35. FIG. 35 is a flow chart showing the flow of the operations of the power storage device BT00.

First, the power storage device BT00 obtains a voltage measured for each of the plurality of battery cells BT09 (step S101). Then, the power storage device BT00 determines whether or not the condition for starting the operation of reducing variations in voltage of the plurality of battery cells BT09 is satisfied (step S102). For example, the condition that the difference between the maximum value and the minimum value of the voltage measured for each of the plurality of battery cells BT09 is higher than or equal to a predetermined threshold value can be used. In the case where the condition is not satisfied (step S102: NO), the power storage device BTOO does not perform the following operation because voltages of the battery cells BT09 are well balanced. In contrast, in the case where the condition is satisfied (step S102: YES), the power storage device BTOO performs the operation of reducing variations in the voltage of the battery cells BT09. In this operation, the power storage device BTOO determines whether each battery cell BT09 is a high voltage cell or a low voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of the battery cells BT09 included in the discharge battery cell group and the number of the battery cells BT09 included in the charge battery cell group (step S107). Then, the power storage device BT00 converts, in response to the voltage transformation signal S3, the discharging voltage applied to the terminal pair BT01 into a charging voltage and applies the charging voltage to the terminal pair BT02 (step S108). In this way, charge of the discharge battery cell group is transferred to the charge battery cell group.

Although the plurality of steps are shown in order in the flow chart of FIG. 35, the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of a Si transistor. Accordingly, even when the temperature of the battery cells BT09 is increased, an operation such as turning on or off the transistors in response to the control signals S1 and S2 can be performed normally.

This embodiment can be implemented in combination with any of the other embodiments as appropriate.

EXAMPLE 1

In this example, electrolytic solutions were subjected to cyclic voltammetry (CV) measurement.

Four kinds of electrolytic solutions, Electrolytic Solution A-1, Electrolytic Solution A-2, Electrolytic Solution A-3, and Electrolytic Solution A-4, were prepared. In each of the four kinds of electrolytic solutions, 1-ethyl-3-methylimidazolium bis(fluorosulfonyl)amide (EMI-FSA) was used as a solvent. In each of Electrolytic Solutions A-2, A-3, and A-4, lithium bis(fluorosulfonyl)amide (LiFSA) was used as an electrolyte. In Electrolytic Solution A-1, an electrolyte was not used. The electrolyte concentrations are 1 mol/L in Electrolytic Solution A-2, 0.1 mol/L in Electrolytic Solution A-3, and 0.01 mol/L in Electrolytic Solution A-4.

Lithium, copper, and platinum were used as a reference electrode, a working electrode, and a counter electrode, respectively. The area of the working electrode was 0.02 cm$^2$. In an electrolytic solution for the reference electrode, N-methyl-N-propylpiperidinium bis(trifluoromethanesulfonyl)amide (PP13-TFSA) was used as a solvent and lithium bis(trifluoromethanesulfonyl)amide (LiTFSA) was used as an electrolyte. The electrolyte concentration in the electrolytic solution was 0.4 mol/L.

The scanning rate was 50 mV/s, and the voltage range was from 3 V to −0.5 V. FIGS. 36A and 36B and FIGS. 37A and 37B show CV measurement results of Electrolytic Solutions A-1, A-2, A-3, and A-4, respectively. The horizontal axis represents potential (vs. Li/Li$^+$), and the vertical axis represents current density.

For Electrolytic Solution A-1, which does not use a lithium salt, a reduction current was observed at approximately 0.7 V, which suggests a reduction reaction of EMI-FSA. For Electrolytic Solution A-2, a reduction current at approximately 0.7 V observed in the case of Electrolytic Solution A-1 was inhibited and a reduction current and an oxidation current at approximately 0 V, which suggest lithium deposition and lithium dissolution, respectively, were observed. These results imply that in Electrolytic Solution A-2, lithium ions form an electric double layer on a surface of the electrode, resulting in inhibition of a reduction reaction of either or both of EMI cations and FSA anions.

For Electrolytic Solution A-3, a noticeable reduction current was not observed until approximately 0 V, which suggests inhibition of decomposition of EMI; however, an oxidation current, which suggests lithium deposition, was not observed. In contrast, for Electrolytic Solution A-4, a reduction current was observed at a potential higher than 0 V, which suggests that a reduction reaction of either or both of EMI cations and FSA anions occurs.

Figure 38A:
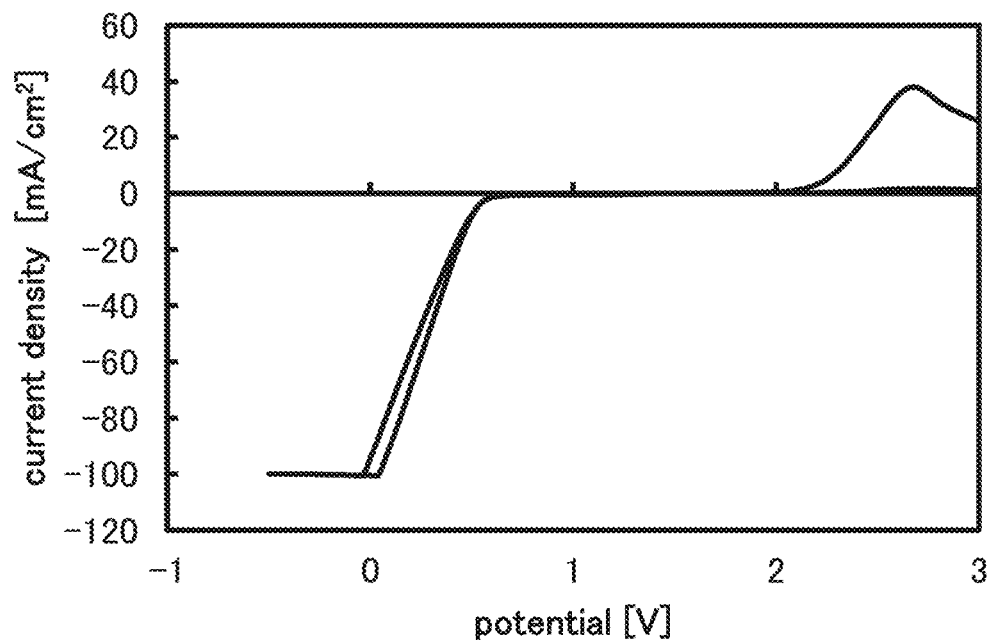
FIGS. 38A and 38B each show CV measurement results.
Figure 38B:
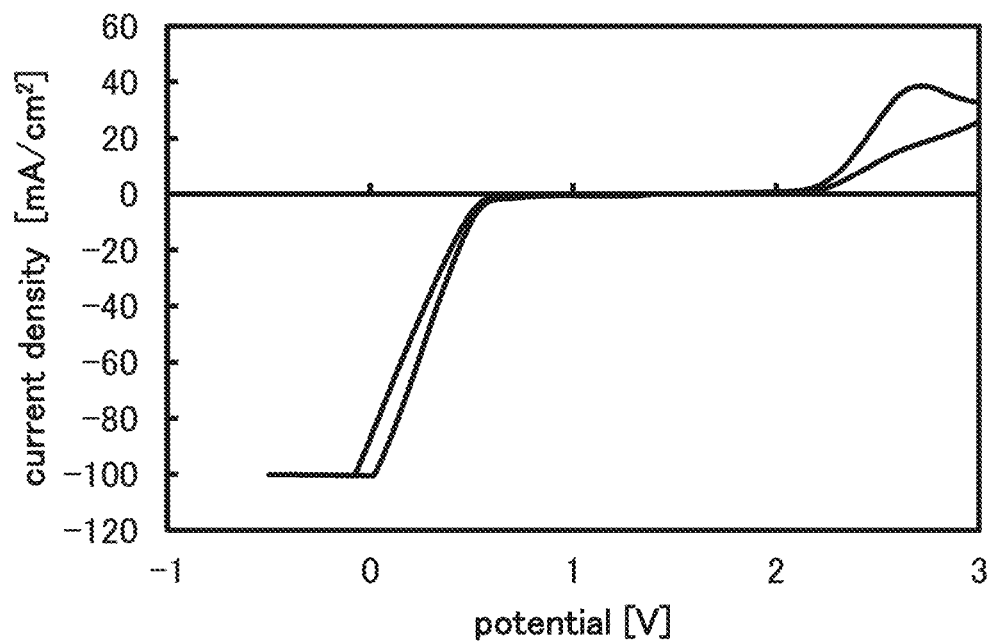

FIGS. 38A and 38B show results of second and third cycles of CV measurement of Electrolytic Solution A-4. The waveforms of the second and third cycles of CV measurement of Electrolytic Solution A-4 were almost the same as the waveform of CV measurement of Electrolytic Solution A-1, which does not use a lithium salt. Presumably, in Electrolytic Solution A-4, the concentration of a lithium salt is too low to allow sufficient formation of an electric double layer on the electrode surface, so that reduction reactions of EMI cations and the like cannot be inhibited.

Figure 39:
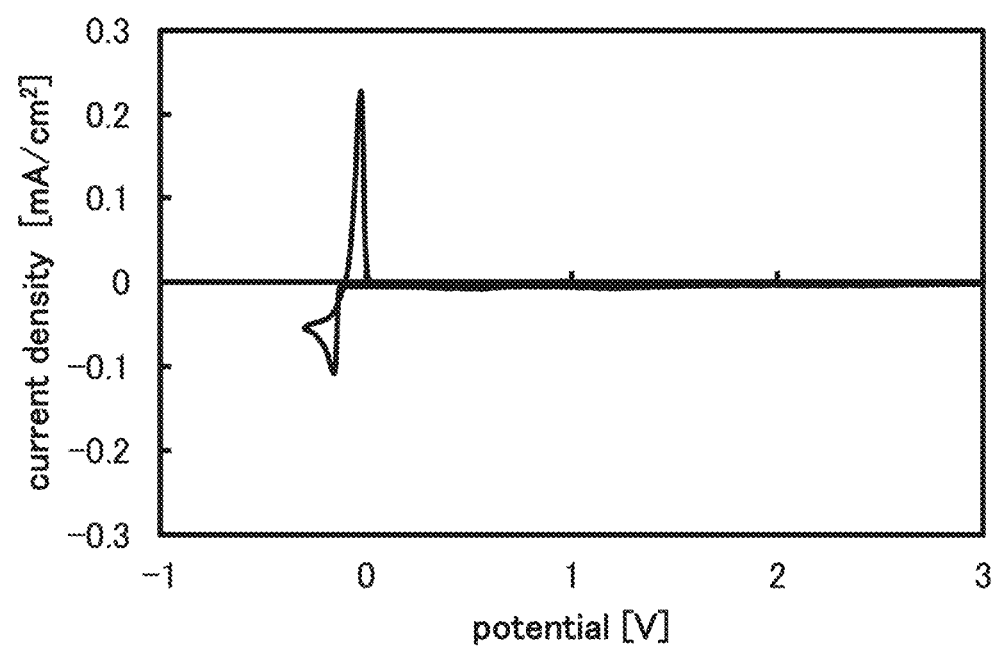
FIG. 39 shows CV measurement results.

The CV measurement was performed on Electrolytic Solution A-4 at a sweep rate of 0.5 mV/s within the voltage range from 3 V to −0.3 V, and it was found that a reduction reaction is inhibited. FIG. 39 shows the results.

Next, Electrolytic Solutions A-5 and A-6 were prepared. In each of Electrolytic Solutions A-5 and A-6, EMI-TFSA was used as a solvent and LiTFSA was used as an electrolyte. The electrolyte concentrations were 1 mol/L in Electrolytic Solution A-5 and 2 mol/L in Electrolytic Solution A-6.

Figure 40:
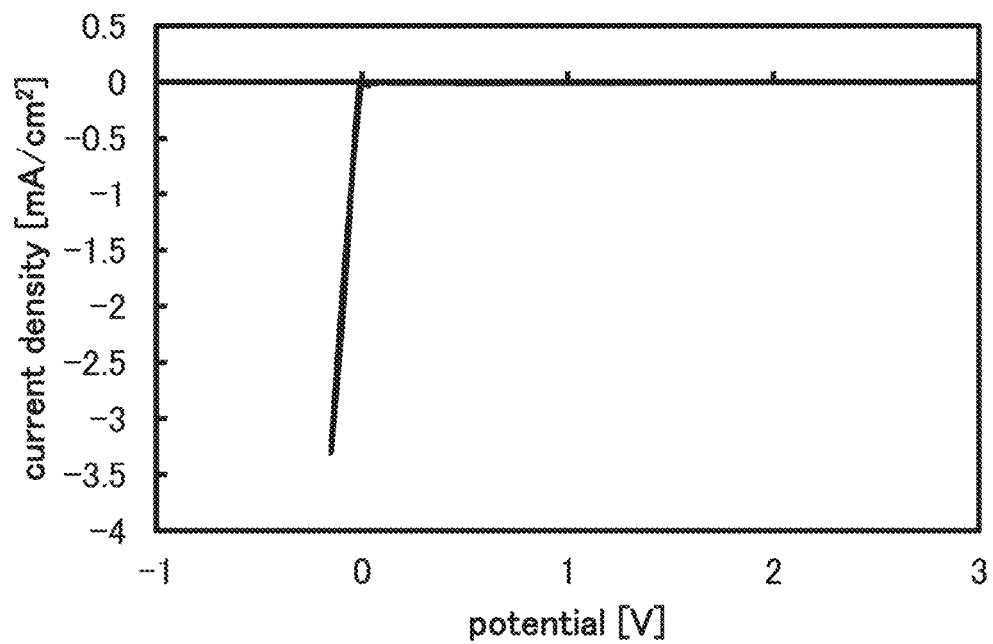
FIG. 40 shows CV measurement results.
Figure 41A:
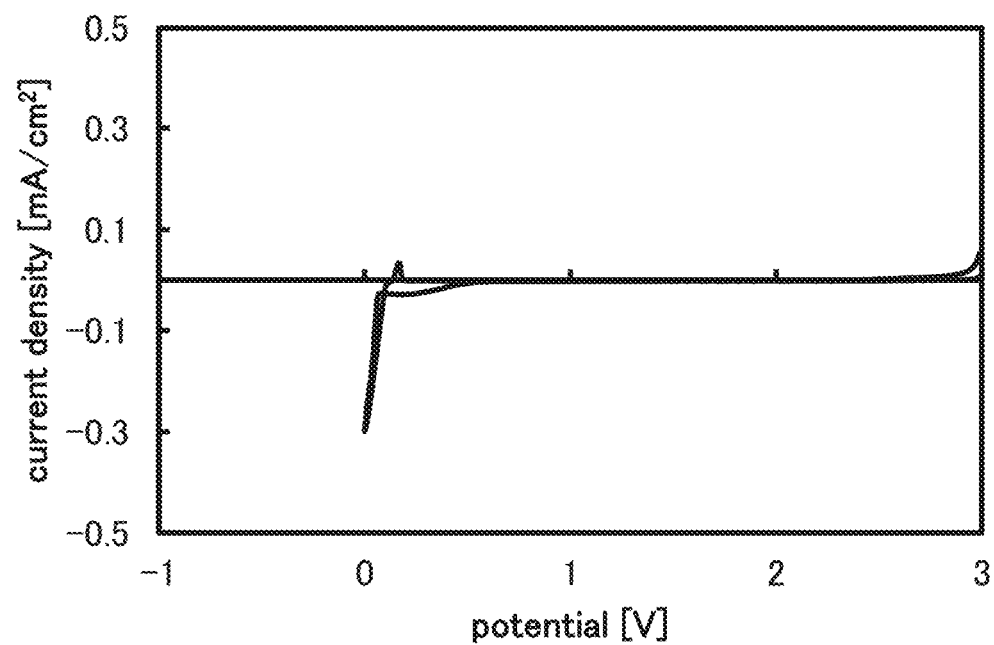
FIGS. 41A and 41B each show CV measurement results.
Figure 41B:
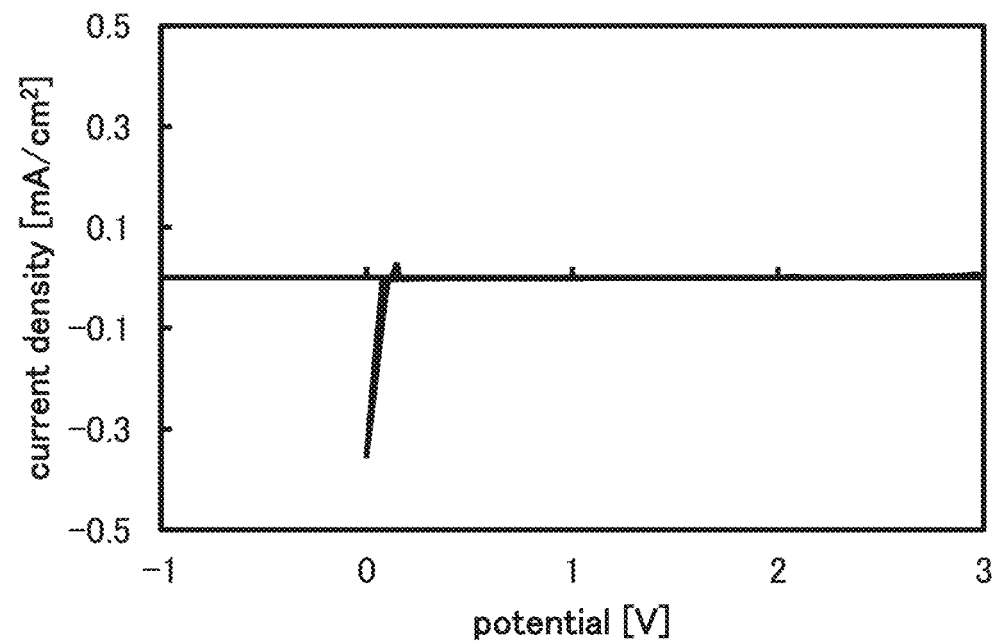

FIG. 40 shows results of CV measurement of Electrolytic Solution A-5 at a sweep rate of 0.5 mV/s within the voltage range from 3 V to −0.15 V. FIG. 41A shows results of CV measurement of Electrolytic Solution A-6 at a sweep rate of 0.5 mV/s within the voltage range from 3 V to 0 V. FIG. 41B shows results of CV measurement of Electrolytic Solution A-6 at a sweep rate of 0.1 mV/s within the voltage range from 3 V to 0 V. Electrolytic Solution A-6, in which the concentration of a lithium salt is 2 mol/L, shows a peak suggesting lithium dissolution, which indicates that a formed electric double layer might inhibit reduction reactions of EMI cations and the like.

EXAMPLE 2

In this example, storage batteries were fabricated and the charge and discharge cycles thereof were measured.

First, Electrolytic Solutions A-7 and AC-1 were prepared. In Electrolytic Solution A-7, BMI-FSA was used as a solvent and LiFSA was used as an electrolyte. The electrolyte concentration in Electrolytic Solution A-7 was 1.5 mol/L. In Electrolytic Solution AC-1, which is a comparative electrolytic solution, a solvent obtained by mixing EC and DEC at a volume ratio of EC: DEC=3:7 was used and LiPF$_6$ was used as an electrolyte. The electrolyte concentration in Electrolytic Solution AC-1 was 1 mol/L.

[Fabrication of Electrodes]

Next, Negative Electrode E1 and Positive Electrodes E2 and E3 were prepared.

The compounding and fabricating method of Negative Electrode E1 will be described. Carbon-coated SiO was used as an active material, polyimide was used as a binder, and acetylene black was used as a conductive additive. In a slurry for fabricating the electrode, the compounding ratio of SiO to acetylene black and polyimide was 80:5:15 (wt %).

First, acetylene black and NMP serving as a solvent were mixed with a mixer, so that a first mixture was obtained.

Next, the active material was added to the first mixture, so that a second mixture was obtained.

After that, an NMP solution of polyimide was added to the second mixture and mixing was performed with a mixer. Through the above steps, the slurry was formed.

The formed slurry was applied to one surface of a 10-μm-thick stainless-steel current collector. The application was performed with a continuous coater at a coating speed of 0.15 m/min. After that, drying was performed using a drying furnace at 40° C. for 20 minutes.

Then, the fabricated electrode was subjected to heat treatment for imidization. The heat treatment was performed with a muffle furnace at 400° C. in a nitrogen atmosphere for 5 hours. Through the above steps, the negative electrode was fabricated.

Next, Positive Electrodes E2 and E3 were prepared.

The compounding and fabricating conditions of Positive Electrode E2 will be described. LiCoO$_2$ with an average particle size of 10 μm was used as an active material, PVdF was used as a binder, and acetylene black was used as a conductive additive. In a slurry for fabricating the electrode, the compounding ratio of LiCoO$_2$ to acetylene black and PVdF was 90:5:5 (wt %).

The active material, the binder, and the conductive additive were mixed to form a slurry. The slurry was applied to one surface of a 20-μm-thick aluminum current collector. Then, the solvent was volatilized. After that, the positive electrode active material layer was pressed. Through the above steps, Positive Electrode E2 was fabricated.

Next, the compounding and manufacturing conditions of Positive Electrode E3 will be described. LiFePO$_4$ with a specific surface area of 15.6 m$^2$/g was used as an active material, PVdF was used as a binder, and acetylene black was used as a conductive additive. In a slurry for fabricating the electrode, the compounding ratio of LiFePO$_4$ to acetylene black and PVdF was 85:8:7 (wt %).

First, acetylene black and PVdF serving as a binder were mixed with a mixer, so that a first mixture was obtained.

Next, the active material was added to the first mixture, so that a second mixture was obtained.

After that, a solvent NMP was added to the second mixture and mixing was performed with a mixer. Through the above steps, the slurry was formed.

Then, mixing was performed with a large-sized mixer.

Then, the formed slurry was applied to one surface of a 20-μm-thick aluminum current collector subjected to undercoating in advance. The application was performed with a continuous coater at a coating speed of 0.2 m/min. Then, the solvent was volatilized with a drying furnace. The solvent volatilization in the drying furnace was performed at 70° C. for 7.5 minutes and then further performed at 90° C. for 7.5 minutes.

Subsequently, the positive electrode active material layer was pressed by a roll press method so as to be consolidated. Through the above steps, Positive Electrode E3 was fabricated.

[Fabrication of Storage Batteries]

Next, Negative Electrode E1, Positive Electrode E2, and Positive Electrode E3 were cut, and lead electrodes were bonded to respective tab regions by welding. The area of Negative Electrode E1 was 23.8 cm$^2$, and the area of each of Positive Electrodes E2 and E3 was 20.5 cm$^2$.

Then, Negative Electrode E1 and Positive Electrode E2 were provided so as to face each other with a first separator therebetween, a second separator was provided over Positive Electrode E2, and Positive Electrode E3 was provided over the second separator. The second separator, Positive Electrode E2, and the first separator are located closer to Positive Electrode E3 in this order between Negative Electrode E1 and Positive Electrode E3. As each separator, TF40 made with cellulose having a thickness of 40 μm was used.

As a sheet for forming an exterior body, an aluminum sheet both surfaces of which are covered with a resin was prepared. The stack of Negative Electrode E1, the first separator, Positive Electrode E2, the second separator, and Positive Electrode E3 was wrapped with the sheet folded in half.

Next, two of three sides of the sheet folded in half were sealed with heat, so that the exterior body was formed. End portions of the lead electrodes bonded to the respective electrodes were located outside the sheet. After that, drying was performed at 80° C.

Then, an electrolytic solution was injected from a side that was not sealed, in a reduced-pressure atmosphere of −60 kPa or less. The amount of the injected electrolytic solution was approximately 0.6 ml. A storage battery using Electrolytic Solution A-7 is referred to as Storage Battery BA, and a comparative storage battery using Electrolytic Solution AC-1, which is a comparative electrolytic solution, is referred to as Storage Battery BC.

The loadings of Negative Electrode E1, Positive Electrode E2, and Positive Electrode E3 used in Storage Battery BA were 2.0 mg/cm$^2$, 20 mg/cm$^2$, and 9.3 mg/cm$^2$, respectively. The densities of Negative Electrode E1, Positive Electrode E2, and Positive Electrode E3 in Storage Battery BA were 0.55 g/cc, approximately 2.2 g/cc, and 1.0 g/cc, respectively.

The loadings of Negative Electrode E1, Positive Electrode E2, and Positive Electrode E3 used in Storage Battery BC were 2.0 mg/cm$^2$, 20 mg/cm$^2$, and 9.4 mg/cm$^2$, respectively. The densities of Negative Electrode E1, Positive Electrode E2, and Positive Electrode E3 in Storage Battery BC were 0.63 g/cc, approximately 2.1 g/cc, and 1.1 g/cc, respectively. Note that loading means the weight of an active material per unit area.

Then, the side which was not sealed was sealed with heat. Through the above steps, each storage battery was fabricated.

[Predoping]

Constant current charge was performed at 25° C. at a current density of 17.9 mA/g (corresponding to approximately 0.01 C with respect to the negative electrode active material capacity) using Positive Electrode E2 as a positive electrode and Negative Electrode E1 as a negative electrode up to 600 mAh/g. A 0.5-hour break was taken after the charge.

After the charge, one side of the exterior body was cut. Then, Positive Electrode E2 and the second separator were taken out from the side that was cut.

Next, 0.3 ml of Electrolytic Solution A-7 was injected into Storage Battery BA, and 0.3 ml of Electrolytic Solution AC-1 was injected into Storage Battery BC.

After that, the side cut open was sealed with heat.

[Aging]

Next, an aging step was performed. First, constant current charge was performed at 25° C. using Positive Electrode E3 as a positive electrode and Negative Electrode E1 as a negative electrode. The charging conditions was as follows: the current density was 1.7 mA/g (corresponding to approximately 0.01 C with respect to the positive electrode active material capacity), and the upper voltage limit was 3.2 V. A 2-hour break was taken after the charge.

After the charge, one side of the exterior body was cut, and degasification was performed. After that, the side cut open was sealed with heat.

Then, constant current charge was performed under the conditions that the current density was 8.5 mA/g (corresponding to approximately 0.05 C) and the upper voltage limit was 4 V. After that, constant current discharge was performed under the conditions that the current density was 34 mA/g (corresponding to approximately 0.2 C) and the lower voltage limit was 2 V. After each of the charge and discharge, a 2-hour break was taken.

Figure 42A:
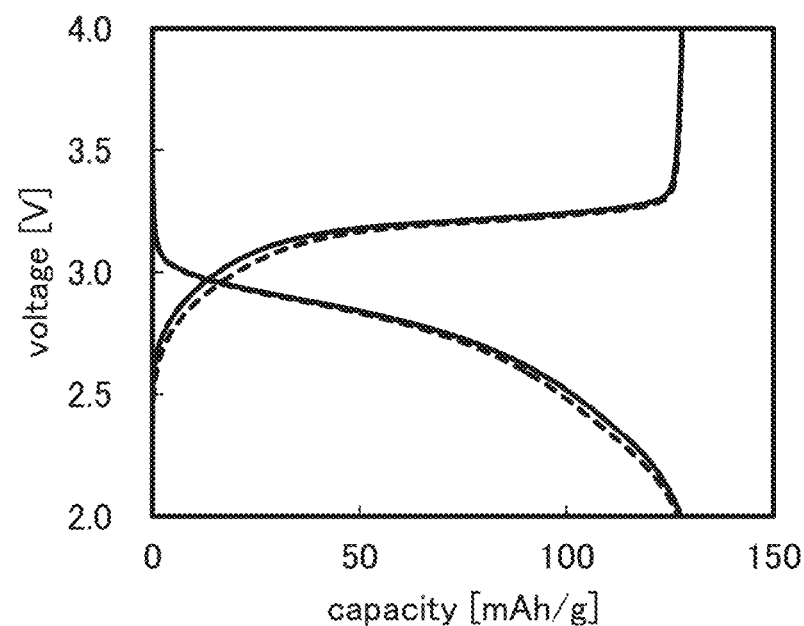
FIGS. 42A and 42B each show charge and discharge characteristics.
Figure 42B:
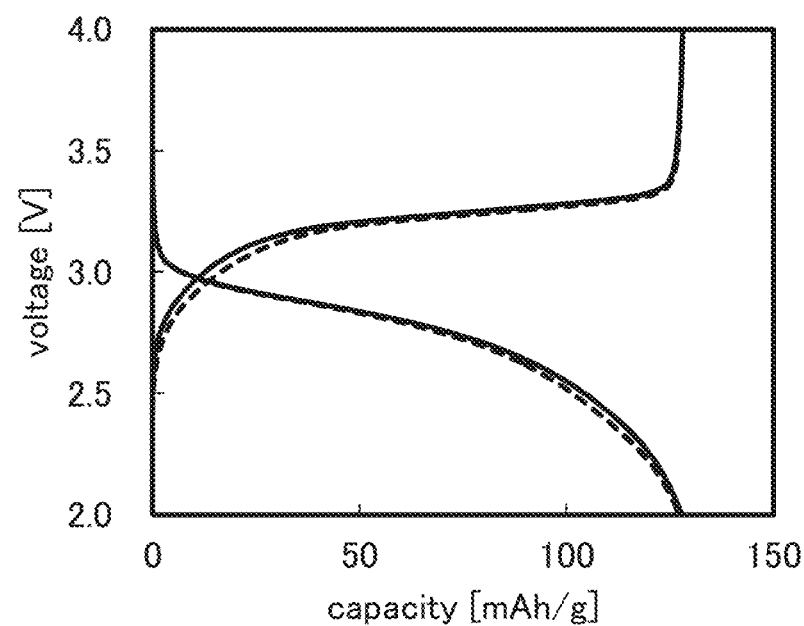

Then, two cycles of constant current charge and discharge were performed at a current density of 34 mA/g. FIGS. 42A and 42B show charge and discharge curves of the two cycles. In each of the graphs, the solid lines show the initial charge and discharge, and dotted lines show the second charge and discharge. FIG. 42A shows charge and discharge cycles of Storage Battery BC, and FIG. 42B shows charge and discharge cycles of Storage Battery BA. The upper charging voltage limit was 4 V, and the lower discharging voltage limit was 2 V. After each of the charge and discharge, a 2-hour break was taken. Through the above steps, aging was performed.

[Charge and Discharge Cycles]

Figure 43:
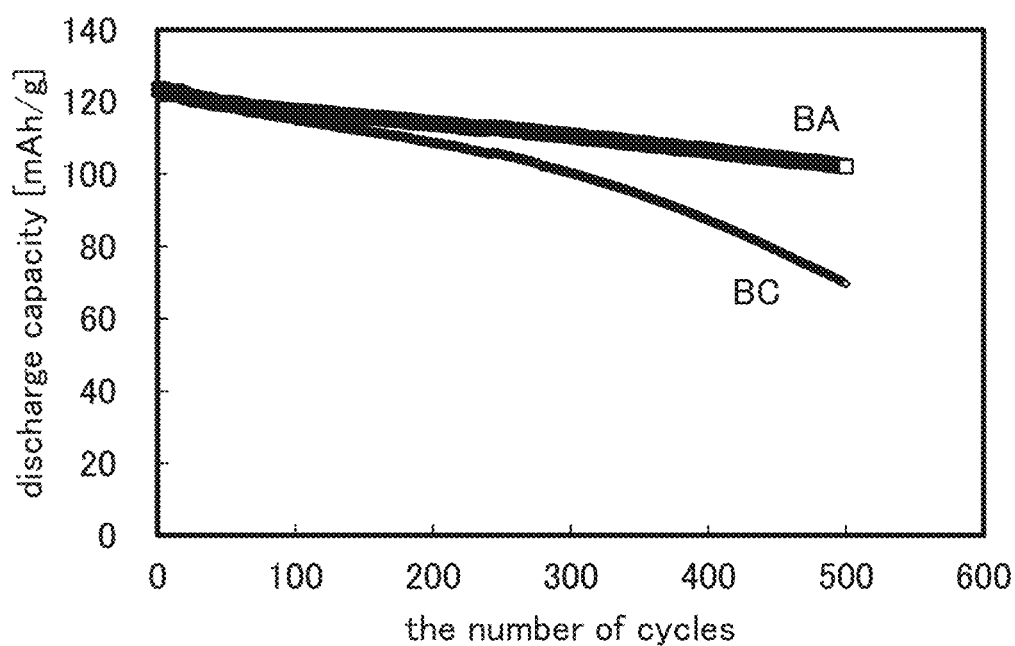
FIG. 43 shows cycle performances.

The charge and discharge cycle performances of Storage Batteries BA and BC subjected to the aging were evaluated. Charge and discharge were performed at a constant current at a current density of 51 mA/g (corresponding to approximately 0.3 C). The upper charging voltage limit was 4 V, and the lower discharging voltage limit was 2 V. After each of the charge and discharge, a 0.5-hour break was taken. FIG. 43 shows the charge and discharge cycle performances. The horizontal axis represents the number of cycles, and the vertical axis represents discharge capacity. The discharge capacity in the 500th cycle of Storage Battery BC was as low as approximately 60% of the initial discharge capacity, whereas the discharge capacity in the 500th cycle of Storage Battery BA was over 80%, which indicates excellent charge and discharge cycle performance of Storage Battery BA.

EXAMPLE 3

Surfaces of the negative electrodes of Storage Batteries BA and BC fabricated in Example 2 were subjected to XPS analysis after charge and discharge cycles.

After charge and discharge cycles, Storage Batteries BA and BC were disassembled. After the disassembly, deuterated acetonitrile was added to be mixed with the electrolytic solution left in each of the storage batteries, and the mixed solution was extracted with a pipette. Then, the negative electrode was immersed in DMC, which was put in a petri dish, to be washed. DMC was renewed twice, and washing was performed three times in total. After that, the solvent was volatilized in a reduced-pressure atmosphere.

Next, the negative electrodes of Storage Batteries BA and BC were subjected to XPS analysis. Table 1 shows the proportions of C, O, F, S, Li, P, N, Al, and Si (atomic %).

TABLE 1

|  | C | O | F | S | Li | P | N | Al | Si |
|---|---|---|---|---|---|---|---|---|---|
| Storage Battery BC | 32 | 31 | 7.9 | — | 28 | 0.3 | 0.3 | — | 0.7 |
| Storage Battery BA | 31 | 38 | 1.4 | 3.8 | 24 | — | 2.1 | — | — |

Figure 44A:
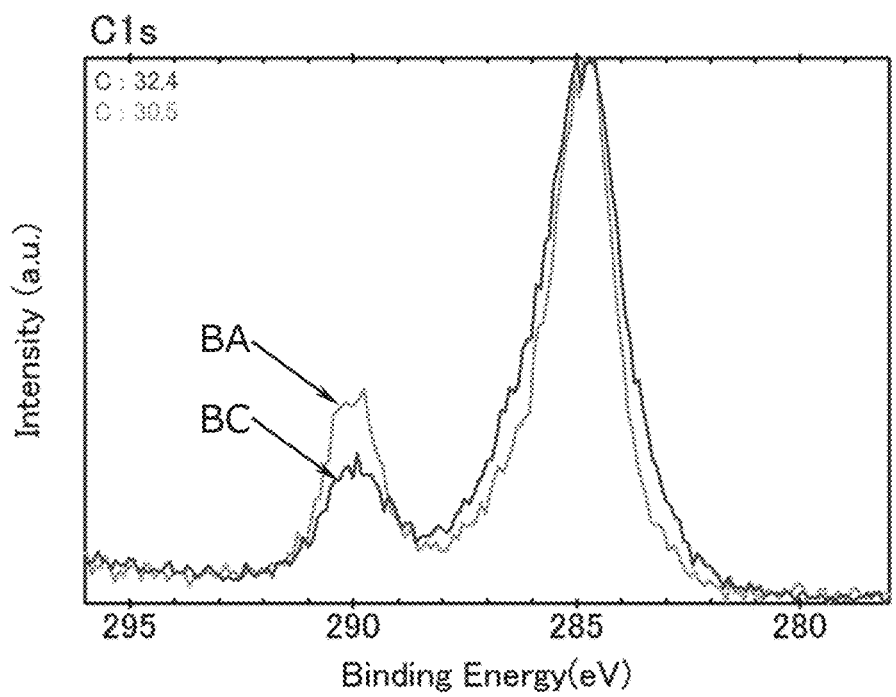
FIGS. 44A and 44B each show XPS analysis results.
Figure 44B:
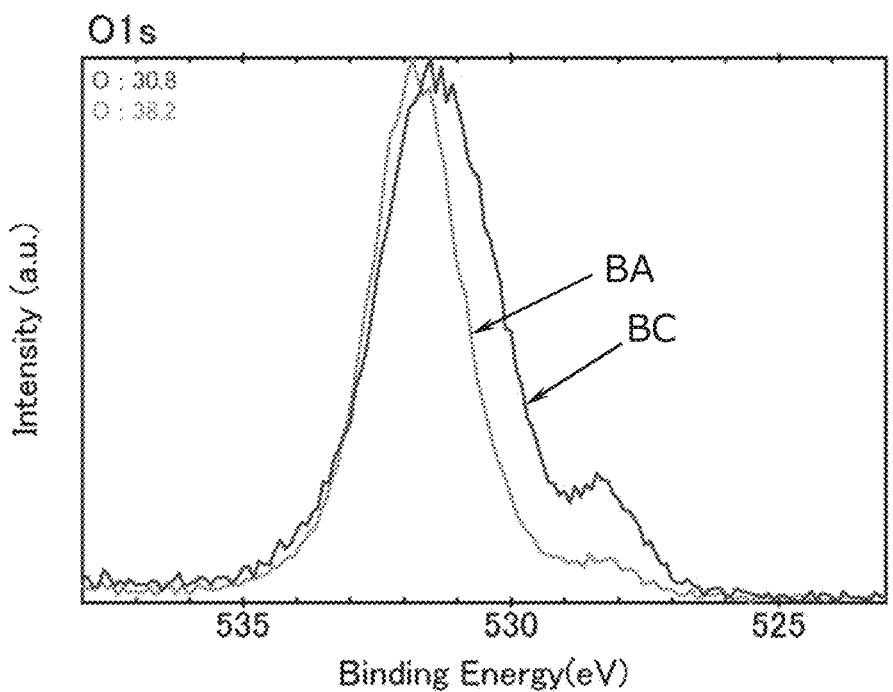
Figure 45A:
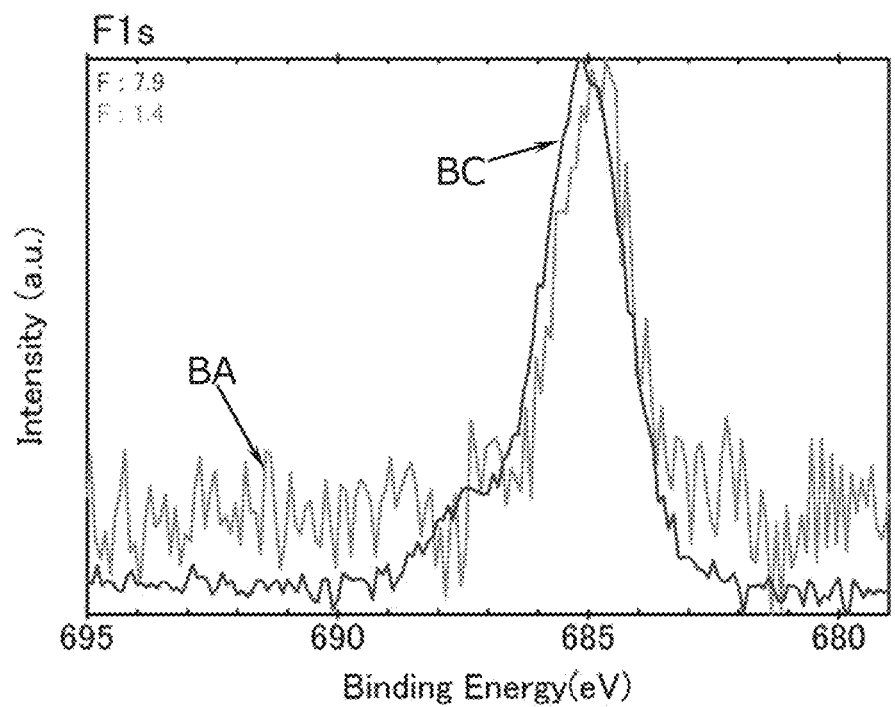
FIGS. 45A and 45B each show XPS analysis results.
Figure 45B:
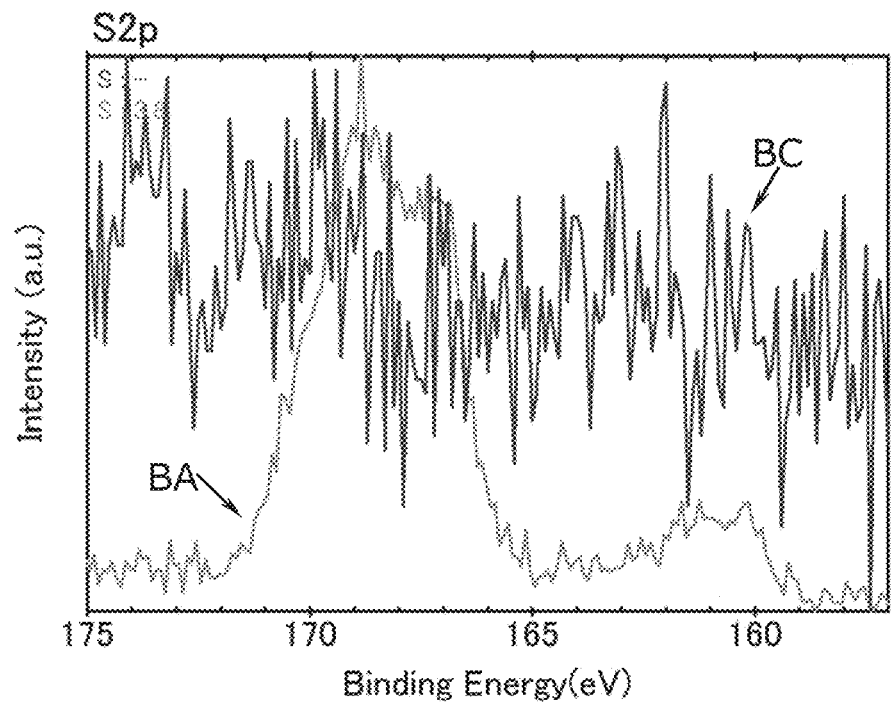
Figure 46:
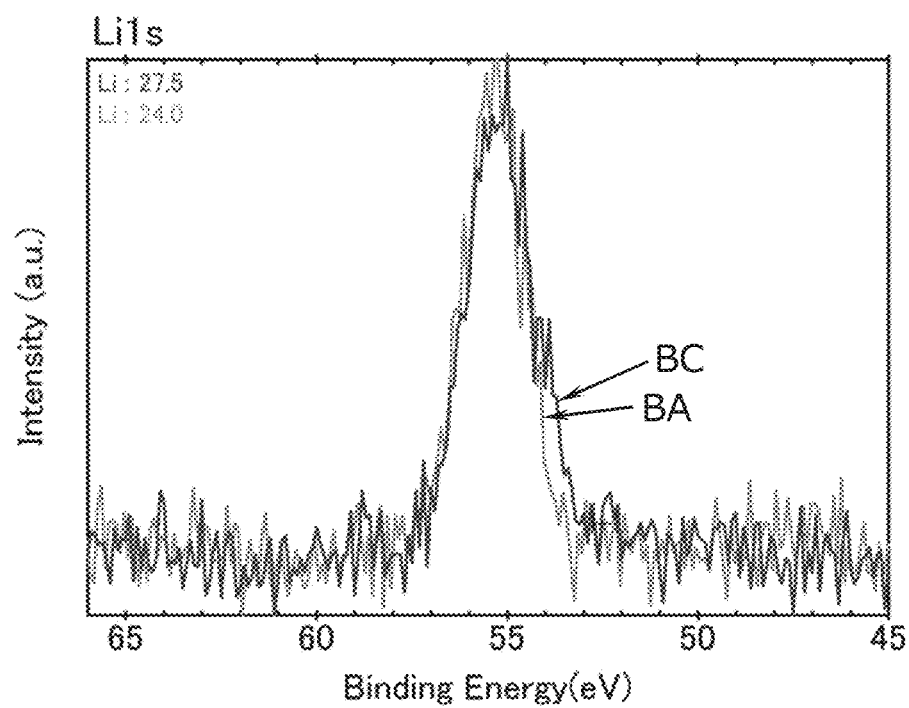
FIG. 46 shows XPS analysis results.

FIG. 44A shows C1s spectra. FIG. 44B shows O1s spectra. FIG. 45A shows F1s spectra. FIG. 45B shows S2p spectra. FIG. 46 shows Li1s spectra.

A prominent difference was observed between peaks of the S2p spectrum. The SOX peak of the negative electrode of Storage Battery BA is three or more times the metal-S peak.

EXAMPLE 4

Cross sections of the negative electrodes of Storage Batteries BA and BC fabricated in Example 2 were observed after charged and discharge cycles.

After charge and discharge cycles, Storage Batteries BA and BC were disassembled. After the disassembly, deuterated acetonitrile was added to be mixed with the electrolytic solution left in each of the storage batteries, and the mixed solution was extracted with a pipette. Then, the negative electrode was immersed in DMC, which was put in a petri dish, to be washed. DMC was renewed twice, and washing was performed three times in total. After that, the solvent was volatilized in a reduced-pressure atmosphere.

Figure 47:
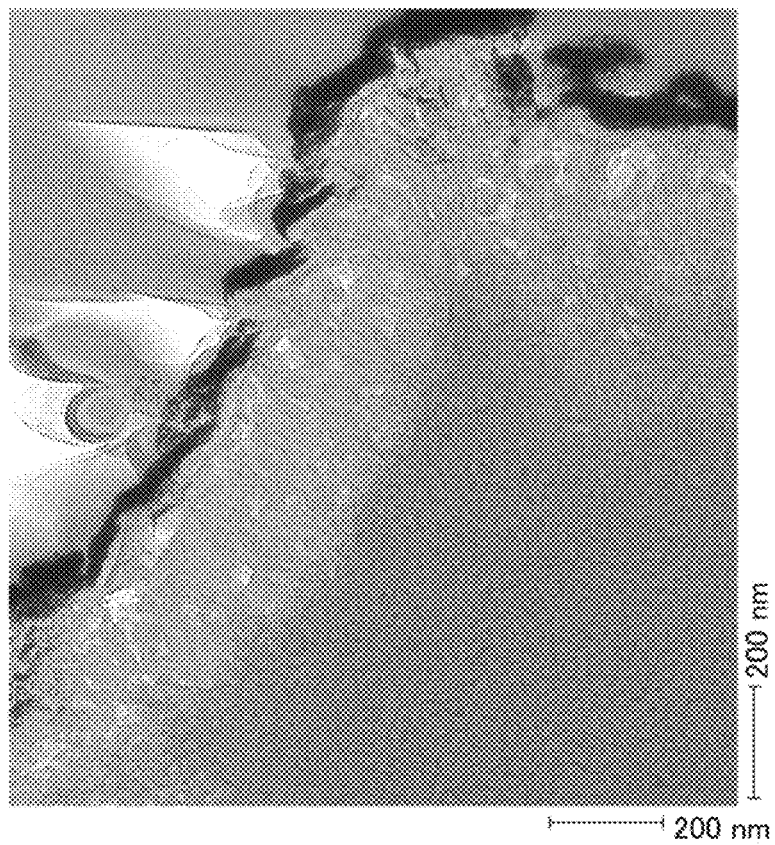
FIG. 47 shows a cross-sectional TEM observation result.
Figure 48:
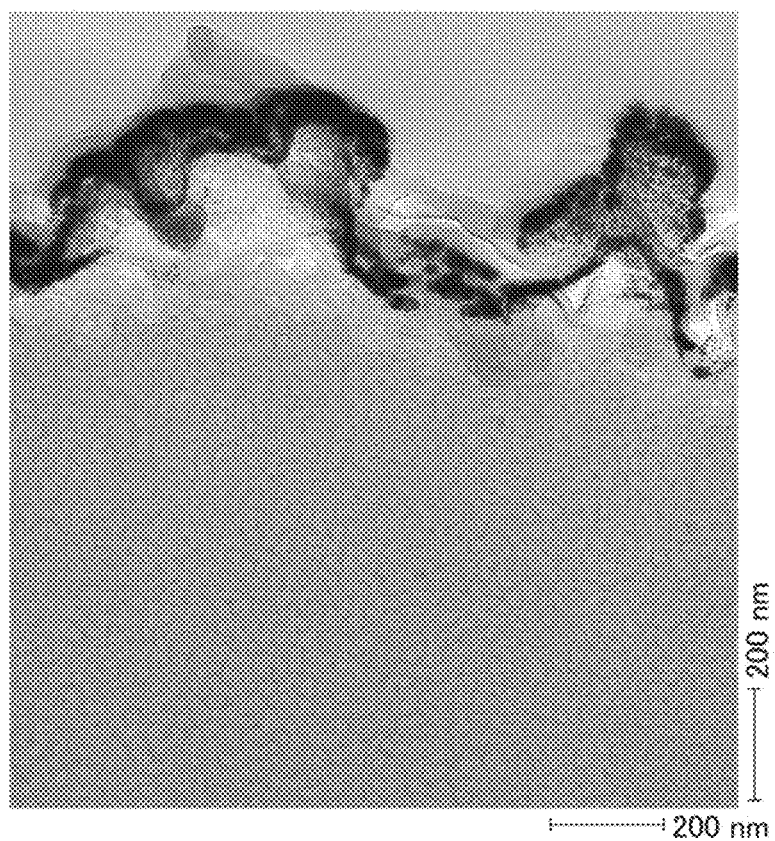
FIG. 48 shows a cross-sectional TEM observation result.

Next, to observe the cross sections of the negative electrodes, the negative electrodes were sliced by FIB. Then, the cross sections of the negative electrodes were observed with a TEM. FIGS. 47 and 48 show the observed negative electrodes of Storage Batteries BC and BA, respectively.

Figure 49A:
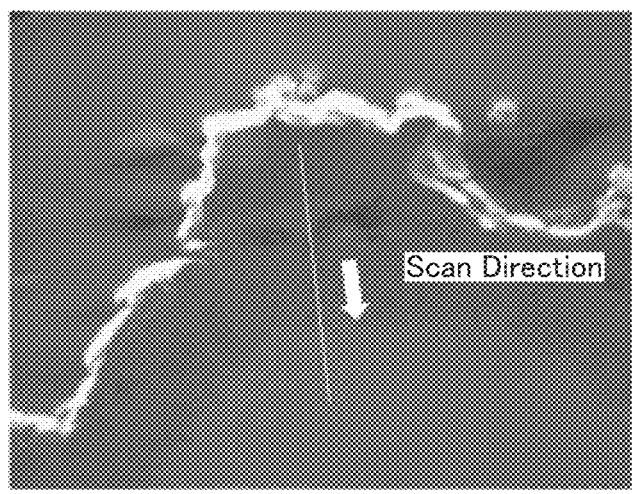
FIG. 49A shows a cross-sectional observation image and FIG. 49B shows EDX analysis results.
Figure 49B:
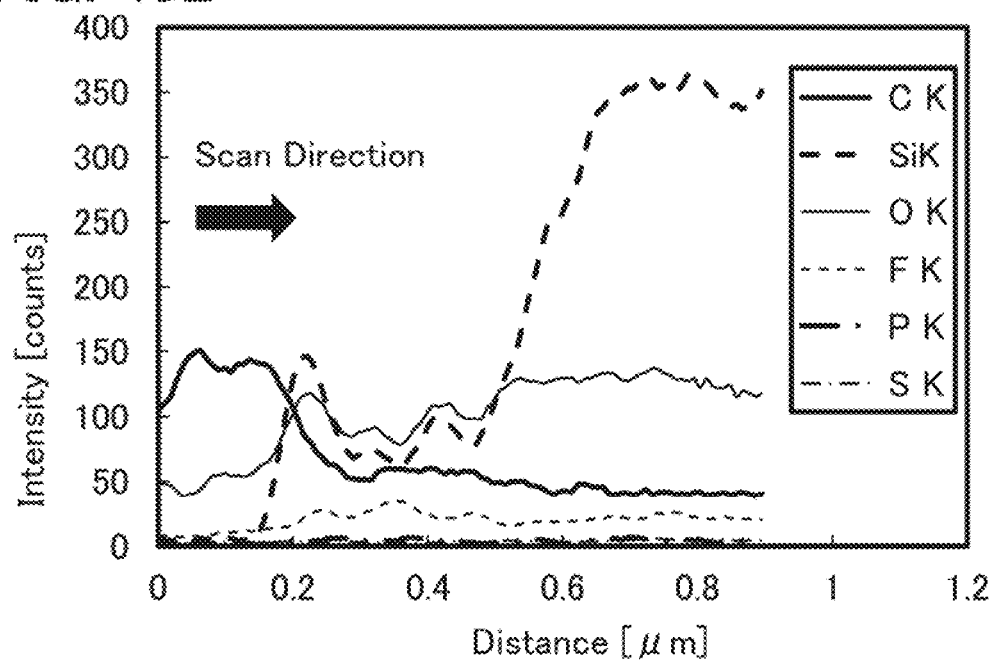
Figure 50A:
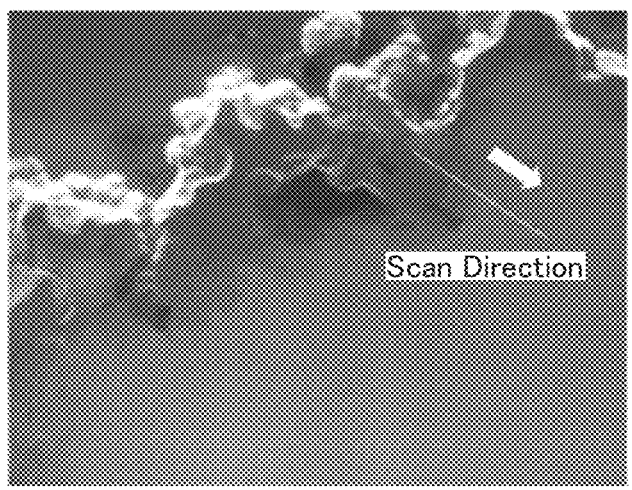
FIG. 50A shows a cross-sectional observation image and FIG. 50B shows EDX analysis results.
Figure 50B:
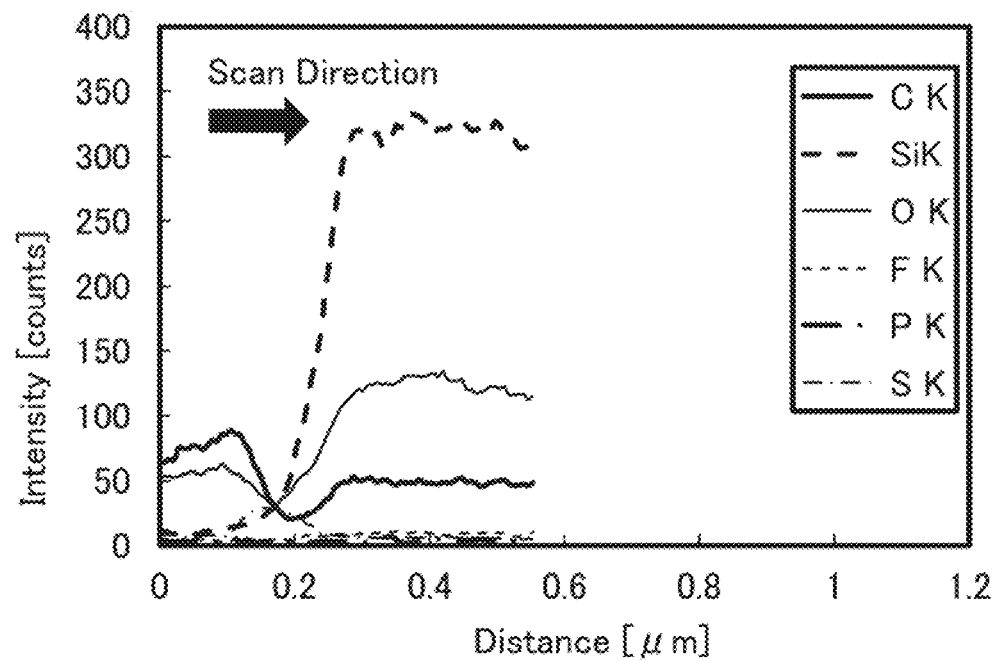
Figure 51A:
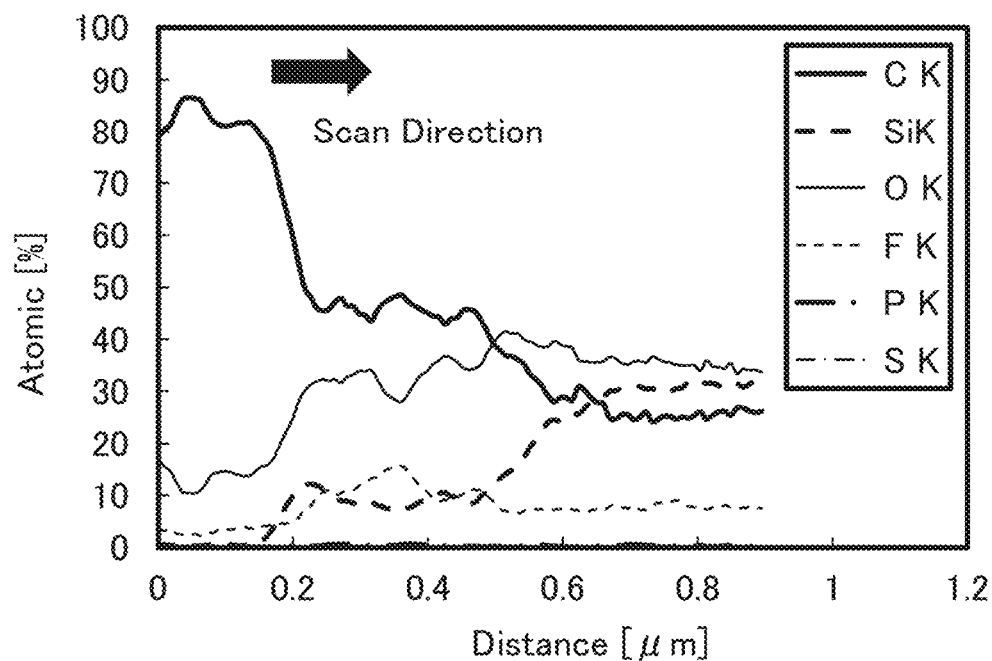
FIGS. 51A and 51B each show EDX analysis results.
Figure 51B:
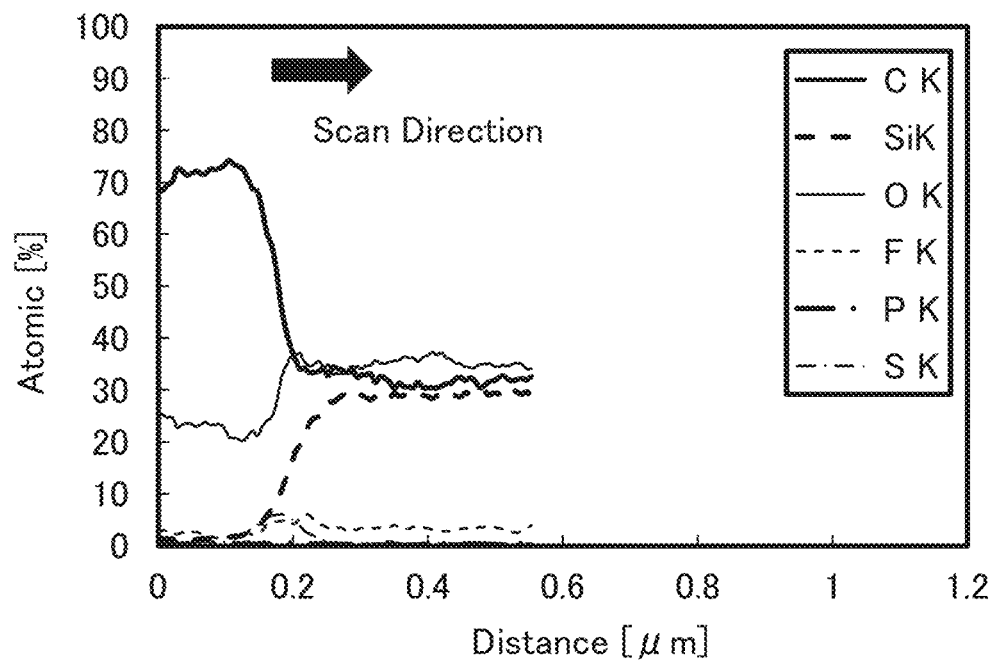

Then, the cross sections of the negative electrodes were observed with a STEM, and STEM-EDX line analyses were performed as elementary analyses of the following six elements: carbon, oxygen, fluorine, silicon, phosphorus, and sulfur. FIG. 49A shows a STEM image of a portion of Storage Battery BC on which line analysis was performed. FIG. 49B and FIG. 51A each show spectra obtained by the line analysis. FIG. 50A shows a STEM image of a portion of Storage Battery BA on which line analysis was performed. FIG. 50B and FIG. 51B each show spectra obtained by the line analysis. Note that the vertical axis in FIG. 49B and FIG. 50B represents signal intensity, and the vertical axis in FIG. 51A and FIG. 51B represents element content (atomic %).

In FIG. 49B and FIG. 51A, a region from the surface to a depth of approximately 0.2 µm is referred to as a third region, a region from a depth of approximately 0.2 µm to a depth of approximately 0.45 µm is referred to as a second region, and a region deeper than a depth of approximately 0.45 µm is referred to as a first region. In the first region, constituents of SiO, which is a negative electrode active material, appear to be mainly detected. In the third region, constituents of a coating film formed by decomposition of the electrolytic solution appear to be mainly detected. The second region is presumably a mixed region of the negative electrode active material and the coating film. As shown in the EDX analysis results of FIG. 49B, the intensity of carbon is 10 or more times that of silicon in the third region, whereas the intensity of carbon is approximately 1 time that of silicon in the second region and the intensity of carbon is one sixth or less of that of silicon in the first region. As shown in the EDX analysis results of FIG. 51A, the number of carbon atoms is 20 or more times that of silicon in the third region, whereas the number of carbon atoms is approximately 4 times that of silicon in the second region and the number of carbon atoms is approximately 1 time that of silicon in the first region.

In FIG. 50B and FIG. 51B, a region from the surface to a depth of approximately 0.1 µm is referred to as a third region, a region from a depth of approximately 0.1 µm to a depth of approximately 0.2 µm is referred to as a second region, and a region deeper than a depth of approximately 0.2 µm is referred to as a first region. As shown in the EDX analysis results of FIG. 50B, the intensity of carbon is or more times that of silicon in the third region, whereas the intensity of carbon is approximately 1 time that of silicon in the second region and the intensity of carbon is one sixth or less of that of silicon in the first region. As shown in the EDX analysis results of FIG. 51B, the number of carbon atoms is 20 or more times that of silicon in the third region, whereas the number of carbon atoms is approximately 3 or more times that of silicon in the second region and the number of carbon atoms is approximately 1 time that of silicon in the first region.

Figure 52A:
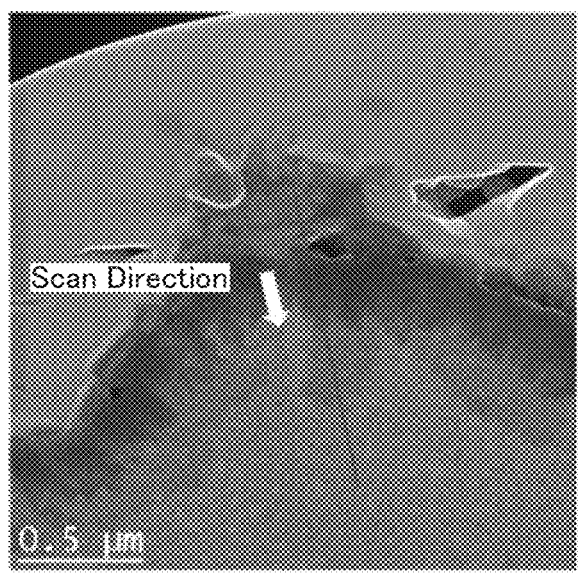
FIG. 52A shows a cross-sectional observation image and FIG. 52B shows EELS analysis results.
Figure 52B:
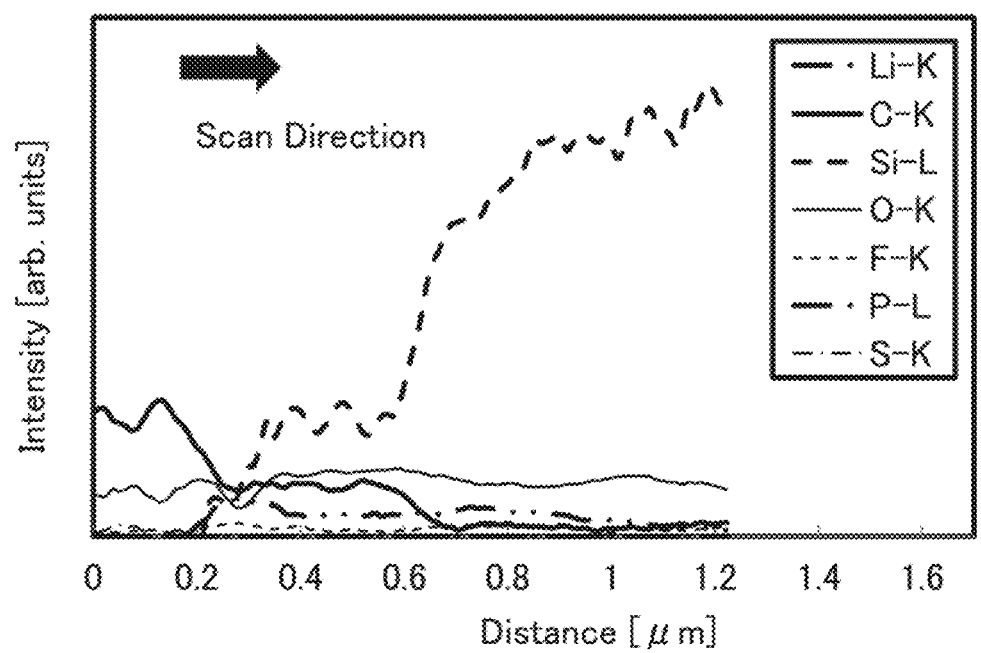
Figure 53A:
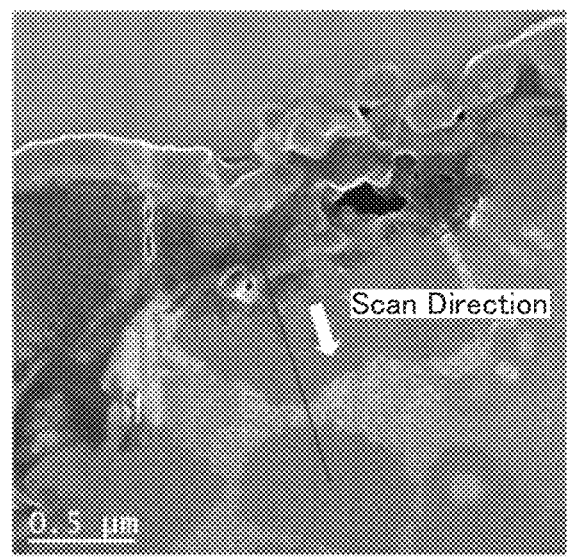
FIG. 53A shows a cross-sectional observation image and FIG. 53B shows EELS analysis results.
Figure 53B:
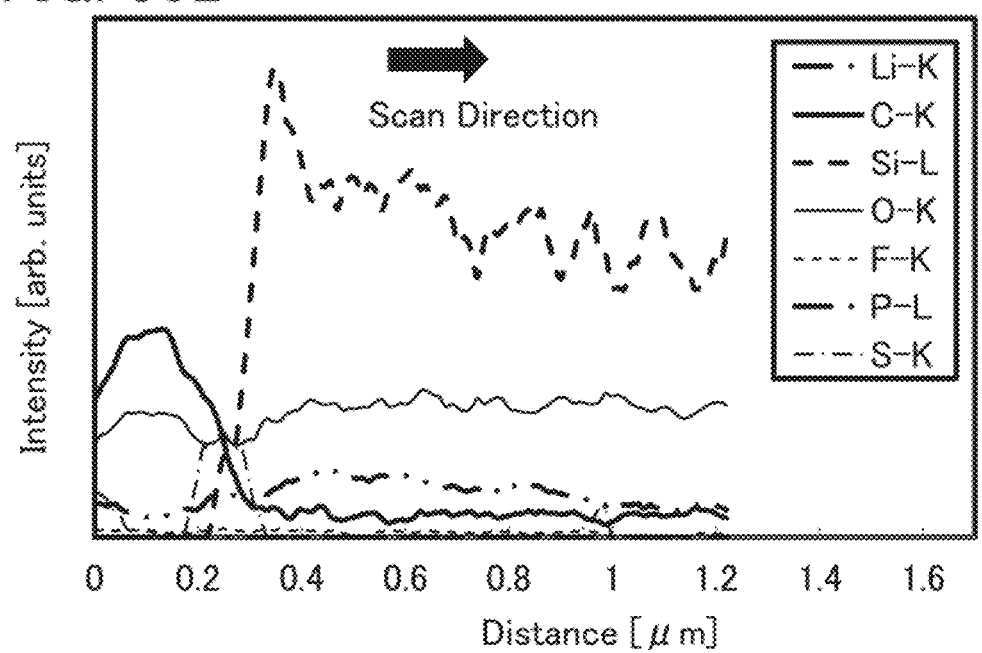

Next, EELS line analyses were performed as elementary analyses. FIG. 52A shows a SEM image of a portion of Storage Battery BC on which line analysis was performed. FIG. 52B shows spectra obtained by the line analysis. FIG. 53A shows a SEM image of a portion of Storage Battery BA on which line analysis was performed. FIG. 53B shows spectra obtained by the line analysis. Note that the vertical axis represents signal intensity.

In FIG. 52B, a region from the surface to a depth of approximately 0.2 µm is referred to as a third region, a region from a depth of approximately 0.2 µm to a depth of approximately 0.45 µm is referred to as a second region, and a region deeper than a depth of approximately 0.45 µm is referred to as a first region. As shown in the EELS analysis results of FIG. 52B, the intensity of carbon is 10 or more times that of silicon in the third region, whereas the intensity of carbon is approximately half of that of silicon in the second region and the intensity of carbon is one tenth or less of that of silicon in the first region.

In FIG. 53B, a region from the surface to a depth of approximately 0.1 µm is referred to as a third region, a region from a depth of approximately 0.1 µm to a depth of approximately 0.2 µm is referred to as a second region, and a region deeper than a depth of approximately 0.2 µm is referred to as a first region. As shown in the EELS analysis results of FIG. 53B, the intensity of carbon is 10 or more times that of silicon in the third region, whereas the intensity of carbon is approximately one tenth or less of that of silicon in the first region.

FIG. 47 to FIGS. 53A and 53B show that the second region in the negative electrode of Storage Battery BA is thinner than that in the negative electrode of Storage Battery BC, which suggests that the surface of the active material is prevented from being cracked and pulverized.

This application is based on Japanese Patent Application serial no. 2016-016346 filed with Japan Patent Office on Jan. 29, 2016, the entire contents of which are hereby incorporated by reference.

What is claimed is:

1. A storage battery comprising:
a positive electrode;
a negative electrode; and
an electrolytic solution,
wherein the negative electrode includes an active material region and a region between a surface of the active material region and the electrolytic solution, wherein each of the active material region and the region includes a first element and carbon,
wherein the first element is selected from the group consisting of silicon, tin, gallium, aluminum, germanium, lead, antimony, bismuth, silver, zinc, cadmium, and indium,
wherein a thickness of the region is larger than or equal to 10 nm and smaller than or equal to 1000 nm,
wherein the electrolytic solution includes a first cation, a second cation, and an anion,
wherein the first cation is selected from the group consisting of a lithium ion, a sodium ion, a calcium ion, and a magnesium ion,
wherein the second cation is an imidazolium cation or a tertiary sulfonium cation, and
wherein the anion is selected from the group consisting of monovalent anions represented by $(C_nF_{2n+1}SO_2)_2N^-$ (n=0 to 3), a monovalent cyclic amide-based anion represented by $(CF_2SO_2)_2N^-$, monovalent methide-based anions represented by $(C_nF_{2n+1}SO_2)_3C^-$ (n=0 to 3), a monovalent cyclic methide-based anion represented by $CF_2SO_2)_2C^-$, a fluorosulfonate anion represented by $SO_3F^-$, fluoroalkyl sulfonic acid anions represented by $(C_mF_{2m+1}SO_3)^-$ (m=0 to 4, a tetrafluoroborate anion represented by $BF_4^-$, fluoroalkylborate anions represented by $\{BF_n(C_mH_kF_{2m+1-k})_{4-n}\}^-$ (n=0 to 3, m=1 to 4, and k=0 to 2m), a hexafluorophosphate anion represented by $PF_6^-$, and fluoroalkylphosphate anions represented by $\{PF_n(C_mH_kF_{2m+1-k})_{6-n}\}^-$ (n=0 to 5, m=1 to 4, and k=0 to 2m).

2. The storage battery according to claim 1,
wherein the second cation is the imidazolium cation represented by General Formula (G1):

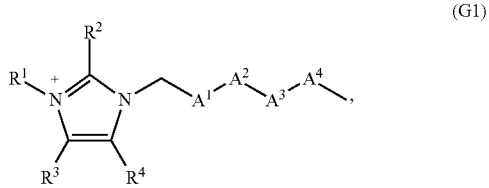

wherein:
$R^1$ represents an alkyl group having 1 to 4 carbon atoms,
$R^2$ to $R^4$ individually represent a hydrogen atom or an alkyl group having 1 to 4 carbon atoms,
$A^1$ to $A^4$ individually represent a methylene group or an oxygen atom, and
at least one of $A^1$ to $A^4$ represents an oxygen atom.

3. The storage battery according to claim 2,
wherein the second cation is represented by General Formula (G2):

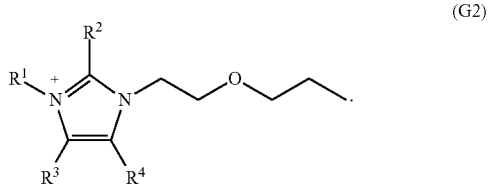

4. The storage battery according to claim 2,
wherein the second cation is represented by General Formula (G3):

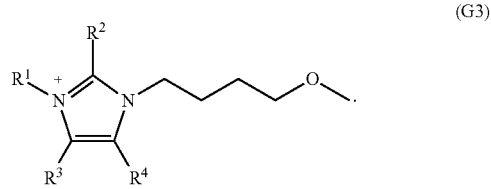

5. A battery control unit comprising the storage battery according to claim 1.

6. An electronic device comprising the storage battery according to claim 1.

7. An electronic device comprising:
the storage battery according to claim 1; and
a display device.

8. An electronic device comprising:
the storage battery according to claim 1; and
an input-output terminal having a function of performing wireless communication.

9. The storage battery according to claim 1,
wherein an atomic ratio of carbon to the first element included in the region is larger than an atomic ratio of carbon to the first element included in the active material region.

10. A storage battery comprising:
a positive electrode;
a negative electrode; and
an electrolytic solution,
wherein the negative electrode includes an active material region, a first region in contact with a surface of the active material region, and a second region in contact with a surface of the first region,
wherein each of the active material region, the first region, and the second region includes a first element and carbon,
wherein the first element is selected from the group consisting of silicon, tin, gallium, aluminum, germanium, lead, antimony, bismuth, silver, zinc, cadmium, and indium,
wherein a thickness of the first region is larger than or equal to 10 nm and smaller than or equal to 500 nm,
wherein a thickness of the second region is larger than or equal to 10 nm and smaller than or equal to 1000 nm,
wherein an atomic ratio of carbon to the first element included in the active material region is $x_1:y_1$,
wherein an atomic ratio of carbon to the first element included in the first region is $x_2:y_2$,
wherein an atomic ratio of carbon to the first element included in the second region is $x_3:y_3$,
wherein $x_1/y_1$ is smaller than or equal to 3,
wherein $x_3/y_3$ is larger than or equal to 5,
wherein the electrolytic solution includes a first cation, a second cation, and an anion,
wherein the first cation is selected from the group consisting of a lithium ion, a sodium ion, a calcium ion, and a magnesium ion,
wherein the second cation is an imidazolium cation or a tertiary sulfonium cation, and
wherein the anion is selected from the group consisting of monovalent anions represented by $(C_nF_{2n+1}SO_2)_2N^-$ (n=0 to 3), a monovalent cyclic amide-based anion represented by $(CF_2SO_2)_2N^-$, monovalent methide-based anions represented by $(C_nF_{2n+1}SO_2)_3C^-$ (n=0 to 3), a monovalent cyclic methide-based anion represented by $(CF_2SO_2)_2C^-$, a fluorosulfonate anion represented by $SO_3F^-$, fluoroalkyl sulfonic acid anions represented by $(C_mF_{2m+1}SO_3)^-$ (m=0 to 4), a tetrafluoroborate anion represented by $BF_4^-$, fluoroalkylborate anions represented by $\{BF_n(C_mH_kF_{2m+1-k})_{4-n}\}^-$ (n=0 to 2m), m=1 to 4, and k=0 to 2m), a hexafluorophosphate anion represented by $PF_6^-$, and fluoroalkylphosphate anions represented by $\{PF_n(C_mH_kF_{2m+1-k})_{6-n}\}^{-(n=0 \text{ to } 5, m=1 \text{ to } 4, \text{ and } k=0 \text{ to } 2m)}$.

11. The storage battery according to claim 10,
wherein the second cation is the imidazolium cation represented by General Formula (G1):

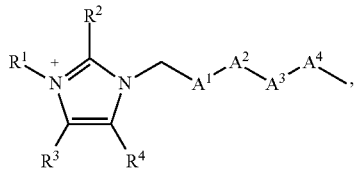
(G1)

wherein:
$R^1$ represents an alkyl group having 1 to 4 carbon atoms,
$R^2$ to $R^4$ individually represent a hydrogen atom or an alkyl group having 1 to 4 carbon atoms,
$A^1$ to $A^4$ individually represent a methylene group or an oxygen atom, and
at least one of $A^1$ to $A^4$ represents an oxygen atom.

12. The storage battery according to claim 11,
wherein the second cation is represented by General Formula (G2):

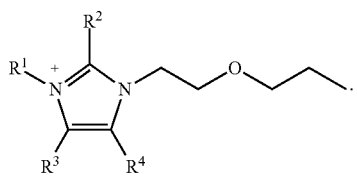
(G2)

13. The storage battery according to claim 11,
wherein the second cation is represented by General Formula (G3):

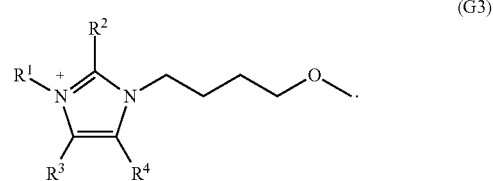
(G3)

14. A battery control unit comprising the storage battery according to claim 10.

15. An electronic device comprising the storage battery according to claim 10.

16. An electronic device comprising:
the storage battery according to claim 10; and
a display device.

17. An electronic device comprising:
the storage battery according to claim 10; and
an input-output terminal having a function of performing wireless communication.

18. The storage battery according to claim 10,
wherein $x_2/y_2$ is larger than or equal to 0.1 and smaller than 10.

19. The storage battery according to claim 10,
wherein the first region is provided between the active material region and the second region, and
wherein the first region is a mixed region of materials of the active material region and materials of the second region.

20. The storage battery according to claim 10,
wherein a surface of the second region is in contact with the electrolytic solution.

* * * * *